United States Patent
Kuno et al.

(10) Patent No.: US 7,663,668 B2
(45) Date of Patent: Feb. 16, 2010

(54) IMAGING DEVICE

(75) Inventors: Tetsuya Kuno, Tokyo (JP); Hiroaki Sugiura, Tokyo (JP); Takashi Itow, Tokyo (JP); Koichi Yamashita, Tokyo (JP); Katsutoshi Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 488 days.

(21) Appl. No.: 11/547,069

(22) PCT Filed: Jan. 14, 2005

(86) PCT No.: PCT/JP2005/000359

§ 371 (c)(1),
(2), (4) Date: Oct. 2, 2006

(87) PCT Pub. No.: WO2005/101853

PCT Pub. Date: Oct. 27, 2005

(65) Prior Publication Data

US 2008/0278592 A1    Nov. 13, 2008

(30) Foreign Application Priority Data

| Apr. 5, 2004 | (JP) | ............................ 2004-110754 |
| Jun. 22, 2004 | (JP) | ............................ 2004-183351 |
| Sep. 24, 2004 | (JP) | ............................ 2004-276761 |

(51) Int. Cl.
*H04N 5/238* (2006.01)
*H04N 9/68* (2006.01)
*H04N 3/14* (2006.01)

(52) U.S. Cl. .................... 348/222.1; 348/237; 348/273

(58) Field of Classification Search ................ 348/164, 348/222.1, 223.1, 224.1, 237, 273, 370–371, 348/577, 655; 345/603, 604; 382/167
See application file for complete search history.

(56) References Cited

U.S. PATENT DOCUMENTS

| 4,016,597 A | 4/1977 | Dillon et al. |
| 4,695,878 A | 9/1987 | Levine et al. |

(Continued)

FOREIGN PATENT DOCUMENTS

JP    5-223638 A    8/1993

(Continued)

*Primary Examiner*—Nhan T Tran
*Assistant Examiner*—Trung Diep
(74) *Attorney, Agent, or Firm*—Birch, Stewart, Kolasch & Birch, LLP

(57) ABSTRACT

An imaging device has color signal generating means (20) for outputting first color signals (R5, G5, B5) corresponding to incident light, and matrix operation means (67) for performing a matrix calculation including multiplication of the first color signals, color signals obtained by raising the first color signals to a power with a first constant (i) as an exponent, color signals obtained by raising the first color signals to a power with a second constant (j) as an exponent, and corresponding matrix coefficients to obtain second color signals (R6, G6, B6). The first and second constants and the matrix coefficients are determined so that the total characteristics of the color signal generating means and the spectral sensitivity characteristic correction means (6) approximate human chromatic curves or spectral sensitivity curves obtained by a linear transformation thereof. Good color reproducibility can be obtained without the use of an infrared cut filter for chromatic correction in the imaging device, and high-sensitivity imaging can be performed under dark conditions.

14 Claims, 51 Drawing Sheets

U.S. PATENT DOCUMENTS

| | | | |
|---|---|---|---|
| 5,668,596 A * | 9/1997 | Vogel | 348/222.1 |
| 6,459,449 B1 * | 10/2002 | Juen | 348/223.1 |
| 6,466,334 B1 * | 10/2002 | Komiya et al. | 358/1.9 |
| 6,476,877 B2 * | 11/2002 | Kihara et al. | 348/650 |
| 6,549,653 B1 * | 4/2003 | Osawa et al. | 382/162 |
| 6,639,628 B1 * | 10/2003 | Lee et al. | 348/223.1 |
| 6,856,354 B1 * | 2/2005 | Ohsawa | 348/370 |
| 7,053,935 B2 * | 5/2006 | Guimaraes et al. | 348/222.1 |
| 2002/0163586 A1 * | 11/2002 | Noguchi | 348/342 |

FOREIGN PATENT DOCUMENTS

| | | |
|---|---|---|
| JP | 6-141337 A | 5/1994 |
| JP | 10-108206 A | 4/1998 |
| JP | 11-113006 A | 4/1999 |
| JP | 11-341502 | 12/1999 |
| JP | 2000-299875 A | 10/2000 |
| JP | 2001-36807 A | 2/2001 |
| JP | 2002-142228 A | 5/2002 |
| JP | 2003-134522 A | 5/2003 |
| JP | 2003-264843 A | 9/2003 |
| JP | 2004-32243 A | 1/2004 |
| JP | 2004-363902 A | 12/2004 |
| JP | 2005-45559 A | 2/2005 |

* cited by examiner

WAVELENGTH (nm)

WAVELENGTH (nm)

3000K

5000K

WAVELENGTH (nm)

WAVELENGTH (nm)

FIG.19

| ΣR/ΣG | r1 | r2 | r3 | g1 | g2 | g3 | b1 | b2 | b3 |
|---|---|---|---|---|---|---|---|---|---|
| 1.34 | 4.744 | 0.011 | -4.192 | 0.893 | 1.085 | -1.382 | 1.709 | -3.718 | 1.688 |
| 1.10 | 1.556 | 1.358 | -2.521 | -0.252 | 1.783 | -0.909 | -0.509 | 0.580 | 0.350 |
| 0.94 | 0.915 | 1.371 | -1.854 | 0.049 | 0.747 | -0.089 | 0.151 | -0.553 | 1.041 |
| 0.84 | 0.542 | 1.858 | -1.959 | 0.163 | 0.582 | -0.012 | 0.095 | -0.368 | 0.949 |
| 0.80 | 0.594 | 1.714 | -1.853 | 0.230 | 0.512 | -0.017 | 0.194 | -0.421 | 0.914 |

FIG.20

| ΣR/ΣG | r4 | r5 | r6 | g4 | g5 | g6 | b4 | b5 | b6 |
|---|---|---|---|---|---|---|---|---|---|
| 1.34 | -342.91 | 95.48 | 252.91 | -150.33 | 180.27 | -24.10 | -54.58 | 263.22 | -190.59 |
| 1.10 | -96.05 | -27.18 | 128.20 | -23.25 | 19.85 | 5.55 | 49.56 | -77.25 | 29.86 |
| 0.94 | -49.66 | -38.82 | 91.17 | -34.90 | 60.31 | -26.07 | -14.53 | 13.15 | 0.48 |
| 0.84 | -22.63 | -76.12 | 100.78 | -37.33 | 58.06 | -22.09 | -10.56 | 4.58 | 5.15 |
| 0.80 | -27.36 | -66.48 | 95.40 | -41.24 | 59.37 | -19.26 | -19.78 | 11.70 | 7.25 |

FIG.21

| ΣR/ΣG | r7 | r8 | r9 | g7 | g8 | g9 | b7 | b8 | b9 |
|---|---|---|---|---|---|---|---|---|---|
| 1.34 | -0.0041 | 0.0021 | 0.0028 | -0.0023 | 0.0023 | 0.0008 | -0.0048 | 0.0055 | 0.0017 |
| 1.10 | -0.0010 | -0.0004 | 0.0023 | -0.0005 | 0.0001 | 0.0009 | -0.0003 | -0.0004 | 0.0016 |
| 0.94 | -0.0003 | -0.0009 | 0.0019 | -0.0005 | 0.0009 | -0.0001 | -0.0004 | 0.0006 | 0.0003 |
| 0.84 | 0.0001 | -0.0017 | 0.0022 | -0.0005 | 0.0009 | -0.0003 | -0.0002 | 0.0003 | 0.0002 |
| 0.80 | 0.0000 | -0.0016 | 0.0022 | -0.0005 | 0.0009 | -0.0003 | -0.0003 | 0.0004 | 0.0002 |

FIG.22

| COLOR TEMPERATURE | | IMAGING ELEMENT ΔE*ab | IMAGING ELEMENT +IRCF ΔE*ab | EMBODIMENT ΔE*ab |
|---|---|---|---|---|
| 3000K | MEAN VALUE | 24.5 | 9.0 | 11.3 |
| | MAXIMUM VALUE | 54.7 | 24.3 | 23.0 |
| 4000K | MEAN VALUE | 19.3 | 7.6 | 7.1 |
| | MAXIMUM VALUE | 41.9 | 20.6 | 16.3 |
| 5000K | MEAN VALUE | 15.9 | 7.0 | 6.1 |
| | MAXIMUM VALUE | 33.4 | 19.6 | 11.2 |
| 6000K | MEAN VALUE | 13.9 | 6.7 | 5.7 |
| | MAXIMUM VALUE | 28.4 | 18.7 | 9.5 |
| 7000K | MEAN VALUE | 13.4 | 6.6 | 5.6 |
| | MAXIMUM VALUE | 27.8 | 18.2 | 9.3 |

FIG.32

| COLOR INDEX NUMBER | COLOR | COLOR DIFFERENCE $\Delta E*ab$ |
|---|---|---|
| 1 | DARK SKIN | 0.8 |
| 2 | LIGHT SKIN | 1.4 |
| 3 | SKY BLUE | 1.5 |
| 4 | FOLIAGE | 2.2 |
| 5 | BLUE FLOWER | 3.4 |
| 6 | BLUISH GREEN | 2.3 |
| 7 | ORANGE | 3.5 |
| 8 | PURPLISH BLUE | 2.7 |
| 9 | MODERATE RED | 3.1 |
| 10 | PURPLE | 10.6 |
| 11 | YELLOW GREEN | 3.9 |
| 12 | ORANGE YELLOW | 0.9 |
| 13 | BLUE | 6.0 |
| 14 | GREEN | 6.6 |
| 15 | RED | 1.3 |
| 16 | YELLOW | 1.4 |
| 17 | MAGENTA | 1.2 |
| 18 | CYAN | 2.5 |
| 19 | WHITE | 2.9 |
| 20 | NEUTRAL 8 | 3.2 |
| 21 | NEUTRAL 6.5 | 3.5 |
| 22 | NEUTRAL 5 | 2.7 |
| 23 | NEUTRAL 3.5 | 1.7 |
| 24 | BLACK | 1.8 |
| MEAN VALUE | | 3.0 |

FIG.36

| COLOR NUMBER | COLOR | Δ E*ab |
|---|---|---|
| 1 | DARK SKIN | 0.6 |
| 2 | LIGHT SKIN | 0.8 |
| 3 | SKY BLUE | 1.0 |
| 4 | FOLIAGE | 1.9 |
| 5 | BLUE FLOWER | 2.2 |
| 6 | BLUISH GREEN | 2.3 |
| 7 | ORANGE | 3.2 |
| 8 | PURPLISH BLUE | 1.7 |
| 9 | MODERATE RED | 4.4 |
| 10 | PURPLE | 9.6 |
| 11 | YELLOW GREEN | 3.9 |
| 12 | ORANGE YELLOW | 1.3 |
| 13 | BLUE | 5.1 |
| 14 | GREEN | 6.6 |
| 15 | RED | 1.2 |
| 16 | YELLOW | 1.0 |
| 17 | MAGENTA | 2.9 |
| 18 | CYAN | 2.0 |
| 19 | WHITE | 3.6 |
| 20 | NEUTRAL 8 | 4.3 |
| 21 | NEUTRAL 6.5 | 3.4 |
| 22 | NEUTRAL 5 | 3.0 |
| 23 | NEUTRAL 3.5 | 2.4 |
| 24 | BLACK | 1.5 |
| 25 | BLACK FABRIC | 18.4 |
| 26 | FOLIAGE (1) | 9.7 |
| 27 | RED FABRIC | 2.0 |
| 28 | FOLIAGE (2) | 12.4 |
| 29 | BLUE FABRIC (1) | 14.1 |
| COLOR DIFFERENCE Δ E*ab MEAN VALUE | COLOR NUMBER 1-29 | 4.4 |
| | COLOR NUMBER 1-24 | 2.9 |
| | COLOR NUMBER 25-29 | 11.3 |

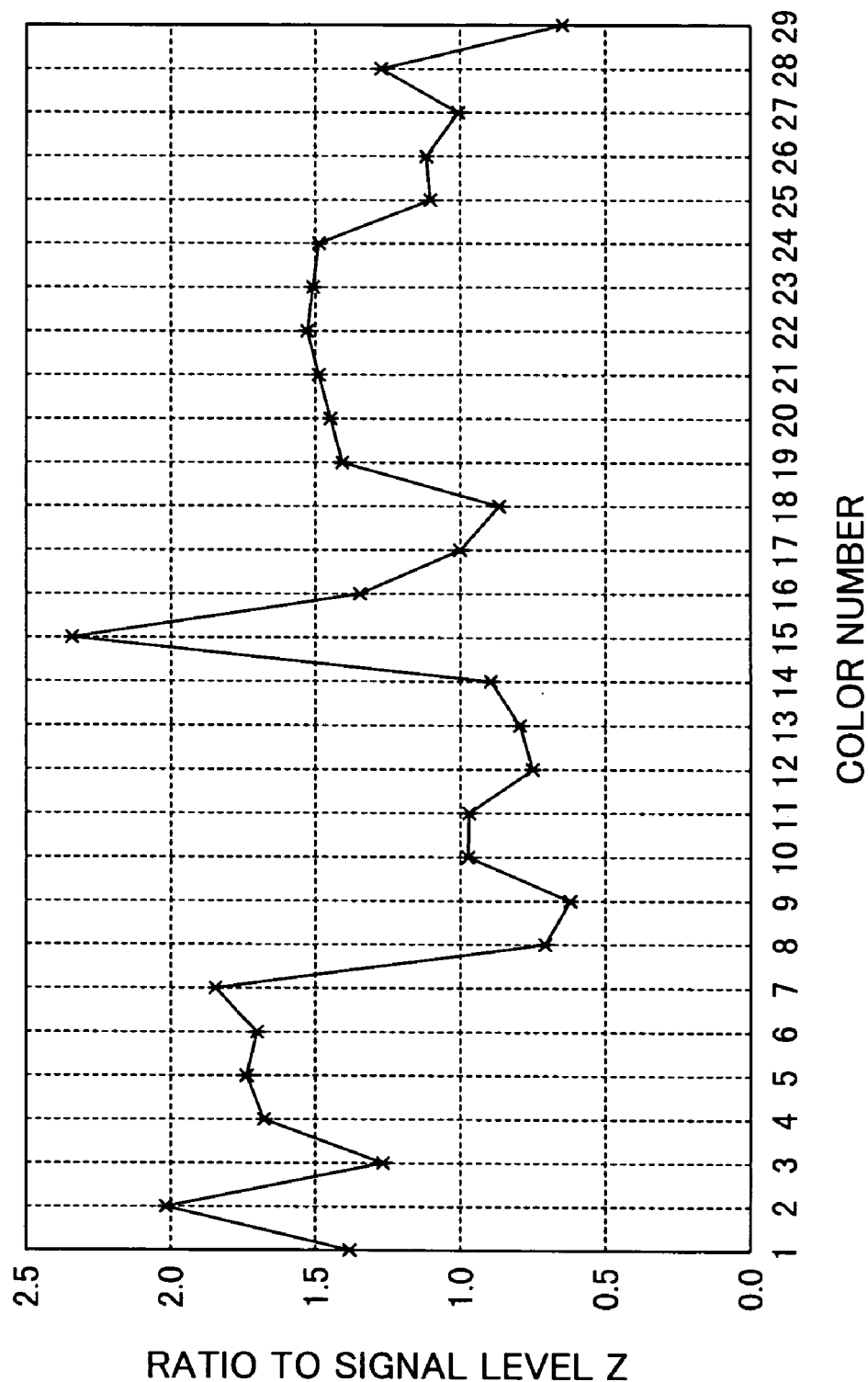

FIG.39

| COLOR NUMBER | COLOR | ΔE*ab |
|---|---|---|
| 1 | DARK SKIN | 0.8 |
| 2 | LIGHT SKIN | 1.4 |
| 3 | SKY BLUE | 1.5 |
| 4 | FOLIAGE | 2.2 |
| 5 | BLUE FLOWER | 3.4 |
| 6 | BLUISH GREEN | 2.3 |
| 7 | ORANGE | 3.5 |
| 8 | PURPLISH BLUE | 2.7 |
| 9 | MODERATE RED | 3.1 |
| 10 | PURPLE | 10.6 |
| 11 | YELLOW GREEN | 3.9 |
| 12 | ORANGE YELLOW | 0.9 |
| 13 | BLUE | 6.0 |
| 14 | GREEN | 6.6 |
| 15 | RED | 1.3 |
| 16 | YELLOW | 1.4 |
| 17 | MAGENTA | 1.2 |
| 18 | CYAN | 2.5 |
| 19 | WHITE | 2.9 |
| 20 | NEUTRAL 8 | 3.2 |
| 21 | NEUTRAL 6.5 | 3.5 |
| 22 | NEUTRAL 5 | 2.7 |
| 23 | NEUTRAL 3.5 | 1.7 |
| 24 | BLACK | 1.8 |
| 25 | BLACK FABRIC | 10.0 |
| 26 | FOLIAGE (1) | 1.2 |
| 27 | RED FABRIC | 3.9 |
| 28 | FOLIAGE (2) | 1.7 |
| 29 | BLUE FABRIC (1) | 2.0 |
| COLOR DIFFERENCE ΔE*ab MEAN VALUE | COLOR NUMBER 1-29 | 3.1 |
| | COLOR NUMBER 1-24 | 3.0 |
| | COLOR NUMBER 25-29 | 3.8 | ns
IMAGING DEVICE

FIELD OF THE INVENTION

The present invention relates to an imaging device, more particularly to an imaging device equipped with a signal processing means that performs a visual sensitivity correction without mounting, dismounting, or using an infrared cut filter (IRCF). The present invention also relates to a camera equipped with that type of imaging device. The invention further relates to a signal processing method in that type of imaging device.

The present invention relates furthermore to an imaging device capable of high-sensitivity imaging and also capable of color imaging with good color reproducibility.

BACKGROUND ART

A conventional imaging device has a lens that focuses incident light, an imaging device that converts the focused optical image to an electrical signal, and an image signal processing means that processes the electrical signal obtained from the imaging device to obtain a prescribed image signal.

To resolve different colors, when the imaging device is a single-element sensor having a single CCD (Charge Coupled Device) or CMOS (Complementary Metal Oxide Semiconductor) sensor, these being the types of sensors usually employed as imaging elements, a filter of a different color is required for each pixel.

To obtain red (R), green (G), and blue (B) color signals, red, green, and blue primary color filters that pass optical bands corresponding to red, green, and blue may be used, or magenta (Mg), cyan (Cy), yellow (Ye), and green (G) complementary filters may be used. Filters of each of these colors are designed with dyes or pigments having spectral transmission characteristics that pass light of the desired color, but they also have a certain transmittance in the near infrared region. The principal component of the photoelectric conversion section of the imaging element is a semiconductor such as silicon (Si), so the photoelectric conversion section is sensitive to the part of the near infrared region with comparatively long wavelengths. The signal obtained from an imaging element equipped with color filters therefore responds to light rays in the near infrared region.

The chromatic curves that express human sensitivity to color and the brightness curve that expresses human sensitivity to brightness are located in the so-called visible spectral region from 380 nm to 780 nm in which sensations can be perceived, but there is barely any sensitivity at wavelengths longer than 700 nm. To match the color reproducibility of the imaging device to the human chromatic curves, it has been necessary to make a visual sensitivity correction by placing an infrared cut filter (hereinafter, IRCF) in front of the imaging element to block near infrared rays.

When sensitivity is more important than color reproducibility, however, as in a surveillance camera, it is better not to provide an IRCF and to allow the imaging element to receive near infrared light, so that the near infrared part of the spectrum can be used.

Conventional imaging devices address the above situation by incorporating an optical filter means for making a visual sensitivity correction in coordination with the diaphragm means that adjusts the amount of incident light, to obtain good color reproducibility by using the filter means to make a visual sensitivity correction when the diaphragm is stopped down. Below a certain level of illumination, however, the optical filter is removed from the optical path by an operation coordinated with the diaphragm so that high-sensitivity imaging is performed using the infrared light. An IRCF is used as the optical filter means for the visual sensitivity correction. When the visual sensitivity correction is performed, light of wavelengths equal to or greater than a certain wavelength (more specifically, equal to or greater than 650 nm) is attenuated (see, for example, Patent Document 1).

Another conventional imaging device uses an infrared cut filter to attenuate infrared light during high-sensitivity imaging, and uses an infrared cut filter and a band attenuation filter that attenuates yellow-green during imaging that combines high sensitivity with good color reproducibility. The image signal is obtained by switching filters to adjust the mixing ratio of the red, green, and blue signals according to the imaging purpose (see, for example, Patent Document 2).

Yet another conventional imaging device has means for output of a prescribed color image signal in imaging with at least a prescribed amount of incident light or with a light source that produces mainly visible light, and for output of a monochrome image signal in imaging with less than the prescribed amount of incident light or with a light source that produces mainly infrared light. When the prescribed color image signal is output, the white balance is corrected by using a prescribed mixing ratio of the red, green, and blue signals (see, for example, Patent Document 3).

Patent Document 1: Japanese Patent Application Publication No. 2001-36897 (pp. 3-6, FIGS. 1-5)
Patent Document 2: Japanese Patent Application Publication No. 2003-134522 (pp. 3-5, FIG. 1)
Patent Document 3: Japanese Patent Application Publication No. 2003-264843 (pp. 5-6, FIG. 1)

DISCLOSURE OF THE INVENTION

Problems to be Solved by the Invention

The imaging device in Patent Document 1 requires a means (mechanism) for moving the IRCF in cooperation with the operation of the diaphragm means, making it difficult to reduce the size of the unit including the imaging element. Another problem is that simple imaging devices (for example, PC cameras, mobile phone cameras, and toy cameras) that adjust the exposure by use of an electronic shutter in the imaging element often have no diaphragm mechanism. When the imaging device described in Patent Document 1 is applied as one of these simple image devices, it is therefore necessary to provide new means for mounting and dismounting the ICRF.

To obtain a color image signal in the imaging devices in Patent Documents 2 and 3, the brightness signal is generated simply by adjusting the white balance without correcting the color signals. The mixing ratio of the red, green, and blue signals used in generating the brightness signal is determined without regard to the human brightness curve. Consequently, the red, green, and blue values corresponding to the color image signal differ from the red, green, and blue values that would be obtained using spectral sensitivity curves corresponding to the human chromatic curves. The image signal therefore has a large color error ΔE*ab (JIS Z8730). It is accordingly difficult to obtain color reproducibility matching human chromatic curves in the imaging devices of Patent Documents 2 and 3.

The imaging device in Patent Document 2 also requires means for switching filters, as in Patent Document 1, according to the intended type of imaging. The imaging device in Patent Document 3, since it changes the mixing ratio of the red, green, and blue signals by switching filters, likewise requires means for switching filters as in Patent Document 1. Size reduction is therefore also difficult in the imaging devices in Patent Documents 2 and 3.

Moreover, in the imaging device described in Patent Document 2, even during high-sensitivity imaging, light cannot be imaged in the region invisible to the human eye, because a filter that blocks infrared rays above 650 nm is mounted.

Another problem is that, although conventional imaging devices can perform spectral sensitivity corrections appropriate for colors such as artist's green, they cannot perform spectral sensitivity corrections appropriate for colors such as the green of foliage or colors of synthetic fabrics that appear identical to the human eye.

The present invention addresses the above problems, with the object of providing a signal processing system and an imaging device that, without using an IRCF, can obtain a color image signal with good color reproducibility, even in the presence of near infrared incident light, and can also obtain an image signal with high sensitivity under dark conditions.

Another object of the invention is to provide an imaging device and a signal processing system that can perform spectral sensitivity corrections appropriate for artist's green etc., the green of living foliage, the colors of synthetic fabrics, and so on and obtain good color reproducibility.

Still another object of the invention is to provide an imaging device that enables high-sensitivity imaging and imaging with good color reproducibility, matching human chromatic curves, without requiring means for moving an optical filter out of the light path or a means (mechanism) for switching optical filters.

Means of Solution of the Problems

The present invention provides an imaging device comprising color signal generating means for receiving incident light and outputting first red, green, and blue color signals corresponding to the incident light, and spectral sensitivity characteristic correction means for performing a matrix calculation including multiplication of the first red, green, and blue color signals by coefficients to generate second red, green, and blue color signals, wherein the coefficients are determined so that the total characteristics of the color signal generating means and the spectral sensitivity characteristic correction means approximate human chromatic curves or spectral sensitivity curves obtained by a linear transformation thereof.

The present invention also provides an imaging device comprising color signal generating means for receiving incident light, dividing the incident light into at least three color components, and outputting first to third color signals corresponding to the at least three color components, spectral sensitivity correction means for performing a matrix calculation including multiplication of the first to third color signals output from the color signal generating means by coefficients to correct for response characteristics of the color signal generating means in the near infrared region, and coefficient setting means for receiving the first to third color signals output from the color signal generating means, deciding whether the combination thereof represents a predetermined exceptional color, and switching the matrix coefficients according to a result of the decision.

The invention also provides an imaging device having a long-wavelength optical filter for attenuating the infrared region and the long-wavelength part of the visible region in incident light, and an imaging element having color filters of at least three colors for outputting at least three color signals corresponding to the light exiting the long-wavelength optical filter.

Effect of the Invention

With the present invention, good color reproducibility can be obtained even without the use of an IRCF.

Also with the present invention, good color reproducibility can be realized for artist's green, the green of living foliage, the colors of synthetic fabrics, and other colors that appear the same to the human eye, without an IRCF.

Furthermore, with the present invention, high-sensitivity imaging and imaging with good color reproducibility matching human chromatic curves are enabled without the need for means for moving an optical filter out of the light path or a means (mechanism) for switching optical filters. In high-sensitivity imaging, it is also possible to perform imaging with light in the near infrared region, which is invisible to the human eye, without removing an optical filter.

BRIEF DESCRIPTION OF THE DRAWINGS

FIG. 19 shows relations between $\Sigma R/\Sigma G$ and the matrix coefficients.

FIG. 20 shows relations between $\Sigma R/\Sigma G$ and the matrix coefficients.

FIG. 21 shows relations between ΣR/ΣG and the matrix coefficients.

FIG. 22 shows the color error of the imaging device according to this invention and the color error of a conventional imaging device as a function of the color temperature of the illumination.

FIG. 32 shows the color error determined from the twenty-four color patches of the Macbeth Color Checker.

FIG. 36 lists the color errors due to the matrix coefficients found from the twenty-four colors in the Macbeth Color Checker and five exceptional colors.

FIG. 38 shows the Cy/Z ratio of the signals used in color identification

FIG. 39 lists the color errors when switched first and second matrix coefficients are used.

Figure 1:
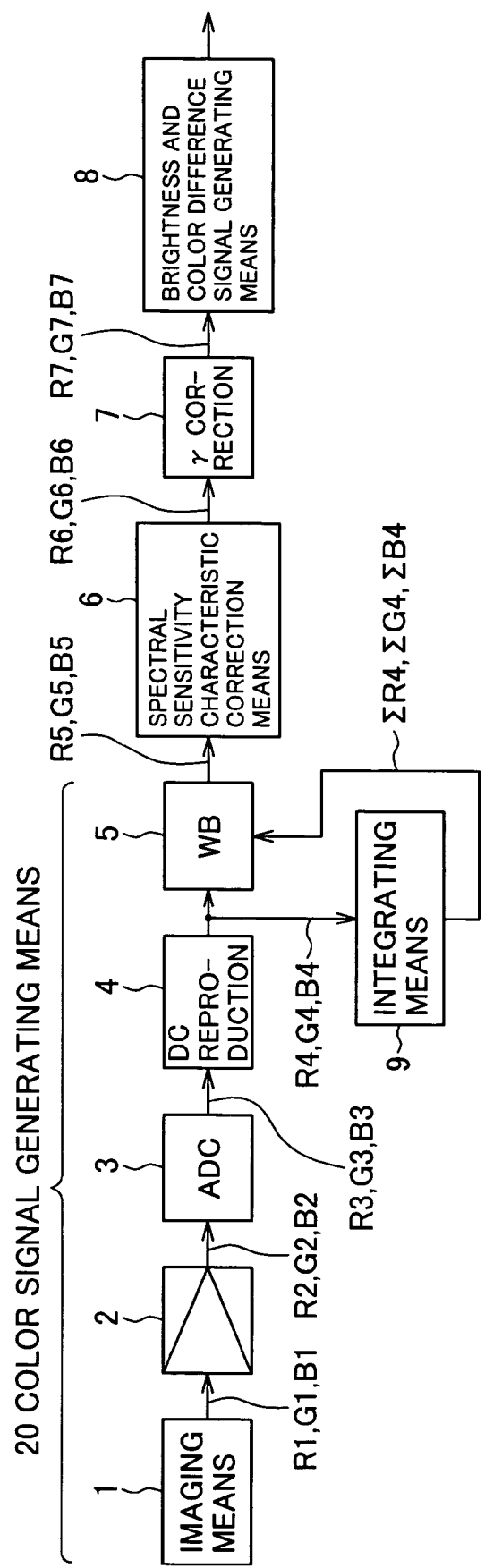
FIG. 1 is a diagram of the imaging device in embodiment A1 of this invention.

EXPLANATION OF REFERENCE CHARACTERS 1, 21 imaging means, 2 amplifying means, 3 analog-to-digital converter (ADC), 4 direct current component (DC) reproducing means, 5 white balance (WB) means, 6 spectral sensitivity characteristic correction means, 67 matrix operation means, 611-639 multiplying means, 641, 642, 643 adding means, 7 gamma (γ) correction means, 8, 28 brightness and color difference signal generating means, 9 integrating means, 12 dividing means, 13 coefficient generating means, 14 adding means, 15 decision means, 16 specific matrix generating means, 17 selection means, 18 coefficient generating means, 21 lens, 22 imaging element, 22r imaging element receiving red light, 22g imaging element receiving green light, 22b imaging element receiving blue light, 23 color filter, 25 dichroic prism, 31 shutter button, 32 shutter driving means, 33 display driving means, 34 viewfinder, 35 image compression means, 36 writing means, 37 recording medium, 102 color signal generating means, 104 spectral sensitivity correction means, 106 coefficient setting means, 108 image signal processing means, 111 imaging means, 112 amplifying means, 113 ADC, 114 DC reproducing means, 115 white balancing means, 116 gamma correction means, 117 brightness and color difference signal generating means, 118 white balancing means, 119 adjustment matrix operation means, 122 imaging element, 131r, 131g, 131b amplifying means, 132 integrating means, 133 dividing means, 134 gain control means, 141 identification signal generating means, 142 color identifying means, 143 coefficient deciding means, 151r, 151g, 151b amplifying means, 152 integrating means, 153 dividing means, 154 gain control means, 201 lens, 202 NIR-BCF, 203 imaging element, 204 amplifying means, 205 analog-to-digital converter, 206 DC reproducing means, 207 integrating means, 208 dividing means, 209 reciprocal calculation means, 210 white balancing means, 211, 221, 231, 241 color signal correction means, 212 gamma correction means, 213, 233, 243 YCrCb conversion means, 221a, 231a, 233a, 245a memory means, 221b, 231b, 233b, 245b selection means, 234 switch, 235, 245 control means, 236 switching means.

BEST MODE OF PRACTICING THE INVENTION

Embodiment A1

FIG. 1 is a schematic block diagram showing an imaging device according to embodiment A1 of this invention. As shown, this imaging device includes an imaging means 1, an amplifying means 2, an analog-to-digital converter (ADC) 3, a direct current reproducing means (DC reproducing means) 4, a white balancing means 5, a spectral sensitivity characteristic correction means 6, a gamma (γ) correction means 7, and a brightness and color difference signal generating means 8.

Figure 2:
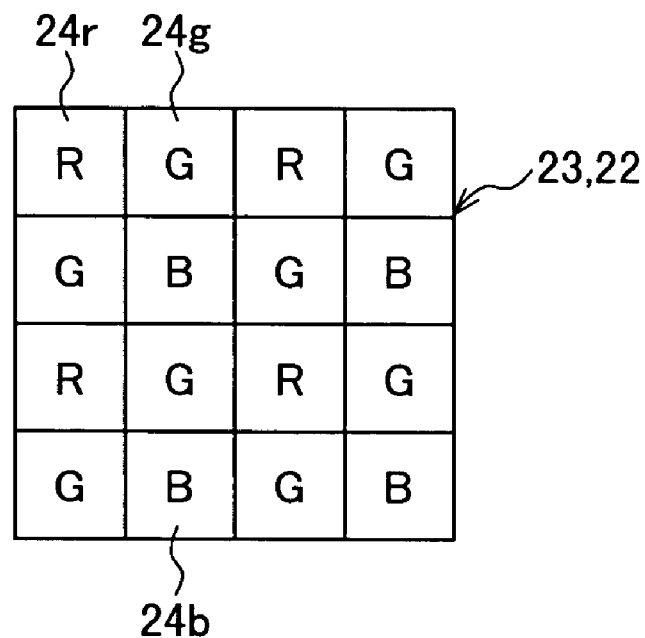
FIG. 2 shows the arrangement of color filters on the imaging element 22 in the imaging means 1 of the imaging device in FIG. 1.
Figure 3:
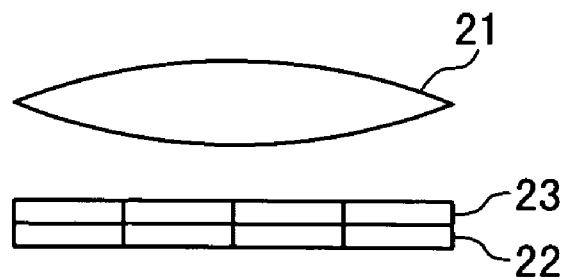
FIG. 3 shows the arrangement of the imaging element 22, color filters, and optical system.

The imaging means 1 has, as shown in FIGS. 2 and 3, for example, a lens 21, an imaging element 22 having a plurality of photoelectric conversion elements disposed in a two-dimensional array, and color filters 23 used as a color separation means.

The plurality of photoelectric conversion elements of the imaging element 22 are covered by color filters 23 having spectral transmittances corresponding to the three primary colors red (R), green (G), and blue (B) disposed in a Bayer array as shown in FIG. 2, for example.

Light incident from lens 21 is focused on the photoreceptive surface of the imaging element 22. As the imaging element 22 is covered by color filters 23 as described above, color components corresponding to the spectral transmittances of the color filters 23, that is, red, green, and blue analog image signals R1, G1, and B1, are output from the photoelectric conversion elements.

The red, green, and blue analog signals (which may be referred to as the R signal, G signal, and B signal, respectively) output from the imaging means 1 are amplified by the amplifying means 2. The image signals R2, G2, and B2 output from the amplifying means 2 are converted to digital signals by the ADC 3. The direct current levels of the converted digital image signals R3, G3, and B3 are reproduced by the DC reproducing means 4. Direct current reproduction is usually carried out so that the black level of the image signal is zero; this is done by a DC shift of the offset level before the analog-to-digital conversion by the ADC 3, or by a clamping process.

The integrating means 9 integrates the red, blue, and green signals R4, G4, and B4 output from the DC reproducing means 4 over a plurality of pixels, e.g., over an entire screen, and obtains integrated values ΣR of the red signal, ΣG of the green signal, and ΣB of the blue signal.

The white balancing (WB) means 5 has three amplifying means (not shown) for amplifying the red, green, and blue signals; the white balancing means 5 receives the red, green, and blue signals from the DC reproducing means 4, receives the integrated values ΣR4, ΣG4, and ΣB4 from the integrating means 9, and performs a process that equalizes the values of the red, green, and blue signals of the white areas of the subject (in other words, makes the white areas achromatic) according to the imaging conditions of the image signal. Normally, based on Evans' principle that the colors of ordinary subjects integrated over all pixels in a screen become achromatic, the white balancing means 5 adjusts the white balance by changing the gains of the three amplifying means so as to make the integrated values (ΣR4, ΣG4, and ΣB4 in the example shown) equal.

The imaging means 1, amplifying means 2, ADC 3, DC reproducing means 4, white balancing means 5 and integrating means 9 described above constitute a color signal generating means 20 for receiving incident light and outputting red, green, and blue color signals corresponding to the incident light.

The spectral sensitivity characteristic correction means 6 receives the red, green, and blue signals R5, G5, and B5 output from the white balancing means 5 after white balance adjustment, and performs the matrix calculation described below on the signal values to output color signals R6, G6, and B6 corrected for effects on color reproducibility due to sensitivity characteristics of the imaging means 1 in the near infrared region.

The gamma correction means 7 performs a nonlinear transformation of the image signals R6, G6, and B6 output from the spectral sensitivity characteristic correction means 6.

The brightness and color difference signal generating means 8 converts the red, green, and blue signals R7, G7, and B7 output from the gamma correction means 7 to a brightness signal (Y signal) and two color difference signals (Cr signal and Cb signal). The brightness and color difference signal generating means 8 carries out this conversion (YCrCb conversion) by performing a linear matrix calculation given by equation (A2) below, using a three-row-by-three-column coefficient matrix, to generate the Y, Cr, and Cb signals.

$$\begin{pmatrix} Y \\ Cr \\ Cb \end{pmatrix} = \begin{pmatrix} y1 & y2 & y3 \\ cr1 & cr2 & cr3 \\ cb1 & cb2 & cb3 \end{pmatrix} \begin{pmatrix} R7 \\ G7 \\ B7 \end{pmatrix} \quad (A2)$$

The coefficients in the three-row-by-three-column matrix in equation (A2) are set to, for example, the values specified in standard 61966-2-1 of the International Electrotechnical Commission (IEC): y1=0.2990, y2=0.5870, y3=0.1140, cr1=0.5000, cr2=−0.4187, cr3=−0.0813, cb1=−0.1687, cb2=−0.3313, and cb3=0.5000.

The structure and principle of the spectral sensitivity characteristic correction means 6 will now be described.

The spectral sensitivity characteristic correction means 6 corrects for the response characteristics of the color signal generating means in the near infrared region, making the total characteristics of the color signal generating means 20 and the spectral sensitivity characteristic correction means 6 approximate the human chromatic curves, or spectral sensitivity curves obtained by a linear transformation thereof.

Figure 4:
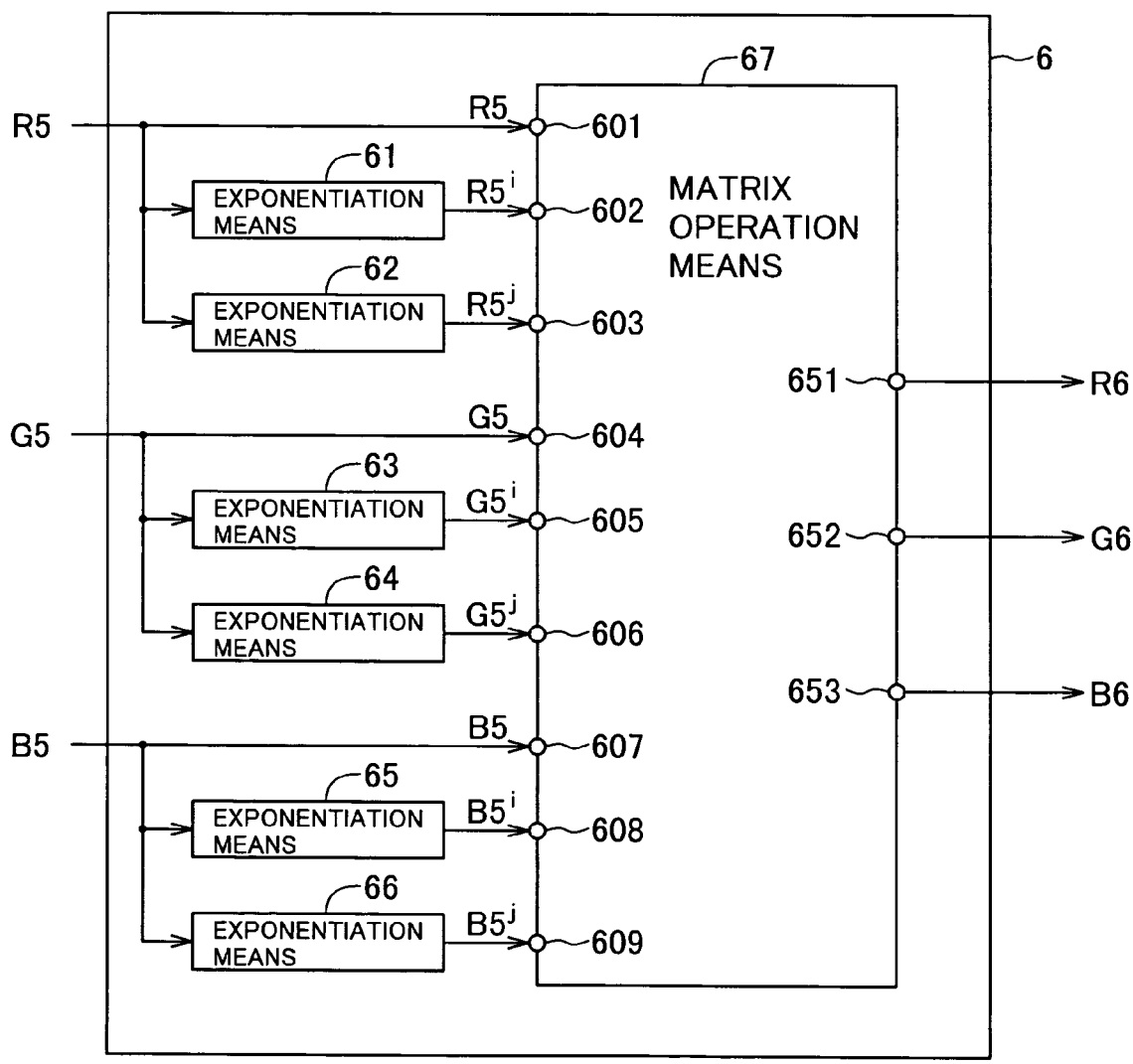
FIG. 4 shows the structure of the spectral sensitivity characteristic correction means in FIG. 1.

FIG. 4 is a schematic block diagram of the structure of the spectral sensitivity characteristic correction means 6. The red, green, and blue color signals R5, G5, and B5 output from the white balancing means 5 are input to the spectral sensitivity characteristic correction means 6. The spectral sensitivity characteristic correction means 6 has exponentiation means (61, 62, 63, 64, 65, 66) for raising the input signals to a power, and a three-row-by-nine-column matrix operation means 67 for multiplying each input signal by predetermined coefficients and adding the results.

Exponentiation means 61, 63, and 65 raise the input signals to a power with a real number (i) less than unity as exponent, and their outputs are values equal or proportional to the i-th power of the input values; exponentiation means 62, 64, and 66 raise the input signals to a power with a real number (j) greater than unity as exponent, and their outputs are values equal or proportional to the j-th power of the input values. Specifically, the three exponentiation means 61, 63, and 65 each have similar input-output characteristics; if x represents the input signal, y represents the output signal, and MAX represents the maximum possible value, the relationship between x and y is as follows:

$$(y/\text{MAX}) = (x/\text{MAX})^i$$

When x and y are eight-bit numbers, the value of MAX is:

$$2^8 - 1 = 255$$

The three exponentiation means 62, 64, and 66 each have similar input-output characteristics; if x represents the input signal, z represents the output signal, and MAX represents their maximum possible value, then x and z are related as follows:

$$(z/\text{MAX}) = (x/\text{MAX})^j$$

When x and y are eight-bit numbers, the value of MAX is:

$$2^8 - 1 = 255$$

For simplicity, in the following description, the outputs from the exponentiation means with R5, G5, and B5 as inputs are denoted $R5^i$, $R5^j$, $G5^i$, $G5^j$, $B5^i$, and $B5^j$.

Red signal R5 is directly input to input terminal 601 of the matrix operation means 67, and is also input to exponentiation means 61 and 62, and their outputs ($R5^i$ and $R5^j$) are input to input terminals 602 and 603 of the matrix operation means 67.

Similarly, green signal G5 is directly input to input terminal 604 of the matrix operation means 67, and is also input to exponentiation means 63 and 64, and their outputs ($G5^i$ and $G5^j$) are input to input terminals 605 and 606 of the matrix operation means 67.

Similarly, blue signal B5 is directly input to input terminal 607 of the matrix operation means 67, and is also input to exponentiation means 65 and 66, and their outputs ($B5^i$ and $B5^j$) are input to input terminals 608 and 609 of the matrix operation means 67.

The matrix operation means 67 performs a matrix multiplication calculation using a three-row-by-nine-column coefficient matrix; the matrix operation means 67 performs a matrix calculation using a three-row-by-nine-column coefficient matrix to generate red, green, and blue color signals R6, G6, and B6. The red, green, and blue signals R6, G6, and B6 are output from terminals 651, 652, and 653, respectively.

The matrix operation means 67 performs, for example, the following matrix calculation (A1).

$$\begin{pmatrix} R6 \\ G6 \\ B6 \end{pmatrix} = \begin{pmatrix} r1 & r2 & r3 & r4 & r5 & r6 & r7 & r8 & r9 \\ g1 & g2 & g3 & g4 & g5 & g6 & g7 & g8 & g9 \\ b1 & b2 & b3 & b4 & b5 & b6 & b7 & b8 & b9 \end{pmatrix} \begin{pmatrix} R5 \\ G5 \\ B5 \\ R5^i \\ G5^i \\ B5^i \\ R5^j \\ G5^j \\ B5^j \end{pmatrix} \quad (A1)$$

In equation (A1), r1 to r9, g1 to g9, b1 to b9 are predetermined coefficients.

Constants i and j and coefficients r1 to r9, g1 to g9, and b1 to b9 are determined so that the total characteristics of the color signal generating means 20 and the spectral sensitivity characteristic correction means 6 approximate human chromatic curves, or spectral sensitivity curves obtained by a linear transformation thereof, and correct for the response characteristics of the color signal generating means in the near infrared region.

Figure 5:
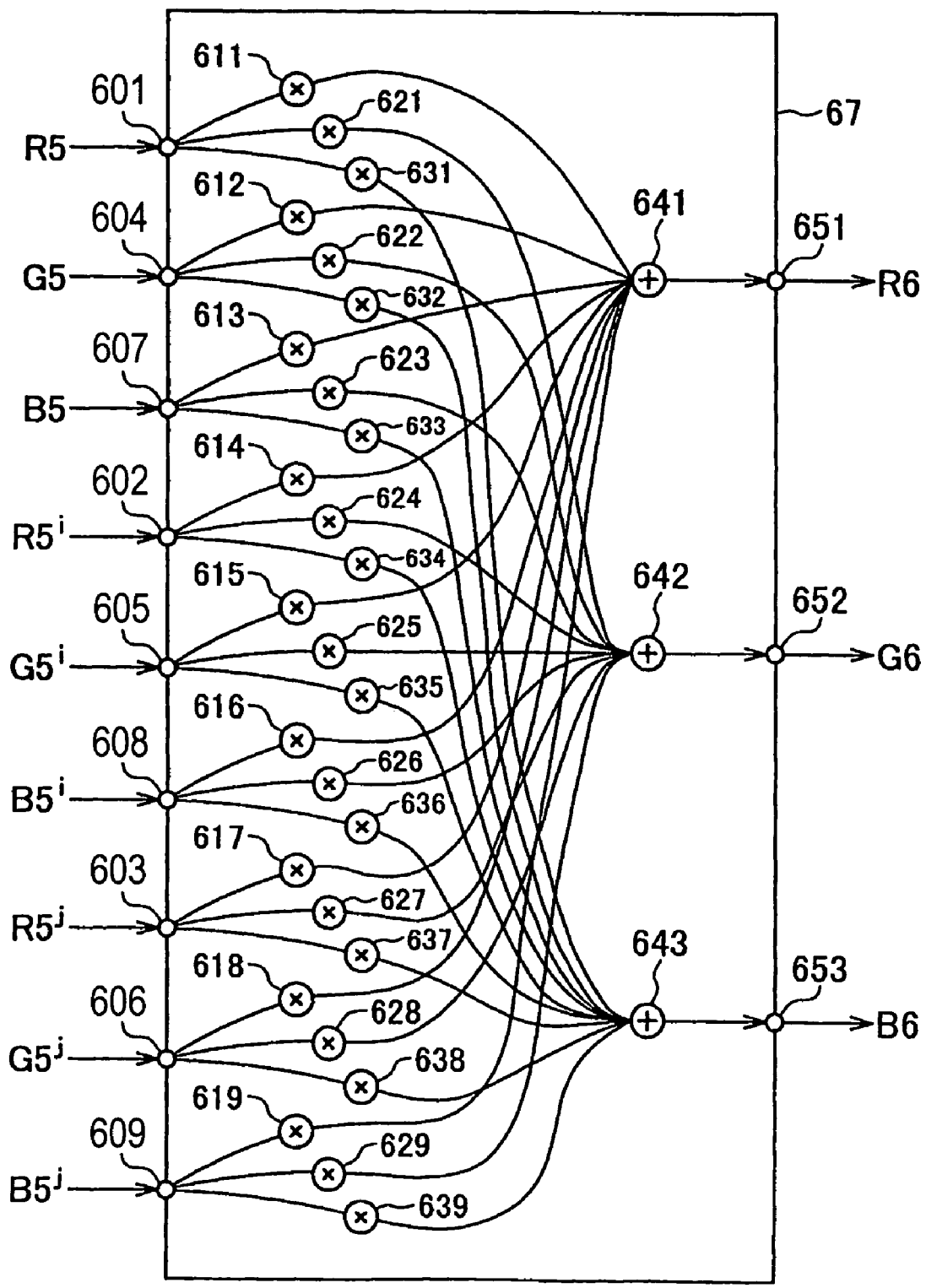
FIG. 5 shows the structure of the three-row-by-nine-column matrix operation means in FIG. 4.

The matrix operation means 67 is structured, for example, as shown in FIG. 5. As shown, the matrix operation means 67 comprises twenty-seven multiplying means 611-619, 621-629, 631-639 and three adding means 641, 642, 643.

Multiplying means 611 to 619 multiply the signals R5, G5, B5, $R5^i$, $G5^i$, $B5^i$, $R5^j$, $G5^j$, and $B5^j$ input to terminals 601, 604, 607, 602, 605, 608, 603, 606, and 609, respectively, by predetermined coefficients r1, r2, r3, r4, r5, r6, r7, r8, and r9, and output the resulting products to adding means 641. Adding means 641 calculates the sum of the inputs and outputs the result as signal R6.

Multiplying means 621 to 629 multiply the signals R5, G5, B5, $R5^i$, $G5^i$, $B5^i$, $R5^j$, $G5^j$, and $B5^j$ input to terminals 601, 604, 607, 602, 605, 608, 603, 606, and 609, respectively, by predetermined coefficients g1, g2, g3, g4, g5, g6, g7, g8, and g9, and output the resulting products to adding means 642. Adding means 642 calculates the sum of the inputs and outputs the result as signal G6.

Multiplying means 631 to 639 multiply the signals R5, G5, B5, $R5^i$, $G5^i$, $B5^i$, $R5^j$, $G5^j$, and $B5^j$ input to terminals 601, 604, 607, 602, 605, 608, 603, 606, and 609, respectively, by predetermined coefficients b1, b2, b3, b4, b5, b6, b7, b8, and b9, and output the resulting products to adding means 643. Adding means 643 calculates the sum of the inputs and outputs the result as signal B6.

An exemplary matrix calculation means for realizing the calculation given by equation (A1) was shown in FIG. 5; similar effects may be obtained by using calculation means with different structures to realize the calculation in equation (A1).

Coefficients used by multiplying means 611 to 639 of the matrix operation means 67 are determined in the following way.

First, the principle of correction by the spectral sensitivity characteristic correction means 6 of the present invention will be described.

Figure 6:
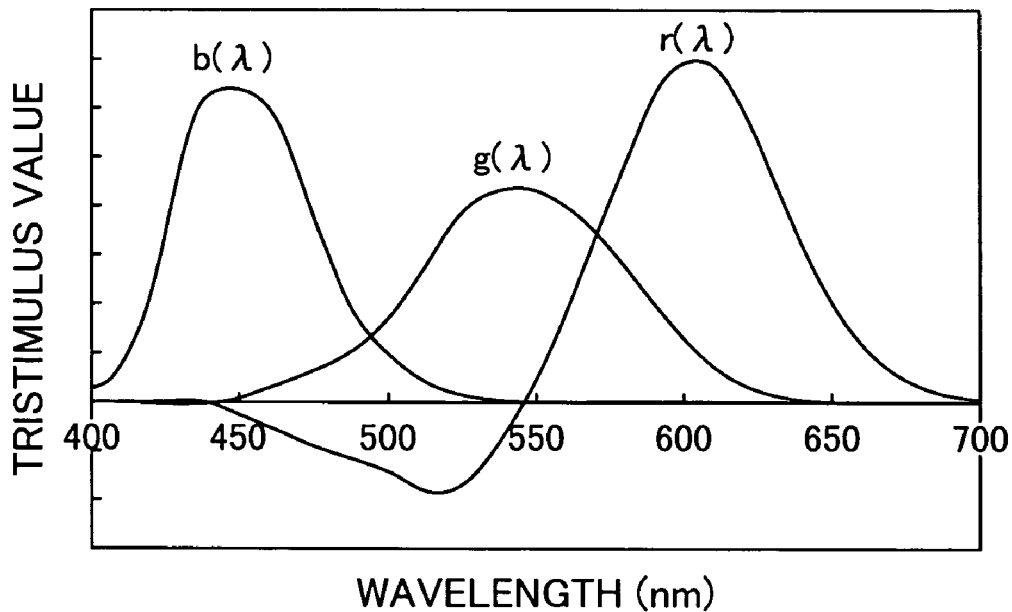
FIG. 6 shows the color-matching functions shown in CIE 1931.

FIG. 6 shows spectral sensitivity curves expressing human chromatic characteristics. The curves in FIG. 6 represent mean values of the color-matching functions of people with normal color vision, as specified by the Commission Internationale de l'Eclairage (CIE) in 1931. When chromatic adaptability is not taken into account, color perceived by humans may be expressed in a simplified manner using values obtained by multiplying the red, green, and blue spectral sensitivity curves (color-matching functions) shown in FIG. 6, the spectral reflectance characteristics of the subject, and the spectral characteristics of the illumination, and integrating the resulting products in the visible spectral region. As shown in FIG. 6, human sensitivity curves show sensitivity only in the so-called visible spectral region from 380 nm to 780 nm, and there is barely any sensitivity at wavelengths longer than 700 nm.

On the other hand, the imaging means 1 has photodiodes for performing photoelectric conversion formed of semiconductors such as silicon (Si) so that it is sensitive from the visible spectral region to the near infrared region (around 1000 nm). Thus, when the imaging means 1 is provided with red, green, and blue color filters 23 for resolving different colors, red, green, and blue signals corresponding to the products of the spectral curves of the color filters and the sensitivity curves of the photodiodes are output from the imaging means 1.

Figure 7:
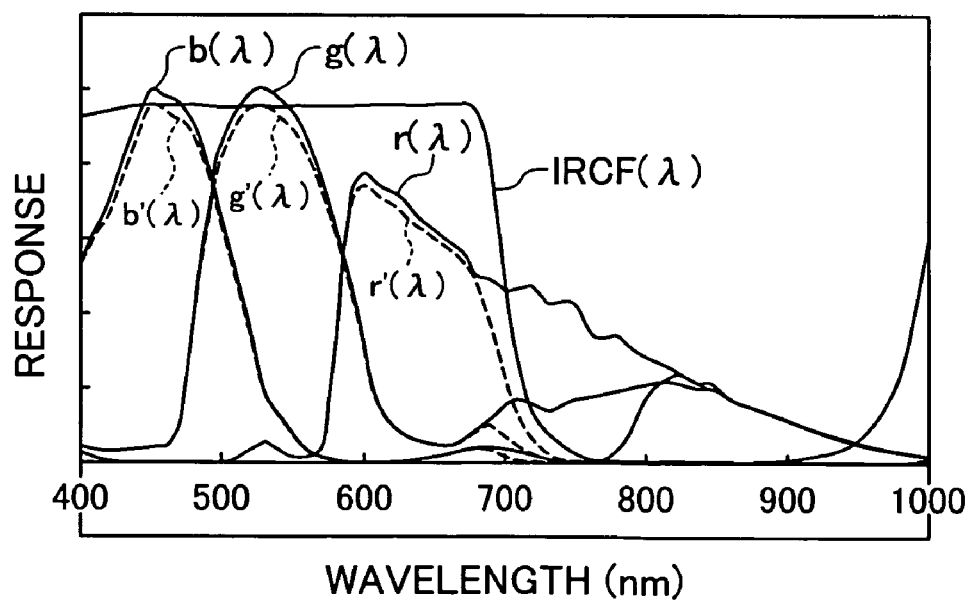
FIG. 7 shows the spectral sensitivity curves of the imaging means and an IRCF and their products.

Spectral sensitivity curves $r(\lambda)$, $g(\lambda)$, and $b(\lambda)$ of the red, green, and blue signals of the imaging means 1 are indicated by solid lines in FIG. 7. As shown in FIG. 7, the red color filter has a comparatively high transmittance in the near infrared region, and thus allows near infrared rays into the imaging element 22. The blue color filter that passes blue light and the green color filter that passes green light also have a certain transmittance in the near infrared region. This is because the red, green, and blue filters are usually constructed using dyes or pigments containing the respective colors, and the spectral transmittances of the filters depend on their constituent materials; their transmittance curves become comparatively high again from the longer wavelength side of the visible spectral region into the near infrared region.

The red, green, and blue spectral sensitivity curves $r(\lambda)$, $g(\lambda)$, and $b(\lambda)$ of the imaging means 1 indicated by solid lines in FIG. 7 differ from the color-matching functions shown in FIG. 6, and because the difference is significant particularly in the near infrared region, a conventional imaging device has an infrared cut filter (IRCF) placed in front of the imaging element to block near infrared rays. The spectral transmittance curve $IRCF(\lambda)$ of the IRCF is also indicated by a solid line in FIG. 7. The $IRCF(\lambda)$ curve is multiplied by the red, green, and blue spectral sensitivity curves ($r(\lambda)$, $g(\lambda)$, and $b(\lambda)$) to obtain spectral sensitivity curves $r'(\lambda)$, $g'(\lambda)$, and $b'(\lambda)$ of the respective colors corresponding to the red, green, and blue signals of a conventional imaging means 1 equipped with an IRCF; the curves thus obtained are indicated by dashed lines in FIG. 7.

Even when a conventional imaging device has the spectral sensitivity curves indicated by dashed lines in FIG. 7, since the negative characteristics shown in FIG. 6 cannot be realized, color correction is carried out by performing a matrix calculation by multiplying the red, green, and blue signals obtained from the imaging means by a three-row-by-three-column coefficient matrix, as given by equation (A3).

$$\begin{pmatrix} Ro \\ Go \\ Bo \end{pmatrix} = (3 \times 3) \begin{pmatrix} Ri \\ Gi \\ Bi \end{pmatrix} \quad (A3)$$

However, when an IRCF is not used, color reproducibility is greatly affected by the output signal due to sensitivity to near infrared light, so good color reproducibility cannot be obtained just by performing a linear matrix calculation with the three-row-by-three-column coefficient matrix described above. The present invention realizes good color reproducibility by use of differences in the near infrared region between the red, green, and blue spectral sensitivity curves $r(\lambda)$, $g(\lambda)$, and $b(\lambda)$ of the imaging means 1 when an IRCF is not used, indicated by solid lines in FIG. 7.

Figure 8:
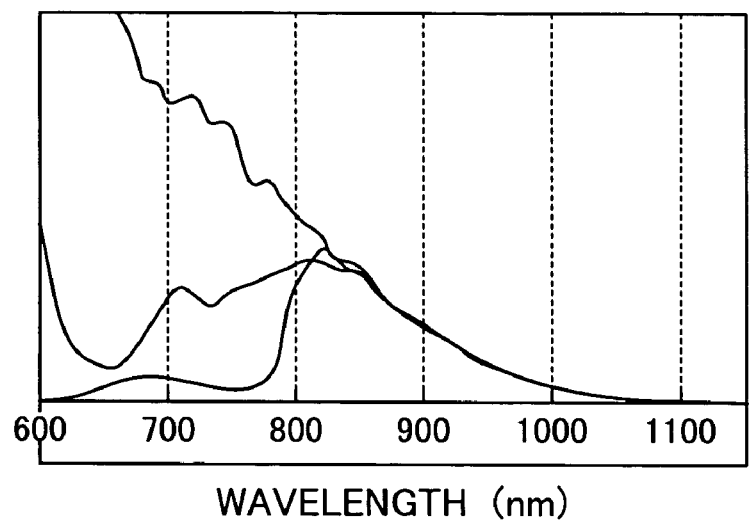
FIG. 8 is an enlarged diagram of the near infrared region of the spectral sensitivity curves shown in FIG. 7.

FIG. 8 is an enlarged diagram of the near infrared region of the spectral sensitivity curves shown in FIG. 7. The combined spectral sensitivity curves of the red, green, and blue filters and photodiodes come together in the region from substantially 850 nm to 860 nm, and then attenuate together as the wavelength increases. The green spectral sensitivity curve attenuates until substantially 650 nm, then rises back to a peak at substantially 850 nm, after which it attenuates again. The blue spectral sensitivity curve begins rising at substantially 760 nm, peaks at the same wavelength of substantially 850 nm, and then attenuates gradually in the longer wavelength region.

Because of the illustrated differences between the red spectral sensitivity curve $r(\lambda)$, the green spectral sensitivity curve $g(\lambda)$, and the blue spectral sensitivity curve $b(\lambda)$ in the region from substantially 650 nm to 800 nm, it is possible to perform red, green, and blue color separation in the near infrared region by use of these differences to correct for the effects of near infrared rays on color reproducibility.

Specifically, a nonlinear calculation is included in the matrix calculation.

Figure 9:
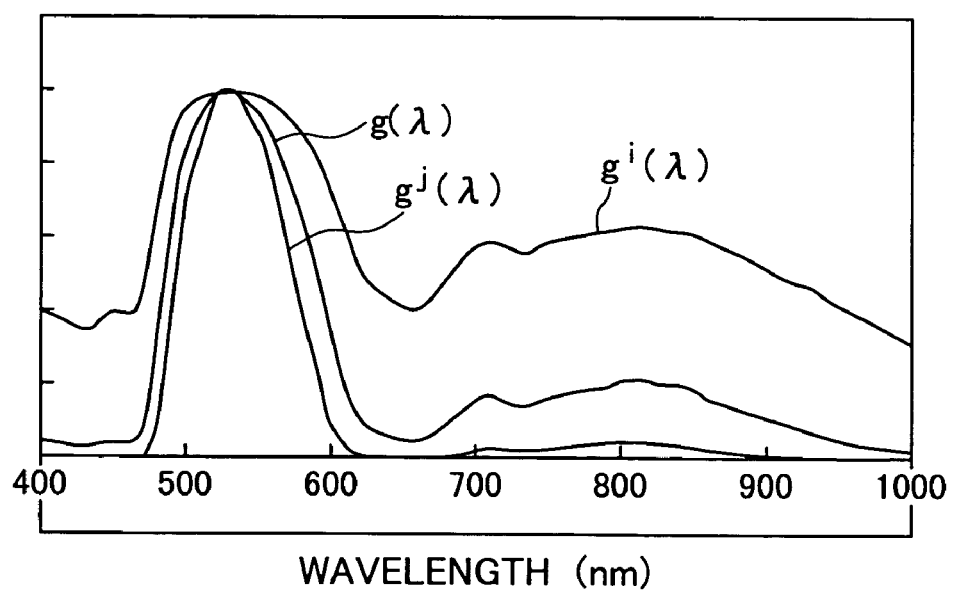
FIG. 9 illustrates nonlinear transformations of the $g(\lambda)$ spectral sensitivity curve of the imaging means.

By way of example, the green spectral sensitivity curve $g(\lambda)$ is shown in FIG. 9. In FIG. 9, curve $g^i(\lambda)$ represents values obtained by raising the green spectral sensitivity curve to the three-tenths power (i=0.3), for example, and then normalizing to the maximum value; curve $g^j(\lambda)$ represents values obtained by raising the green spectral sensitivity curve to the second power (j=2), for example, and normalizing to the maximum value. As shown in FIG. 9, when the curve is raised to a power less than unity, there is less difference in sensitivity between the spectral sensitivity curve in the unnecessary near infrared region and the spectral sensitivity curve in the necessary visible spectral region; when the curve is raised to a power greater than unity, there is a greater difference in sensitivity between the spectral sensitivity curve in the unnecessary near infrared region and the spectral sensitivity curve in the necessary visible spectral region. Therefore, by means of a nonlinear matrix calculation including raising the curves to a power with a value greater than unity as exponent and raising the curves to a power with a value less than unity as exponent, it is possible to perform appropriate color correction and obtain good color reproducibility even in the presence of infrared incident light in the infrared region.

The term color reproducibility as used herein refers to making colors substantially match the colors perceived by the human eye, and to reproducing colors such that colors perceived as different become different colors, and colors perceived as the same become the same color.

For example, the coefficients r1 to r9, g1 to g9, and b1 to b9 and constants i and j used in the above matrix calculation may be determined so that the total characteristics of the corrections performed in the color signal generating means 20 and the spectral sensitivity characteristic correction means 6 approximate the CIE 1931 color matching functions or color matching functions obtained by a linear transformation of the CIE 1931 color matching functions.

In the above embodiment, the exponentiation means (61, 62, 63, 64, 65, 66) of the spectral sensitivity characteristic correction means may comprise a look-up table (LUT) with a power relationship between input and output.

Though an ADC 3 was included in the above embodiment and the calculations in the subsequent steps were carried out by digital signal processing, similar effects may be obtained by use of analog signal processing.

When the processes are carried out on analog signals, the processing circuitry may include amplifying means with a gain that varies according to the input signal-level in such a way as to output values that approximate values raised to a power. This type of circuitry can be realized, for example, by a circuit combining transistors and operational amplifiers.

In the description of the above embodiment, the imaging means 1 was a single-element type having a single imaging element 22, and color separation was carried out by use of color filters 23.

Figure 10:
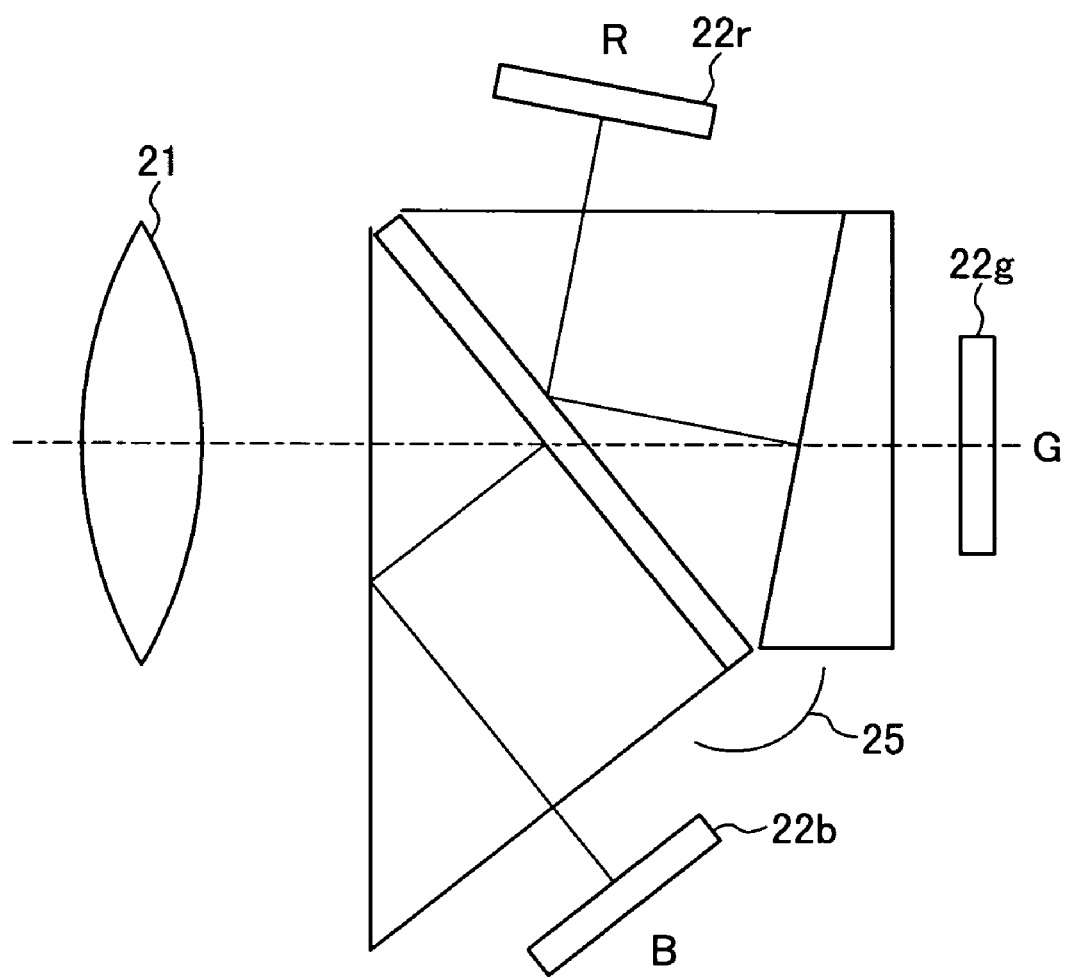
FIG. 10 shows the structure of the optical system of a three-chip imaging element.

Alternatively, as shown in FIG. 10, it is possible to use an imaging means 1 having three imaging elements 22r, 22g, and 22b, in which color separation is carried out by use of a dichroic prism 25 mounted in front of the imaging elements 22r, 22g, and 22b and behind the lens 21; the resulting red, green, and blue light is received by the imaging elements 22r, 22g, 22b, respectively, and red, green, and blue signals are obtained from the imaging elements 22r, 22g, and 22b.

In the above embodiment, good color reproducibility is obtained without using an IRCF, and by performing a nonlinear matrix calculation, it is possible to approximate the color matching condition with high precision and obtain good color reproducibility.

Embodiment A2

Figure 11:
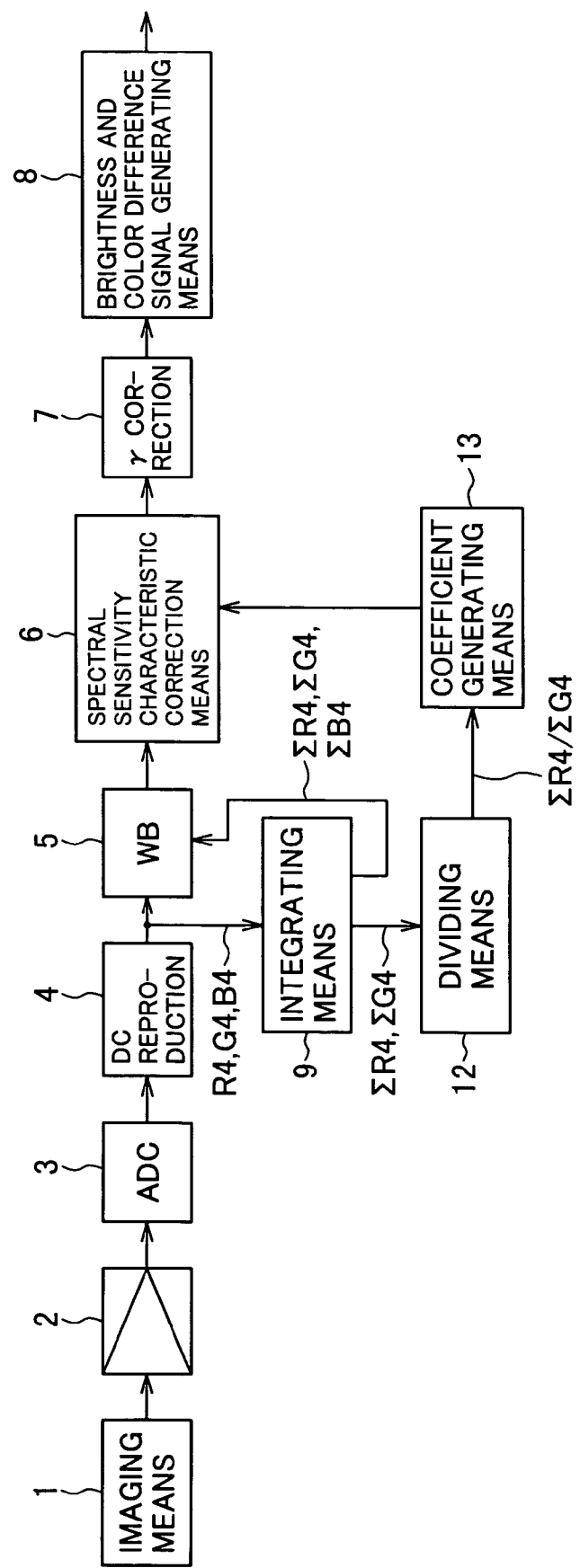
FIG. 11 is a diagram of the imaging device in embodiment A2 of this invention.

FIG. 11 is a schematic block diagram showing an imaging device according to embodiment A2 of this invention. In FIG. 11 and FIG. 1, similar reference characters denote similar elements. This imaging device differs from the one shown in FIG. 1 in that the internal details of the spectral sensitivity characteristic correction means 6 are different, and a dividing means 12 and a coefficient generating means 13 are further provided.

The spectral sensitivity characteristic correction means 6 in FIG. 11 is similar to the spectral sensitivity characteristic correction means 6 in FIG. 6 except that the matrix coefficients r1 to r9, b1 to b9, and g1 to g9 used in the matrix calculation by the matrix operation means 67 are not constants but variables with values supplied from the coefficient generating means 13.

The dividing means 12 in FIG. 11 receives the integrated value $\Sigma G4$ of the green signal and the integrated value $\Sigma R4$ of the red signal or $\Sigma B4$ of the blue signal from the integrating means 9, and calculates and outputs the integrated value ratio $\Sigma R4/\Sigma G4$ or $\Sigma B4/\Sigma G4$. In the drawing, the dividing means 12 receives the integrated values $\Sigma R4$ of the red signal and $\Sigma G4$ of the green signal and calculates the ratio $\Sigma R4/\Sigma G4$ of these integrated values.

Based on the ratio output from the dividing means 12, the coefficient generating means 13 determines the coefficients.

The coefficient generating means 13 may calculate and output coefficients according to the ratio of the integrated values obtained by the dividing means 12, or it may have several prestored sets of constants from which it selects and outputs the optimal values according to the ratio.

The matrix operation means 67 (FIG. 4) of the spectral sensitivity characteristic correction means 6 in FIG. 11 performs a matrix calculation using the coefficients output from the coefficient generating means 13.

The significance of changing the coefficients used by the matrix operation means 67 will now be explained.

The red, green, and blue signals R1, G1, and B1 output from the imaging means 1 are obtained by multiplying the spectral reflectance characteristics of the subject, the spectral characteristics of the illumination, and the spectral sensitivity characteristics of the imaging means 1, and so their spectral characteristics change according to the illumination used when the image is captured. The color reproducibility of the imaging device will therefore vary depending on the illumination (if no correction is made).

The spectral sensitivity curves (color matching functions) of the imaging device normally need not match the human spectral sensitivity curves completely as long as they satisfy the Luther condition, according to which they are a linear transformation of the human spectral sensitivity curves.

The spectral sensitivity curves of the imaging means 1 usually differ from human spectral sensitivity curves even when an IRCF is mounted. A conventional imaging device obtains good color reproducibility under specific types of typical illumination by adjusting the colors with matrix calculation means so that they approximate the colors perceived by the human eye, using the three-row-by-three-column coefficient matrix given by equation (A3) above; however, as the spectral sensitivity curves of the imaging means 1 and the human eye do not match, the color reproducibility of the imaging device naturally varies depending on the illumination of the subject. When colors are reproduced accurately only under specific illumination conditions, it is referred to as a conditional color match.

Nevertheless, the spectral sensitivity curves $r'(\lambda), g'(\lambda),$ and $b'(\lambda)$) (indicated by dashed lines in FIG. 7) obtained by multiplying spectral curves $r(\lambda), g(\lambda),$ and $b(\lambda)$ (indicated by solid lines in FIG. 7) by the IRCF spectral curve, for example, do not differ greatly from human spectral sensitivity curves, so color reproducibility is not greatly disrupted by changes in illumination, and since an imaging device is not required to have capabilities equal to a color measuring device, conventional commercial imaging devices are deemed acceptable.

Figure 12:
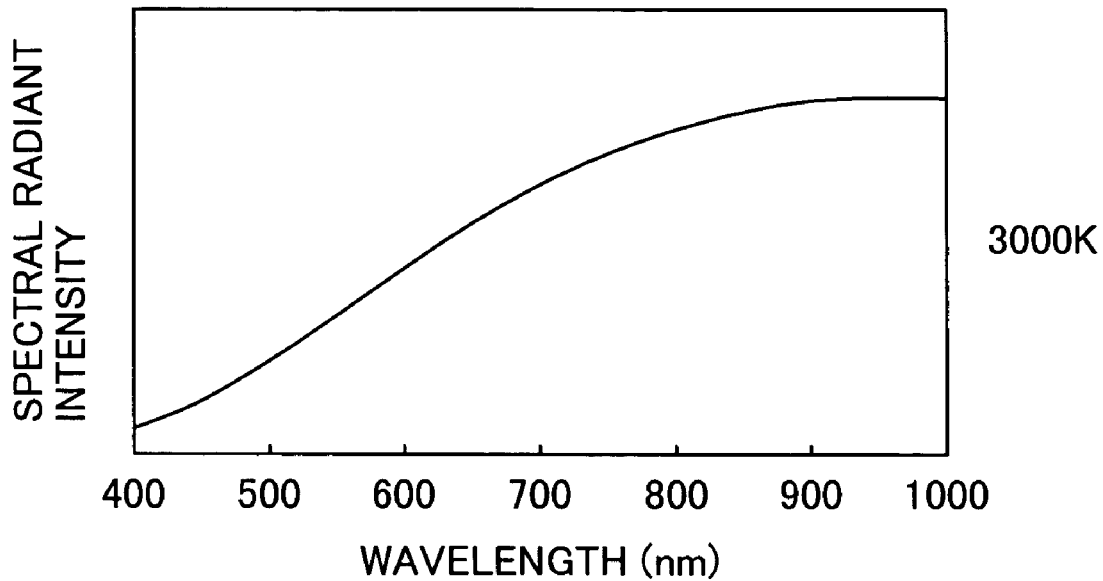
FIG. 12 shows the spectral curve of 3000-K black-body radiation.
Figure 13:
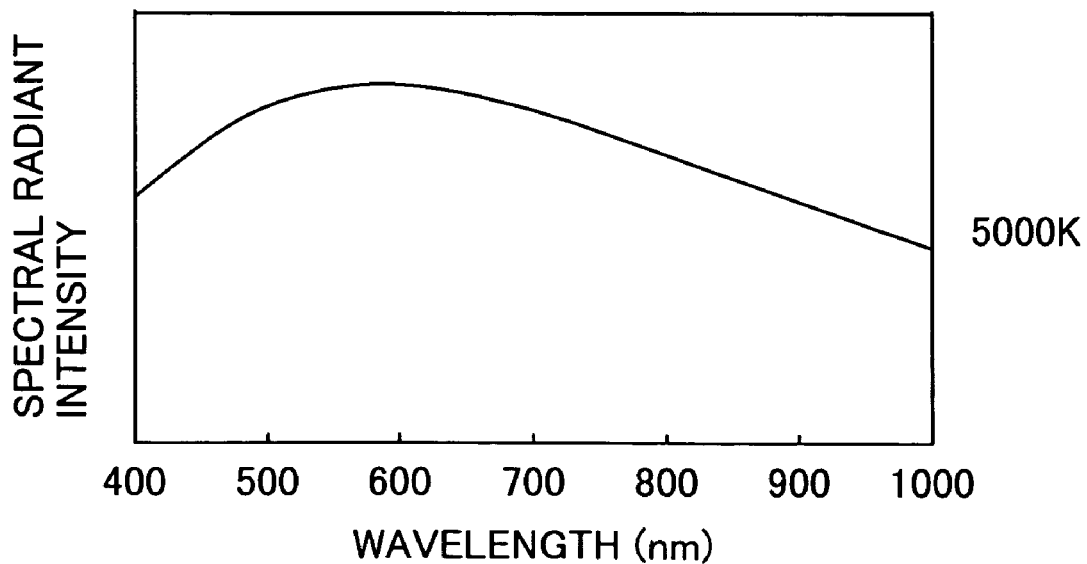
FIG. 13 shows the spectral curve of 5000-K black-body radiation.
Figure 14:
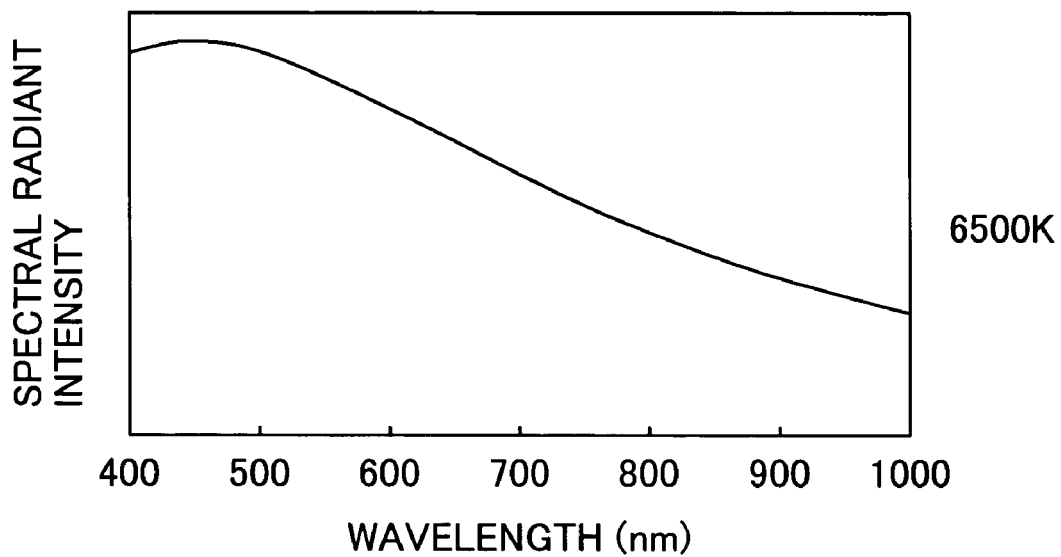
FIG. 14 shows the spectral curve of 6500-K black-body radiation.
Figure 15:
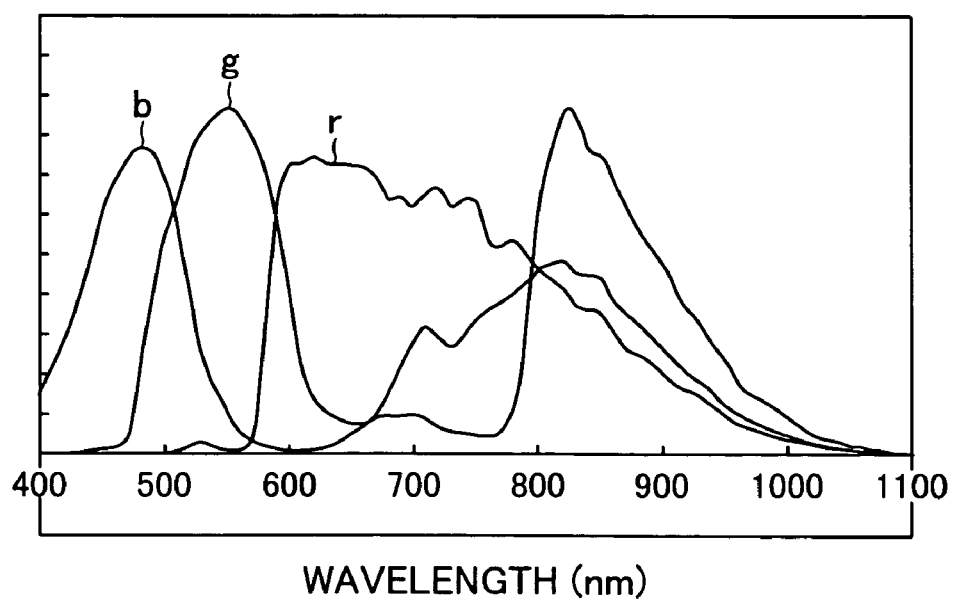
FIG. 15 shows the spectral sensitivity curves of the products of the spectral sensitivities of the imaging element and the 3000-K illumination.
Figure 16:
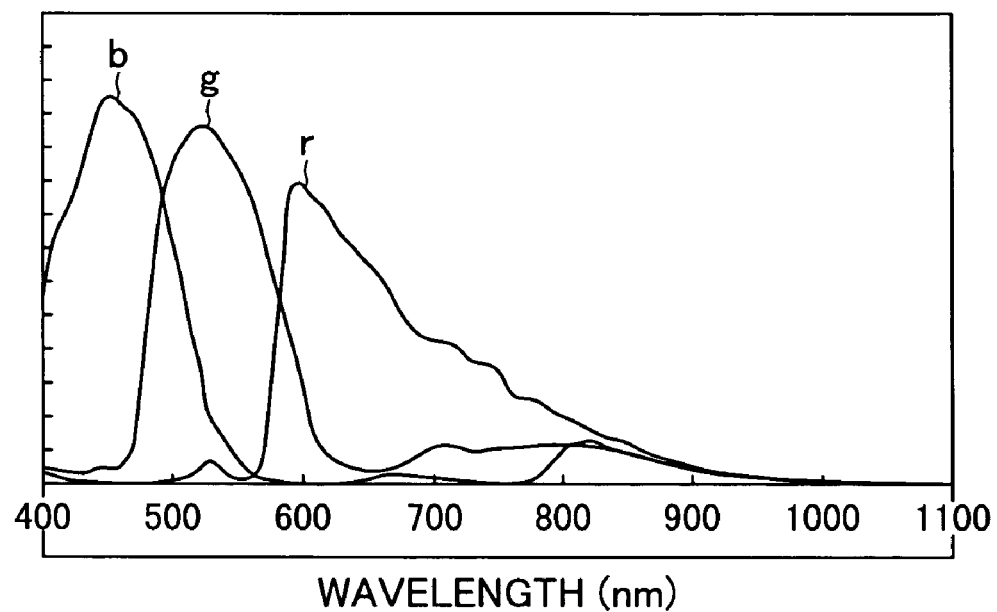
FIG. 16 shows the spectral sensitivity curves of the products of the spectral sensitivities of the imaging element and the 6500-K illumination.

In contrast, the imaging means 1 in this embodiment is not equipped with an IRFC and so has the spectral sensitivity curves indicated by solid lines in FIG. 7, which differ greatly from human spectral curves in the near infrared region. Color reproducibility therefore varies greatly depending on the illumination. By way of example, FIG. 12 shows the spectral curve of a light source with a color temperature corresponding to 3000-K black-body radiation. FIG. 13 shows the spectral curve of a light source with a color temperature corresponding to 5000-K black-body radiation. FIG. 14 shows the spectral curve of a light source with a color temperature corresponding to 6500-K black-body radiation. FIG. 15 shows the spectral sensitivity curves obtained by imaging a white subject with a flat spectral reflectance curve using the light source in FIG. 12 and adjusting the white balance so as to equalize the integrated areas of the red, green, and blue spectral sensitivity curves. FIG. 16 shows the spectral sensitivity curves obtained by imaging a white subject with a flat spectral reflectance curve using the light source in FIG. 14 and adjusting the white balance so as to equalize the integrated areas of the red, green, and blue spectral sensitivity curves. As shown, the spectral curves in FIG. 15 and FIG. 16 differ greatly, which means that color reproducibility also varies greatly between these two sets of spectral sensitivity curves. This demonstrates that color reproducibility varies greatly depending on the illumination.

Figure 17:
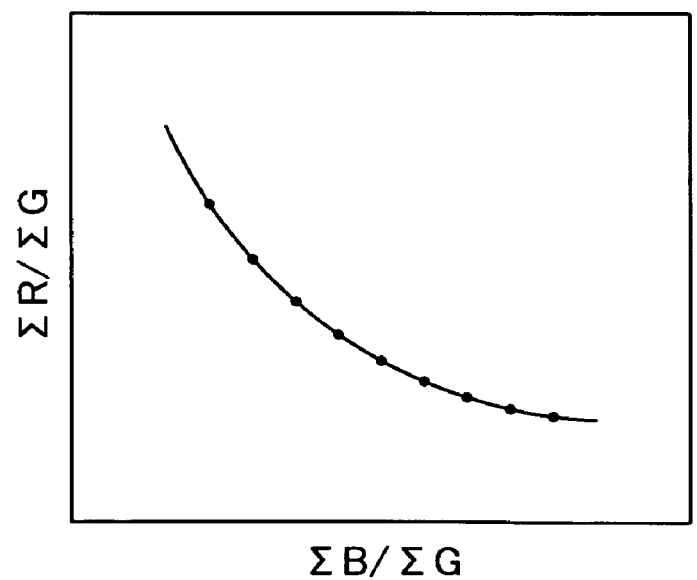
FIG. 17 shows the relationship between ratios of integrated red, green, and blue values.

Therefore, in the present embodiment, a dividing means 12 and a coefficient generating means 13 are provided to change the coefficients in the three-row-by-nine-column matrix of the spectral sensitivity characteristic correction means 6 according to the red and green or blue and green integrated values obtained from the integrating means 9. FIG. 17 shows the relationship between the ratios of integrated red, green, and blue values with a color temperature corresponding to black-body radiation with approximately the same color rendition properties as natural light such as sunlight. As shown in FIG. 17, there is an unambiguous relation between the ratios $\Sigma R/\Sigma G$ and $\Sigma B/\Sigma G$ of the integrated values.

Therefore, by calculating either $\Sigma R/\Sigma G$ or $\Sigma B/\Sigma G$, it becomes possible to estimate the color temperature of the light source and obtain appropriate matrix coefficients.

Figure 18:
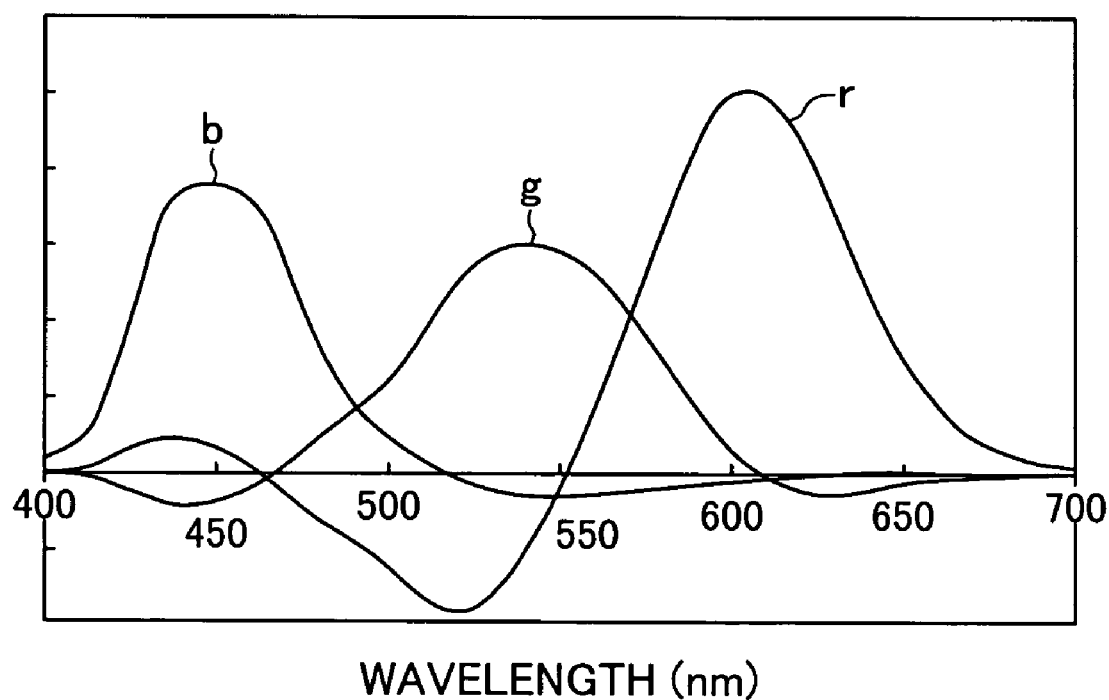
FIG. 18 shows spectral curves of sRGB (IEC 61966-9).

An exemplary method of obtaining appropriate matrix coefficients will now be described. An appropriate subject is the Macbeth Color Checker (registered trademark), which has twenty-four color patches, many of which represent natural colors specifically chosen to include colors that appeal to human memory (skin color, the green of foliage, the blue of the sky, etc.). An exemplary set of red, green, and blue spectral sensitivity curves that can be set as the color target is the sRGB color matching functions shown in FIG. 18, which are specified in standard 61966-2 of the International Electrotechnical Commission (IEC) and are used for color calibration between dissimilar devices.

The (known) spectral curves of various illumination sources with different color temperatures, such as the curves shown in FIGS. 12 and 14, the (known) sRGB color matching functions, and the (known) spectral reflectance curve of each color patch are multiplied, and the red, green, and blue values of each patch are integrated over the entire wavelength region and adjusted for white balance; the colors (the red, green, and blue values) of the patches thus obtained define the color reproducibility set as the color target.

The spectral sensitivity curves of the imaging means 1 indicated by solid lines in FIG. 7, the (known) spectral curves of various illumination sources with different color temperatures, e.g., the curves shown in FIGS. 12 to 14, and the (known) spectral reflectance curve of each color patch are multiplied together, the red, green, and blue values of the color patches are integrated over the entire wavelength region, and a matrix calculation is performed by the spectral sensitivity characteristic correction means 6; the coefficients in the three-row-by nine-column matrix used by the spectral sensitivity characteristic correction means 6 are chosen so that the red, green, and blue values thus obtained most closely approximate the red, green, and blue values set as the color target.

The closeness with which the red, green, and blue values obtained by the spectral sensitivity characteristic correction means 6 approximate the red, green, and blue values set as color targets is determined by use of the least squares method; that is, the sum of the squares of the differences of corresponding values is taken, and whether the sum has reached its minimum or not is decided.

Exemplary matrix coefficients obtained by the above method are shown in FIGS. 19 to 21. With i set to three-tenths (i=0.3) and j set to two (j=2.0), if the matrix coefficients are changed as shown according to the ratio $\Sigma R/\Sigma G$, good color reproducibility is consistently obtained for each type of illumination.

FIG. 22 shows an example of the color reproducibility obtained in this embodiment. The constants i and j are set to three-tenths and two, respectively (i=0.3, j=2.0). The color error $\Delta E^*ab$ (defined in Japanese Industrial Standard Z8730-1996) is the difference between the color of the color patches and the color-patch colors set as the color target. Error data are shown for the spectral sensitivity curves of the imaging means (indicated by solid lines in FIG. 7) without an IRCF, the spectral sensitivity curves of the imaging means multiplied by the IRCF curve to correct for sensitivity in the infrared region (indicated by dashed lines in FIG. 7), and the results of the matrix calculation performed by the spectral sensitivity characteristic correction means 6 in this embodiment.

The mean of the color error values of the twenty-four color patches of the Macbeth Color Checker is indicated as the mean value, and the maximum color error value among the twenty-four color patches is indicated as the maximum value. The matrix coefficients were selected so as to produce the minimum error as determined by the least squares method mentioned above. A smaller color error $\Delta E^*ab$ indicates closer proximity to the target color; when the value is zero, the colors match perfectly. A larger color error $\Delta E^*ab$ indicates that colors are reproduced with a greater difference from the target color.

It can be seen from the results in FIG. 22 that color reproducibility is greatly improved in this embodiment compared to the spectral sensitivity curves of the imaging means without an IRCF (indicated by solid lines in FIG. 7); moreover, even when compared to the imaging means with an IRCF, the color error $\Delta E^*ab$ is smaller, showing that substantially error-free color reproducibility is achieved in this embodiment.

Though relations between $\Sigma R/\Sigma G$ and the matrix coefficients are illustrated in FIGS. 19 to 21, since the ratio $\Sigma B/\Sigma G$ can be unambiguously derived from the ratio $\Sigma R/\Sigma G$, the same effect can be realized by obtaining the matrix coefficients from the ratio $\Sigma B/\Sigma G$.

In the above example, the integrating means 9 integrates the output of the DC reproducing means 4, but it is also possible to integrate the output of the ADC 3, or to integrate the output of the white balancing means 5.

In the above embodiment, the calculation in the dividing means 12 is carried out on the output of the integrating means 9, which originally obtains the integrated values $\Sigma R$, $\Sigma G$, and $\Sigma B$ for the purpose of the calculations performed in the white balancing means 5. The integrating means 9 accordingly forms a part of the color signal generating means 20 and also performs a role outside the role of the color signal generating means 20.

The dividing means 12 need only obtain one of the two ratios $\Sigma R/\Sigma G$ and $\Sigma B/\Sigma G$, so an integrating means different from the integrating means 9 may be provided in the dividing means 12, structured to obtain either the integrated values $\Sigma R$ of the red signal and $\Sigma G$ of the green signal or the integrated values $\Sigma B$ of the blue signal and $\Sigma G$ of the green signal.

According to the above embodiment, by changing the matrix coefficients according to the color temperature of the illumination, it is possible to obtain good color reproducibility consistently, regardless of the color temperature of the illumination.

Embodiment A3

Figure 23:
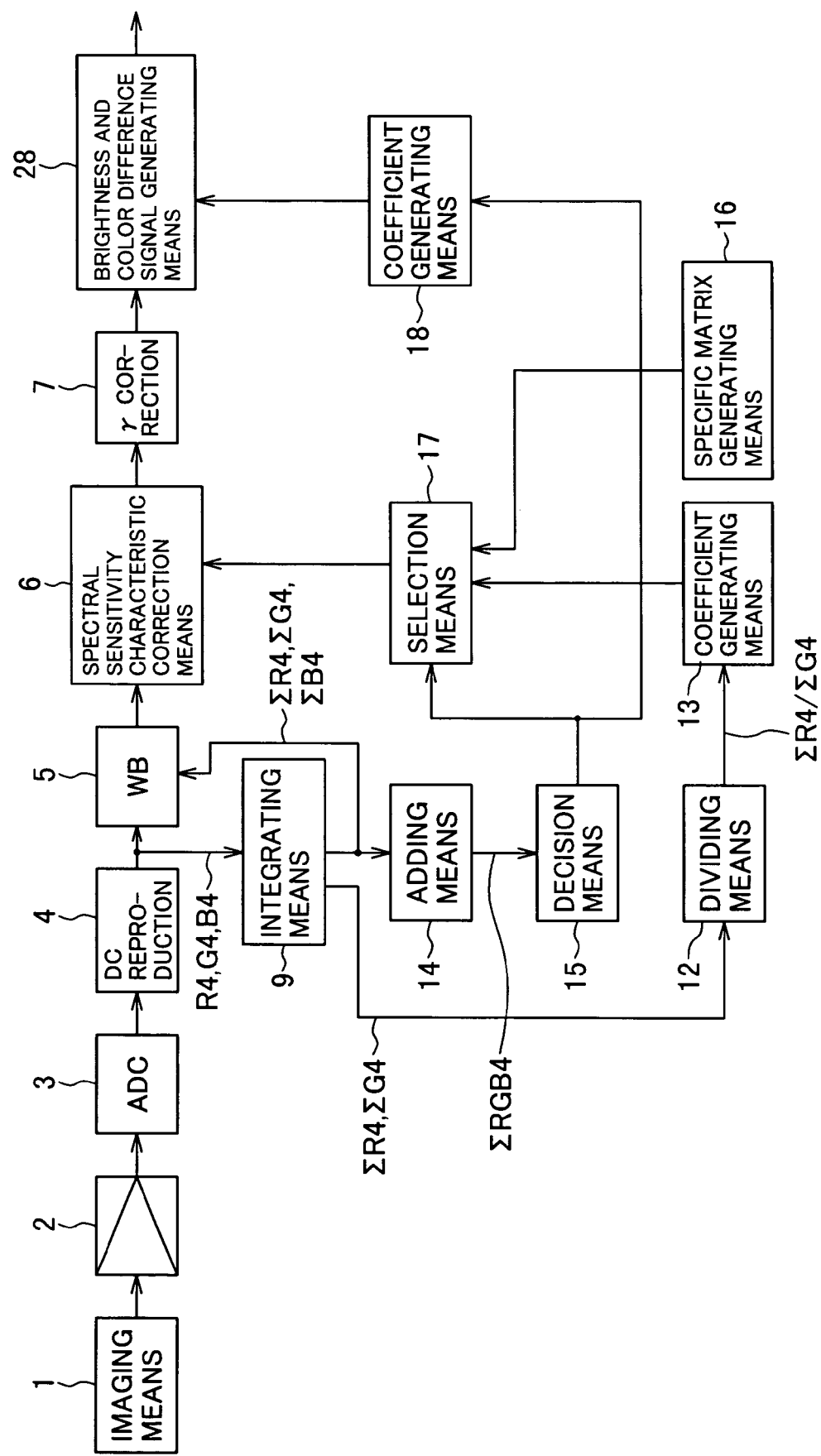
FIG. 23 is a diagram of the imaging device in embodiment A3 of this invention.

FIG. 23 is a schematic block diagram showing an imaging device according to embodiment A3 of this invention. In FIG. 23 and FIG. 11, similar reference characters denote similar elements. This imaging device differs from the one shown in FIG. 11 in having a brightness and color difference signal generating means 20 different from brightness and color difference signal generating means 8, and in that an adding means 14, a decision means 15, a specific matrix generating means 16, a selection means 17, and a coefficient generating means 18 are further provided.

The adding means 14 obtains the sum $\Sigma RGB4$ of the integrated values $\Sigma R4$ of the red signal, $\Sigma G4$ of the green signal, and $\Sigma B4$ of the blue signal output by the integrating means 9.

The decision means 15 decides whether the output of the adding means 14 is greater or less than a prescribed value, generates a signal specifying a first mode when the output value is greater than the prescribed value, and generates a signal specifying a second mode when the output value is less than the prescribed value.

The specific matrix generating means 16 generates a matrix comprising specific coefficients. This matrix is, for example, the coefficient matrix given by equation (A1) in which r1, g2, and b3 are set to one (r1=g2=b3=1) and all other matrix coefficients are set to zero.

The selection means 17 selects and outputs either the output of the coefficient generating means 13 or the output of the specific matrix generating means 16 based on the result of the decision in the decision means 15. Specifically, when the decision means 15 generates a signal specifying the first mode, the selection means 17 selects and outputs the output of the coefficient generating means 13, and when the decision means 15 generates a signal specifying the second mode, the selection means 17 selects and outputs the output of the specific matrix generating means 16.

The coefficient generating means 18 determines the coefficients based on the output of the decision means 15. Specifically, when the decision means 15 outputs a signal specifying the first mode (when it decides that the output of the adding means 14 is greater than the prescribed value), the coefficient generating means 18 outputs first matrix coefficients, and when the decision means 15 outputs a signal specifying the second mode (when it decides that the output of the adding means 14 is less than the prescribed value), the coefficient generating means 18 outputs second matrix coefficients different from the first matrix coefficients.

The brightness and color difference signal generating means 20 differs from the brightness and color difference signal generating means 8 in that the matrix coefficients y1 to y3, cr1 to cr3, and cb1 to cb3 used in the matrix calculation are not constants but variables supplied from the coefficient generating means 18.

When the decision means 15 outputs a signal specifying the first mode, the selection means 17 supplies the output of the coefficient generating means 13 to the spectral sensitivity characteristic correction means 6, so the spectral sensitivity characteristic correction means 6 operates as described in embodiment A2.

When the decision means 15 outputs a signal specifying the second mode, the selection means 17 selects and outputs the output of the specific matrix generating means 16, so the output of the spectral sensitivity characteristic correction means 6 is equal to the input.

The coefficients used in the brightness and color difference signal generating means 20 are also changed depending on whether the decision means 15 outputs a signal specifying the first mode or the second mode. The significance of the changes will now be explained.

The matrix coefficients shown in the above-mentioned equation (A2) constitute a conversion matrix for converting the red, green, and blue signals to YCrCb signals; the mixing ratios of the red, green, and blue signals are selected so as to generate a brightness signal (Y signal) approximating the human brightness sensitivity curve.

Figure 24:
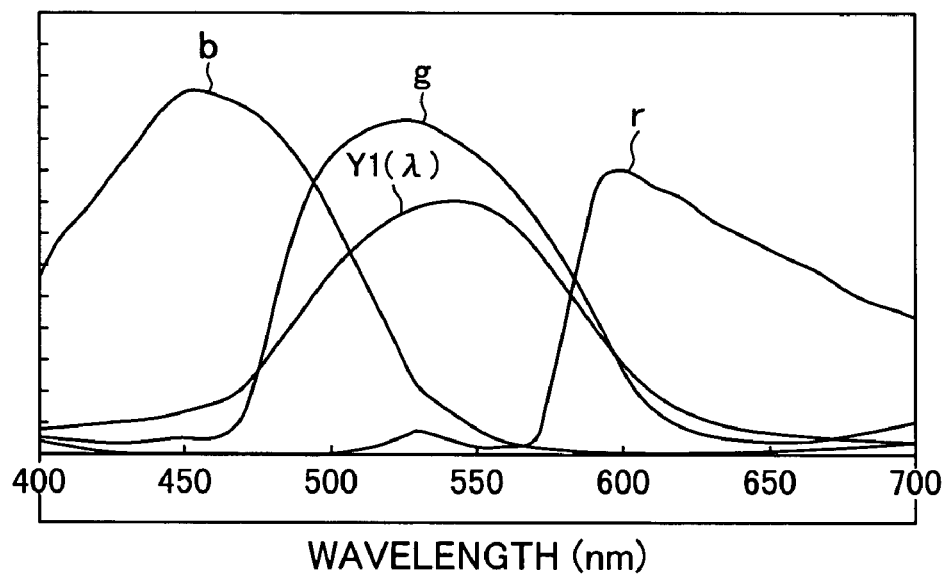
FIG. 24 shows the spectral sensitivity curves and the brightness sensitivity curve of the imaging means.

FIG. 24 shows an exemplary brightness curve $Y1(\lambda)$. If the Y signal approximates the human brightness sensitivity curve, correct color reproducibility is displayed if the color signals are displayed using YCrCb signals; if only the Y signal is displayed, a monochrome image that approximates the human brightness curve is displayed, so that the display appropriately matches the characteristics of the human eye.

Figure 25:
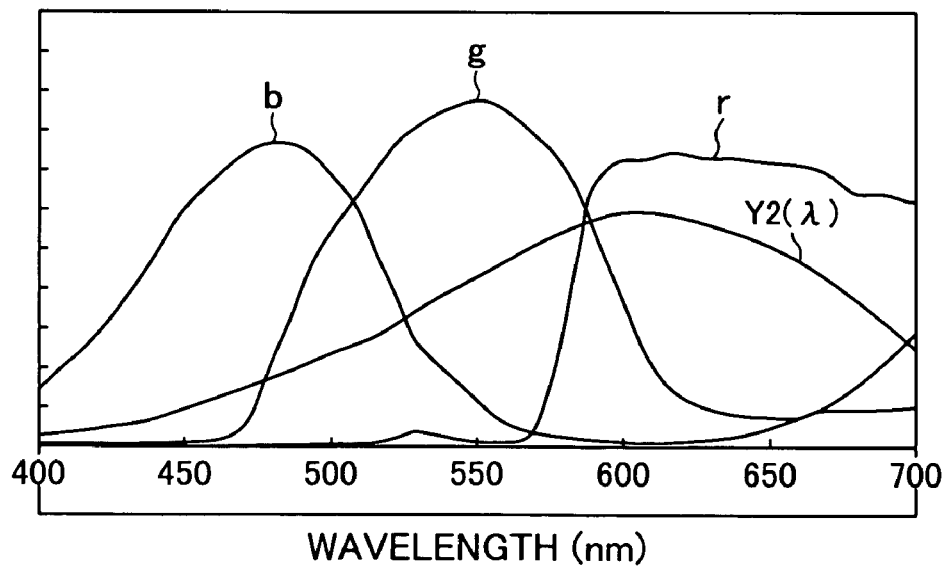
FIG. 25 shows the spectral sensitivity curves of the imaging means and the spectral sensitivity curve of the brightness signal in the dark.

When the illumination intensity is low and imaging is difficult with the normal sensitivity of the imaging device, the gain of the amplifying means 2 may be increased, but this leads to an increase in noise with respect to the image signal, resulting in a poor image with a low signal-to-noise ratio (S/N). Accordingly, when the integrated red and green or blue and green values obtained from the integrating means 9 are small in value, that is, when the output of the adding means 14 is less than a prescribed value, the illumination of the subject is judged to be low, and the matrix coefficients for obtaining the brightness signal Y of the brightness and color difference signal generating means 20 are changed to improve the apparent sensitivity. For example, the matrix coefficients used in the integrating means 9 may be changed so as to obtain curves that approximate spectral curves with sensitivity peaks offset toward the infrared region as shown in FIG. 25. The mixing ratio is then set so as to include a large amount of the red component; if $Y=0.1B+0.4G+0.5R$, for example, the integrated value over all wavelengths increases and there is a relative improvement in sensitivity. In this situation, the Y signal differs from the human brightness sensitivity curve, so in order to avoid annoying color misrepresentation, output signals Cr and Cb are set to zero to produce a monochrome image and prevent wide color discrepancies.

In normal imaging (when the output $\Sigma$RGB4 of the adding means 14 is greater than a prescribed value), the brightness and color difference signal generating means 20 calculates with matrix coefficients set as follows: y1=0.2990, y2=0.5870, y3=0.1140, cr1=0.5000, cr2=−0.4187, cr3=−0.0813, cb1=−0.1687, cb2=−0.3313, and cb3=0.5000; in imaging under dark conditions (when the output $\Sigma$RGB4 of the adding means 14 is less than a prescribed value), the calculation is performed with the matrix coefficients set as follows: y1=0.1, y2=0.4, y3=0.5, cr1=0.0, cr2=0.0, cr3=0.0, cb1=0.0, cb2=0.0, and cb3=0.0.

The above matrix coefficients used under dark conditions are given as an example; if the mixing ratio of the red signal is increased, there is a relative increase in sensitivity; appropriate matrix coefficients may be selected accordingly.

As described above, if the calculation procedure in the spectral sensitivity characteristic correction means 6 is switched according to the output of the adding means 14 and the coefficients used in the matrix calculation performed in the brightness and color difference signal generating means 20 are changed, there is no need to mount an IRCF for normal color imaging and dismount the IRCF for monochrome imaging under dark conditions, as there is with a conventional surveillance camera; both kinds of imaging are carried out by changing the matrix coefficients of the spectral sensitivity characteristic correction means 6 and the brightness and color difference signal generating means 20, and an IRCF is unnecessary, even for normal imaging.

In the above embodiment, when the decision means 15 decides that the output of the adding means 14 is less than a prescribed value, the selection means 17 selects the output of the specific matrix generating means 16; alternatively, it is possible to mutually short-circuit the input and output terminals of the spectral sensitivity characteristic correction means 6.

Embodiment A4

In the embodiments A1 to A3 described above, the processes in the spectral sensitivity characteristic correction means 6 and the steps that follow may be carried out by use of software, that is, by a programmed computer, particularly in the case of still images.

Embodiment A5

The imaging devices in the above embodiments are applicable to a video camera, a camcorder (a video tape recorder equipped with a camera), a digital still camera, a personal computer (PC) camera, or a digital still camera built into a mobile phone or a mobile terminal device, and may be used for imaging either moving or still images; the imaging devices in the above embodiments make an IRCF unnecessary, and can also be applied to surveillance cameras and cameras on board vehicles, which are often used under dark conditions.

Figure 26:
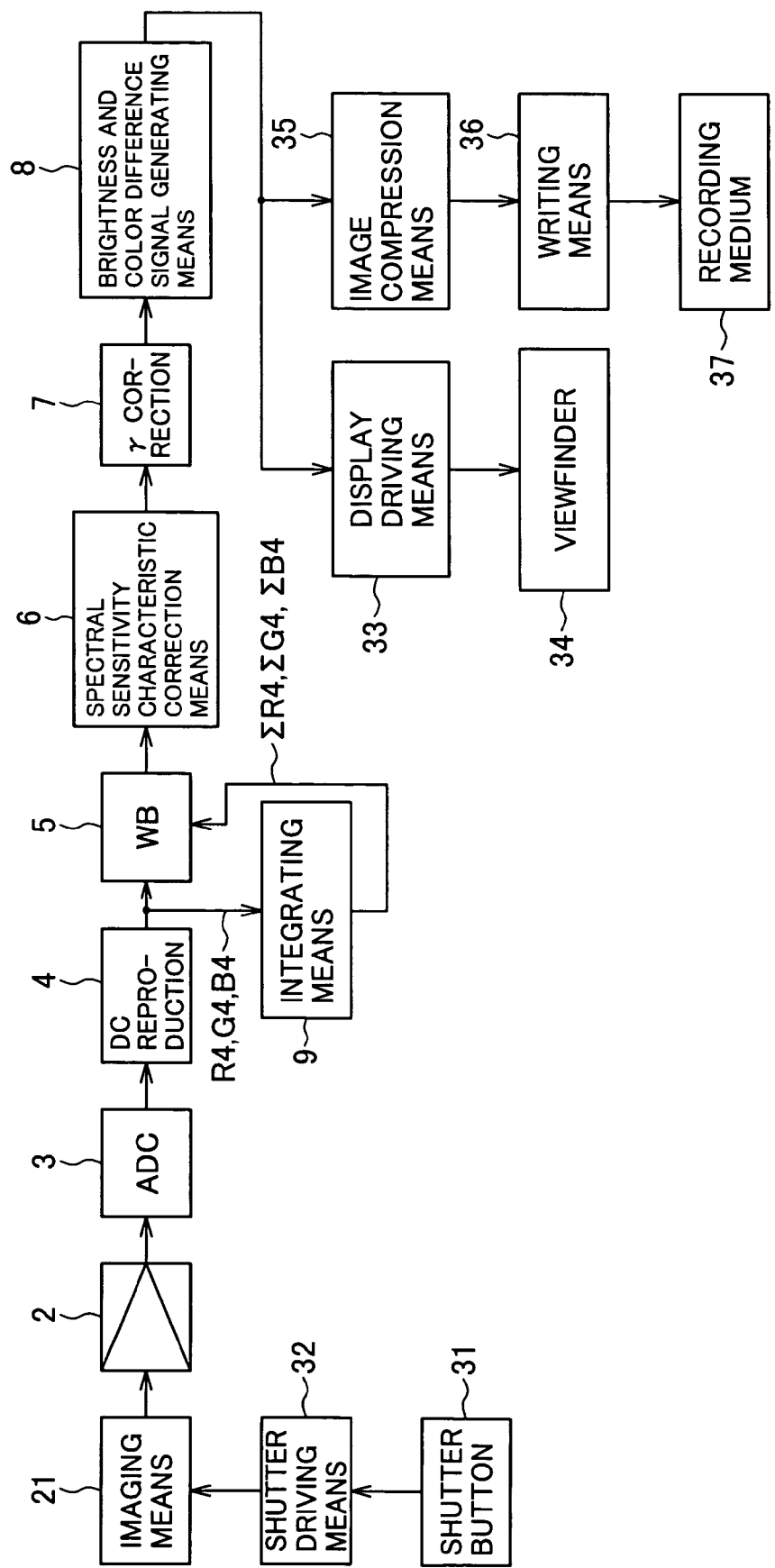
FIG. 26 is a block diagram showing an example of the structure of a digital camera having the imaging device in FIG. 1.

FIG. 26 is a schematic block diagram showing an example of the structure of a digital still camera having the imaging device in FIG. 1.

As shown, in addition to the elements constituting the imaging device in FIG. 1, this digital still camera has an imaging means 21 different from imaging means 1, and further has a shutter button 19, a shutter driving means 32, a display driving means 33, a viewfinder 34, an image compression means 35, and a writing means 36.

Imaging means 21 differs from imaging means 1 in that it is equipped with a shutter (not shown).

The shutter driving means 32 activates the shutter in response to the operation of the shutter button 19.

The display driving means 33 receives the output of the brightness and color difference signal generating means 8 to display the image on the viewfinder 34.

The viewfinder 34 includes a liquid crystal display device, for example, and is activated by the display driving means 33 to display the image captured by the imaging means 21.

The image compression means 35 receives the output of the brightness and color difference signal generating means 8 and performs image compression as specified in the JPEG standard, for example.

The writing means 36 writes the data compressed by the image compression means 35 into the recording medium 37.

When the imaging device is used to capture a moving image and the image data are transmitted to a device not shown in the drawing, the output of the brightness and color difference signal generating means is encoded to generate and output an NTSC signal.

Embodiment B1

Figure 27:
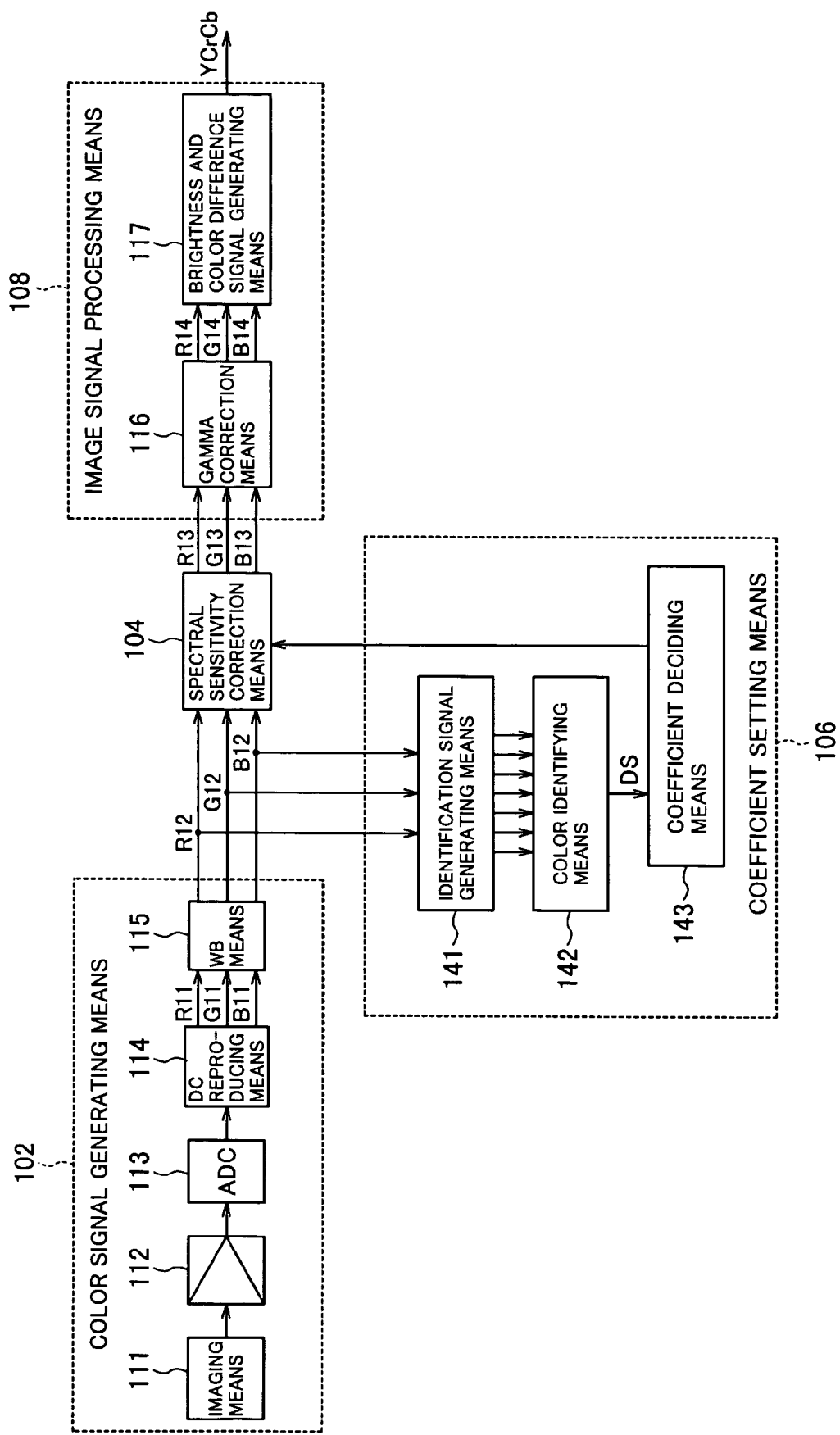
FIG. 27 is a block diagram showing the imaging device in embodiment B1 of this invention.

FIG. 27 is a schematic block diagram showing the imaging device in embodiment B1 of this invention. As shown, this imaging device has a color signal generating means 102, a spectral sensitivity correction means 104, a coefficient setting means 106, and an image signal processing means 108.

The color signal generating means 102 receives incident light and outputs image signals corresponding to the incident light (the first image signals), e.g., red, green, and blue color signals R12, G12, and B12.

The spectral sensitivity correction means 104 performs a matrix calculation including multiplication of the color signals R12, G12, and B12 output from the color signal generating means 102 by matrix coefficients to remove the near infrared components, that is, the signal components included in the first image signals due to the color signal generating means 102 having spectral sensitivity in the near infrared region, and generates the second image signals, e.g., color signals R13, G13, and B13.

The coefficient setting means 106 receives the color signals R12, G12, and B12 output from the color signal generating means 102, decides whether the combination of these signals represents a predetermined exceptional color, and switches the matrix coefficients according to the result of the decision.

The image signal processing means 108 is for converting the second image signals output from the spectral sensitivity correction means 104 to signals suitable for external output (to third image signals).

The color signal generating means 102 has, as shown in FIG. 27, for example, an imaging means 111, an amplifying means 112, an ADC 113, a DC reproducing means 114, and a white balancing means 115.

The imaging means 111 has, as shown in FIGS. 2 and 3, for example, an optical system 21 including a lens, and an imaging element 22 having a plurality of photoelectric conversion elements, each constituting a pixel, disposed in a two-dimensional array. The plurality of photoelectric conversion elements of the imaging element 22 are covered by color filters 23 used as a color separation means as shown in FIG. 2, for example.

The plurality of photoelectric conversion elements are divided into first, second, and third groups.

The color filters 23 include a plurality of red filters (R filters) 24r provided for a first group of photoelectric conversion elements, a plurality of green filters (G filters) 24g provided for a second group of photoelectric conversion elements, and a plurality of blue filters (B filters) 24b provided for a third group of photoelectric conversion elements, disposed in, for example, a Bayer array as shown.

Figure 28:
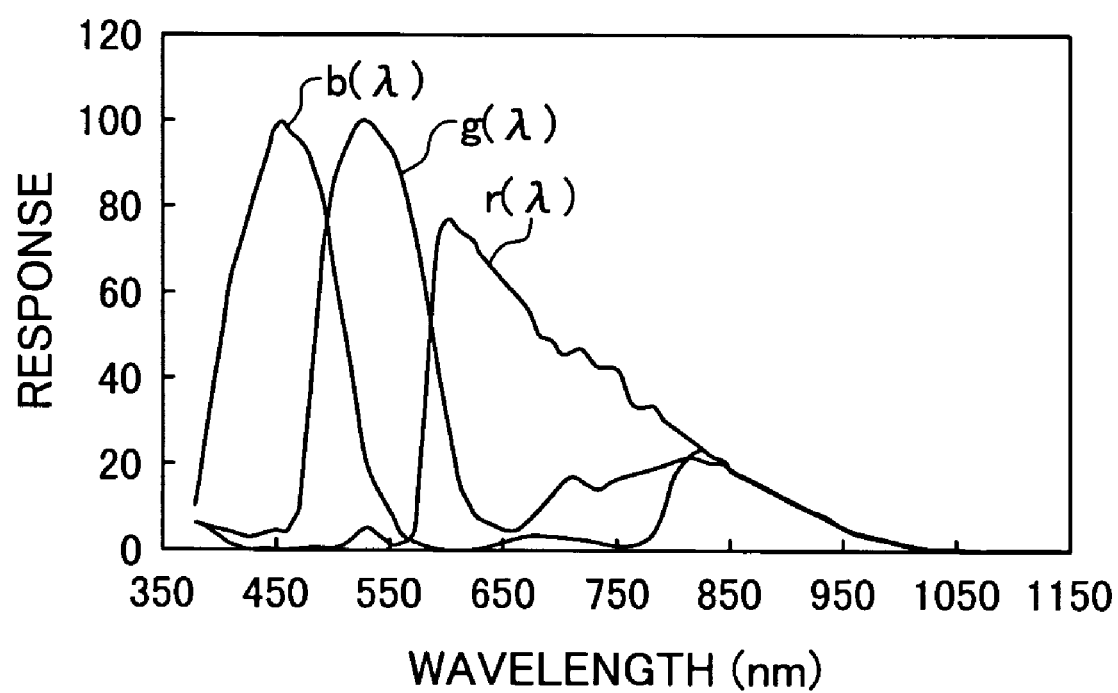
FIG. 28 shows the spectral sensitivity curves of the imaging means.

FIG. 28 shows the spectral sensitivity curves $r(\lambda)$, $g(\lambda)$, and $b(\lambda)$ of the photoelectric conversion elements provided with red, green, and blue filters 24r, 24g, and 24b. The spectral sensitivity curves in FIG. 28 represent the combined characteristics of the transmittance of the color filters and the spectral sensitivity characteristics of the photoelectric conversion elements constituting each pixel in the imaging means 111. The photoelectric conversion elements constituting each pixel in the imaging means 111 are sensitive up to about 1000 nm, so the spectral sensitivity curves $r(\lambda)$, $g(\lambda)$, and $b(\lambda)$ substantially correspond to the spectral transmittances of the color filters. Specifically, the red filter 24r has a spectral transmittance curve that is comparatively high from substantially 560 nm onward, the green filter 24g has a spectral transmittance curve that is comparatively high from substantially 450 nm to substantially 600 nm and then becomes comparatively high again after substantially 700 nm, and the blue filter 24b has a spectral transmittance curve that is comparatively high from substantially 380 nm to substantially 550 nm and then becomes comparatively high again after substantially 800 nm.

Light incident from the optical system 21, which includes a lens, is focused on the photoreceptive surface of the imaging element 22. As the imaging element 22 is covered by color filters 23 as described above, color components corresponding to the spectral transmittances of the color filters 23, that is, red, green, and blue analog image signals, are output from the photoelectric conversion elements.

The red, green, and blue analog signals (which may be referred to as the R signal, G signal, and B signal, respectively) output from the imaging means 111 as described above are amplified by the amplifying means 112. The image signals R2, G2, and B2 output from the amplifying means 112 are converted to red, green, and blue digital color signals by the ADC 113.

The direct current levels of the red, green, and blue digital color signals from the ADC 113 are reproduced by the DC reproducing means 114. Direct current reproduction is usually carried out so that the black level of the image signal is zero; this is done by a DC shift of the offset level before the analog-to-digital conversion by the ADC 113, or by a clamping process.

Figure 29:
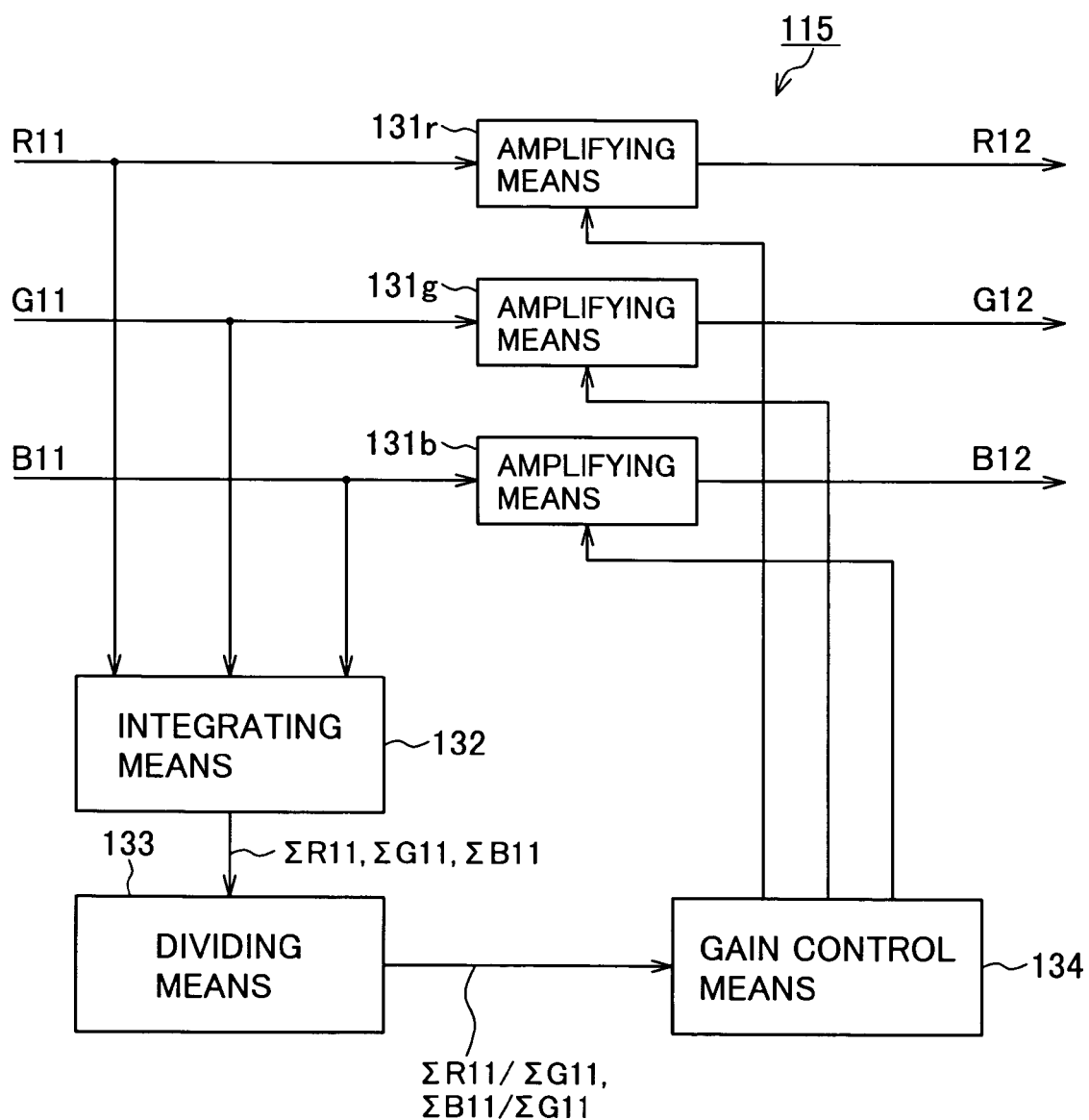
FIG. 29 is a block diagram showing an exemplary structure of the white balancing means 115 in FIG. 27.

The white balancing means 115 corresponds to the combination of white balancing means 5 and integrating means 9 in FIG. 1, and as shown in FIG. 29, has three amplifying means 131r, 131g, and 131b for amplifying the color signals R11, G11, and B11 output from the DC reproducing means 114 to output color signals R12, G12, and B12; an integrating means 132 for integrating color signals R11, G11, and B11 over all pixels in a screen to output integrated values $\Sigma R11$, $\Sigma G11$, and $\Sigma B11$; a dividing means 133 for obtaining the ratios $\Sigma R11/\Sigma G11$ and $\Sigma B11/\Sigma G11$ of the integrated values based on the outputs $\Sigma R11$, $\Sigma G11$, and $\Sigma B11$ of the integrating means 132; and a gain control means 134 for controlling the gain of amplifying means 131r, 131g, and 131b based on the output of the dividing means 133.

Although the denominator of the ratios of the integrated values mentioned above is $\Sigma G11$, it is also possible to use reciprocals. In the following description, however, ratios with $\Sigma G11$ as the denominator will be used.

The gain control means 134 receives the ratios ΣR11/ΣG11 and ΣB11/ΣG11 of the integrated values, converts the input ratios to ratios ΣRt/ΣGt and ΣBt/ΣGt of ideal color signals ΣRt, ΣGt, and ΣBt integrated over at least one screen, calculates the white balance coefficients used in the white balancing means 115, and outputs the white balance coefficients to amplifying means 131*r*, 131*g*, and 131*b*. The above-mentioned ideal color signals are the red, green, and blue signals that the imaging device of this invention uses as a target for realizing good color reproducibility; they are signals in which colors are well reproduced without including unnecessary signal components due to near infrared light. The conversion method will be described later.

The white balancing means uses the statistical result (Evans' principle) showing that with normal subjects, the colors in a screen average out to achromatic signals, and controls the gain of the signals for each color so as to equalize the integrated values of all pixels in the screen. The outputs of the white balancing means 115 become the outputs of the color signal generating means 102 (the first image signals).

The spectral sensitivity correction means 104 generates color signals (the second image signals) R13, G13, and B13 by removing the signal components (referred to as the near infrared components) included in signals R12, G12, and B12 due to the color signal generating means 102, particularly the imaging means 111 of the color signal generating means 102, having spectral sensitivity in the near infrared region, in other words, by removing the effects of the near infrared spectral sensitivity of the color signal generating means 102 from the color signals R12, G12, and B12 output from the color signal generating means 102 as described above.

The spectral sensitivity correction means 104 carries out these corrections by performing a matrix calculation; the coefficients used in the matrix calculation are determined so as to satisfy the conditions described above. The method of determining the matrix coefficients will be described later.

The image signal processing means 108 converts the signals R13, G13, and B13 output from the spectral sensitivity correction means 104 as described above to signals suitable for external output, and has, as shown in FIG. 27, for example, a gamma (γ) correction means 116 and a brightness and color difference signal generating means 117.

The gamma correction means 116 performs a nonlinear transformation of the color signals R13, G13, and B13 output from the spectral sensitivity correction means 104 to output gamma corrected color signals R14, G14, and B14.

The brightness and color difference signal generating means 117 converts the color signals R14, G14, and B14 output from the gamma correction means 116 to a brightness signal (Y signal) and two color difference signals (Cr signal and Cb signal). The brightness and color difference signal generating means 117 carries out this conversion (YCrCb conversion) by performing a linear matrix calculation given by equation (B1) below, usually multiplying by a three-row-by-three-column coefficient matrix.

$$\begin{pmatrix} Y \\ Cr \\ Cb \end{pmatrix} = \begin{pmatrix} y1 & y2 & y3 \\ cr1 & cr2 & cr3 \\ cb1 & cb2 & cb3 \end{pmatrix} \begin{pmatrix} R14 \\ G14 \\ B14 \end{pmatrix} \quad (B1)$$

The three-row-by-three-column matrix coefficients in equation (B1) are, for example, set to the following values specified by IEC (International Electrotechnical Commission) standard 61966-2-1: y1=0.2990, y2=0.5870, y3=0.1140, cr1=0.5000, cr2=−0.4187, cr3=−0.0813, cb1=−0.1687, cb2=−0.3313, and cb3=0.5000.

The spectral sensitivity correction by the spectral sensitivity correction means 104 will now be described in detail.

FIG. 6 shows spectral sensitivity curves expressing human chromatic characteristics. The curves in FIG. 6 represent the mean values of the color-matching functions of a person with normal color vision, as specified by the Commission Internationale de l'Eclairage (CIE) in 1931. When chromatic adaptability is not taken into account, color perceived by humans may be expressed in a simplified manner using values obtained by multiplying the red, green, and blue spectral sensitivity curves (color-matching functions) shown in FIG. 6, the spectral reflectance characteristics of the subject, and the spectral characteristics of the illumination, and integrating the resulting products in the visible spectral region. As shown in FIG. 6, human sensitivity curves are sensitive only in the so-called visible spectral region from substantially 380 nm to 780 nm; there is barely any sensitivity at wavelengths longer than 700 nm.

When the imaging means 111 is provided with red, green, and blue color filters 23 for resolving different colors, red, green, and blue signals corresponding to the products of the spectral transmittances of the color filters and the sensitivity curves of the imaging element are output from the imaging means 111; because the imaging means 111 has imaging elements for performing photoelectric conversion, e.g., photodiodes, formed from a semiconductor material such as silicon (Si), it is sensitive from the visible spectral region to the near infrared region (around 1000 nm). As explained above with reference to FIG. 28, the red filter 24*r* has a spectral transmittance curve that is comparatively high from substantially 560 nm onward, the green filter 24*g* has a spectral transmittance curve that is comparatively high from substantially 450 nm to substantially 600 nm and then becomes comparatively high again after substantially 700 nm, and the blue filter 24*b* has a spectral transmittance curve that is comparatively high from substantially 380 nm to substantially 550 nm, and then becomes comparatively high again after substantially 800 nm. In addition, the red filter 24*r* has a relatively high transmittance in the near infrared region, and thus passes near infrared rays to the imaging element. The green filter 24*g* and blue filter 24*b* also have a certain transmittance in the near infrared region. This is because the red, green, and blue filters are usually constructed using dyes or pigments containing the respective colors, and since the spectral transmittances of the filters depend on their constituent materials, their transmittance curves become comparatively high again from the longer wavelength side of the visible spectral region to the near infrared region.

The red, green, and blue spectral sensitivity curves (r(λ), g(λ), and b(λ)) of the imaging element 22 indicated by solid lines in FIG. 28 differ from the color-matching functions shown in FIG. 6, and because the difference is significant particularly in the near infrared region (from 700 nm to 1100 nm), a conventional imaging device has an infrared cut filter (IRCF) placed in front of the imaging element 22 to block near infrared rays. The spectral transmittance curve IRCF(λ) in FIG. 7 shows that the IRCF has a spectral transmittance curve that drops sharply at substantially 700 nm. The IRCF(λ) curve is multiplied by the red, green, and blue spectral sensitivity curves (r(λ), g(λ), and b(λ)) to obtain the spectral sensitivity curves of the respective colors corresponding to the red, green, and blue signals of a conventional imaging device equipped with an IRCF; the curves r'(λ), g'(λ), and b'(λ) are indicated by dashed lines in FIG. 7.

The spectral transmittance characteristics of an IRCF vary depending on its material; an IRCF of the optical interference type comprising multiple thin film layers is able to achieve a sharp cutoff characteristic as shown by the curve in FIG. 7. In contrast, an IRCF of the light absorption type, usually known as blue glass, is unable to realize a sharp cutoff characteristic, and its half power value comes at substantially 650 nm; with either type, the objective is to match the color matching functions, and so both have characteristic curves that do not pass light of wavelengths 700 nm and longer.

A conventional imaging device captures images with an imaging means having the spectral sensitivity curves indicated by dashed lines in FIG. 7 by using an IRCF; the spectral sensitivity curves indicated by dashed lines in FIG. 7 are not strictly identical to the color matching functions shown in FIG. 6, however, so with the spectral sensitivity curves indicated by dashed lines in FIG. 7, it is impossible to reproduce colors with exactly the same values as in an image obtained from the color matching functions in FIG. 6. Nevertheless, since nearly equivalent color reproducibility is achieved, the characteristics are considered sufficient for conventional imaging devices. The term color reproducibility as used herein refers to making colors substantially match the colors perceived by the human eye, and to reproducing colors such that colors perceived as different become different colors, and colors perceived as the same become the same color.

Furthermore, in order to achieve more precise color reproducibility, signal processing may be carried out by performing a matrix calculation on the red, green, and blue signals using a three-row-by-three-column coefficient matrix to more closely approximate the color matching functions and improve the color reproducibility.

As described above, conventionally, because the spectral sensitivity curves of the imaging element 22 were different from human sensitivity curves in the near infrared region, an IRCF was provided to make the spectral sensitivity curves approximate human sensitivity curves.

If the signals obtained from the imaging means 111 are processed so that the unnecessary signal components obtained from the near infrared region are removed from the original signals, it is possible to realize good color reproducibility without using an IRCF.

The spectral sensitivity correction means 104 is used for this purpose; it performs a matrix calculation, given by equation (B2) below, on the color signals R12, G12, and B12 output from the color signal generating means 102 to output corrected color signals R13, G13, and B13.

In the following description, Rt, Gt, and Bt denote the signals that should ideally be output from the spectral sensitivity correction means 104. These ideal color signals Rt, Gt, and Bt are the signals that would be obtained at the output end of the color signal generating means 102 if it had no spectral sensitivity in the near infrared region, e.g., if the imaging means 111 of the color signal generating means 102 were to be equipped with an IRCF.

Figure 30:
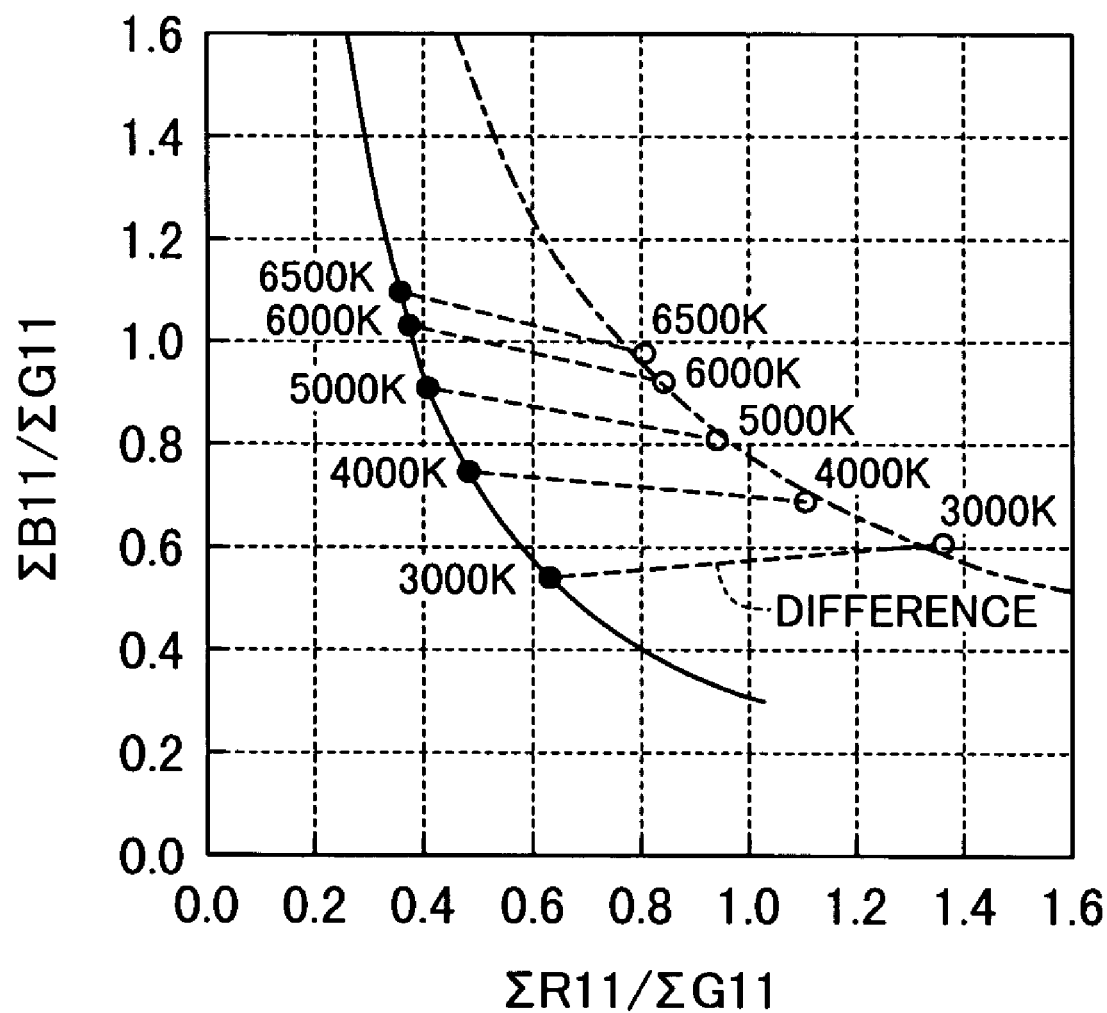
FIG. 30 shows the ratios of the integrated values of the red, green, and blue signals.

The white balance adjustment performed by the white balancing means 115 on the signals R11, G11, and B11 output from the DC reproducing means 114 in the stage preceding the spectral sensitivity correction means 104 is based on the Rt, Gt, and Bt signals. Accordingly, if signals Rt, Gt, and Bt are set as the target color signals to be ultimately obtained, and white balance adjustment is performed using signals Rt, Gt, and Bt, it becomes possible for the spectral sensitivity correction means 104 in the following stage to perform a corrective matrix calculation without being affected by the color temperature of the illumination source. The processes will now be described more specifically. FIGS. 12, 13, and 14 show exemplary spectral curves of illumination sources (sunlight or filament emission) with different color temperatures corresponding to black body radiation. The dashed line (a) connecting the white circles in FIG. 30 indicates the relationship between the ratios $\Sigma R11/\Sigma G11$ and $\Sigma B11/\Sigma G11$ of the integrated values obtained from the display driving means 33 when the subject is a total reflector (a reflector having a uniform spectral reflectance over all wavelengths), and illumination that emits black body radiation, such as sunlight or a halogen lamp, is used as the light source. As shown in FIG. 30, the relationship between the ratios of the integrated values is represented by a linear locus in relation to the color temperature of the illumination source (sunlight or filament emission) corresponding to black body radiation; if one of the two ratios of the integrated values is obtained, the other ratio of the integrated values and the color temperature are obtained unambiguously.

The spectral sensitivity curves of the signals Rt, Gt, and Bt set as the color target (the products of the spectral sensitivities of the imaging element 22 and the IRCF) are indicated by dashed lines in FIG. 7. If the spectral sensitivity curves indicated by dashed line in FIG. 7 are multiplied by the spectral curves of the total reflector and the illumination, and the color signals (Rt, Gt, and Bt) are obtained from the sums of the values integrated over all wavelengths, the relationship between the ratios $\Sigma Rt/\Sigma Gt$ and $\Sigma Bt/\Sigma Gt$ of the values integrated over the entire image screen is represented by the solid line (b) connecting the black circles in FIG. 30. Since the spectral sensitivity curves of the imaging element 22 and the spectral sensitivity curves of the IRCF are known, it is possible to calculate the spectral sensitivity curves indicated by dashed lines in FIG. 7. When the spectral sensitivity curves indicated by dashed lines in FIG. 7 have been obtained, the solid line (b) in FIG. 30 is obtained by calculating the products of the spectral curves of the illumination with different color temperatures and the spectral sensitivity curves indicated by dashed lines in FIG. 7. Therefore, since the values for 3000-K illumination, for example, can be obtained from both the dashed line (a) and the solid line (b) in FIG. 30, it is possible to convert the ratio $\Sigma R11/\Sigma G11$ (or $\Sigma B11/\Sigma G11$) obtained from the dividing means 133 to $\Sigma Rt/\Sigma Gt$ (or $\Sigma Bt/\Sigma Gt$) on a one-to-one basis from FIG. 30. The above conversion may be carried out, for example, by having the gain control means 134 store the characteristics expressed by the two curves in FIG. 30 as data in a lookup table (LUT) or the like.

The gain control means 134 performs the above-mentioned conversion of the ratios of the integrated values, and outputs the white balance coefficients to amplifying means 131$r$ to 131$g$. The white balance coefficients are based on the green color signal; the gain of the amplifying means 131$g$ for the green color signal is fixed at unity, and the reciprocal $\Sigma Gt/\Sigma Rt$ of the ratio $\Sigma Rt/\Sigma Gt$ of the integrated values is set as the gain of the amplifying means 131$r$ for the red color signal. The reciprocal $\Sigma Gt/\Sigma Bt$ of the ratio $\Sigma Bt/\Sigma Gt$ of the integrated values is set as the gain of the amplifying means 131$b$ for the blue color signal.

Given that the Rt, Gt, and Bt signals are obtained by removing unnecessary infrared light signals from signals R12, G12, and B12, it follows that the differences between the dashed lines and the solid lines in FIG. 7 represent the integrated values of the unnecessary signal components in the near infrared region, and it is thus possible to say that the white balancing means 115 described above has performed a white balance adjustment on the Rt, Gt, and Bt signals.

The white balance adjustment has been described above with a total reflector as the subject (an achromatic subject);

there is a statistical result (Evans' principle) that the colors of an ordinary subject integrated over an entire screen come close to being achromatic, and since it is possible to perform the above white balance processing based on this principle, integrating over the entire screen is equivalent to imaging a total reflector (an achromatic subject).

The original purpose of the white balance adjustment was to make a white subject appear white, despite differences in the color temperature of the illumination, by adjusting the gains of the red channel, the green channel, and the blue channel, so the white balance adjustment is not capable of completely correcting the color reproducibility. For example, since subjects imaged under illumination with a low (red) color temperature have an overall reddish cast, the white balance can be adjusted so that a white subject appears white. However, if the Macbeth Color Checker is used as an example, and if the imaging element has inadequate spectral sensitivity characteristics causing it to reproduce the color red with a magenta cast or the color yellow with a greenish cast, the white balance adjustment described above cannot correct for these effects; color reproducibility is therefore corrected by performing the matrix calculation described below.

The spectral sensitivity correction means 104 receives the color signals R12, G12, and B12 output from the white balancing means 115, and performs the matrix calculation given by equation (B2) below to calculate corrected signals R13, G13, and B13.

$$\begin{pmatrix} R13 \\ G13 \\ B13 \end{pmatrix} = \begin{pmatrix} e11 & e12 & e13 \\ e21 & e22 & e23 \\ e31 & e32 & e33 \end{pmatrix} \begin{pmatrix} R12 \\ G12 \\ B12 \end{pmatrix} \quad (B2)$$

In equation (B2), e11 to e33 represent matrix coefficients.

The spectral sensitivity curves of the imaging means 111 shown in FIG. 28 and the spectral sensitivity curves shown in FIG. 7 differ particularly greatly in the near infrared region, but if the matrix coefficients shown in equation (B2) are properly selected, a conditional color match is satisfied and good color reproducibility is obtained. The term conditional color match as used herein refers to two color stimuli with different spectral characteristics appearing to be the same color when observed under specific conditions.

More specifically, the matrix coefficients are determined so that optimal color reproducibility is obtained when a specific subject is imaged under specific illumination, or in other words, so that substantially the same signals as when an IRCF is used are obtained at the output end of the DC reproducing means 4 without using an IRCF.

Specifically, the matrix coefficients are determined in the following way, for example.

An illumination fixture with a color temperature of 5000 K, as illustrated in FIG. 13, for example, is used as the illumination.

A standard color chart, for example, the Macbeth Color Checker with twenty-four color patches, is used as the subject.

Figure 31:
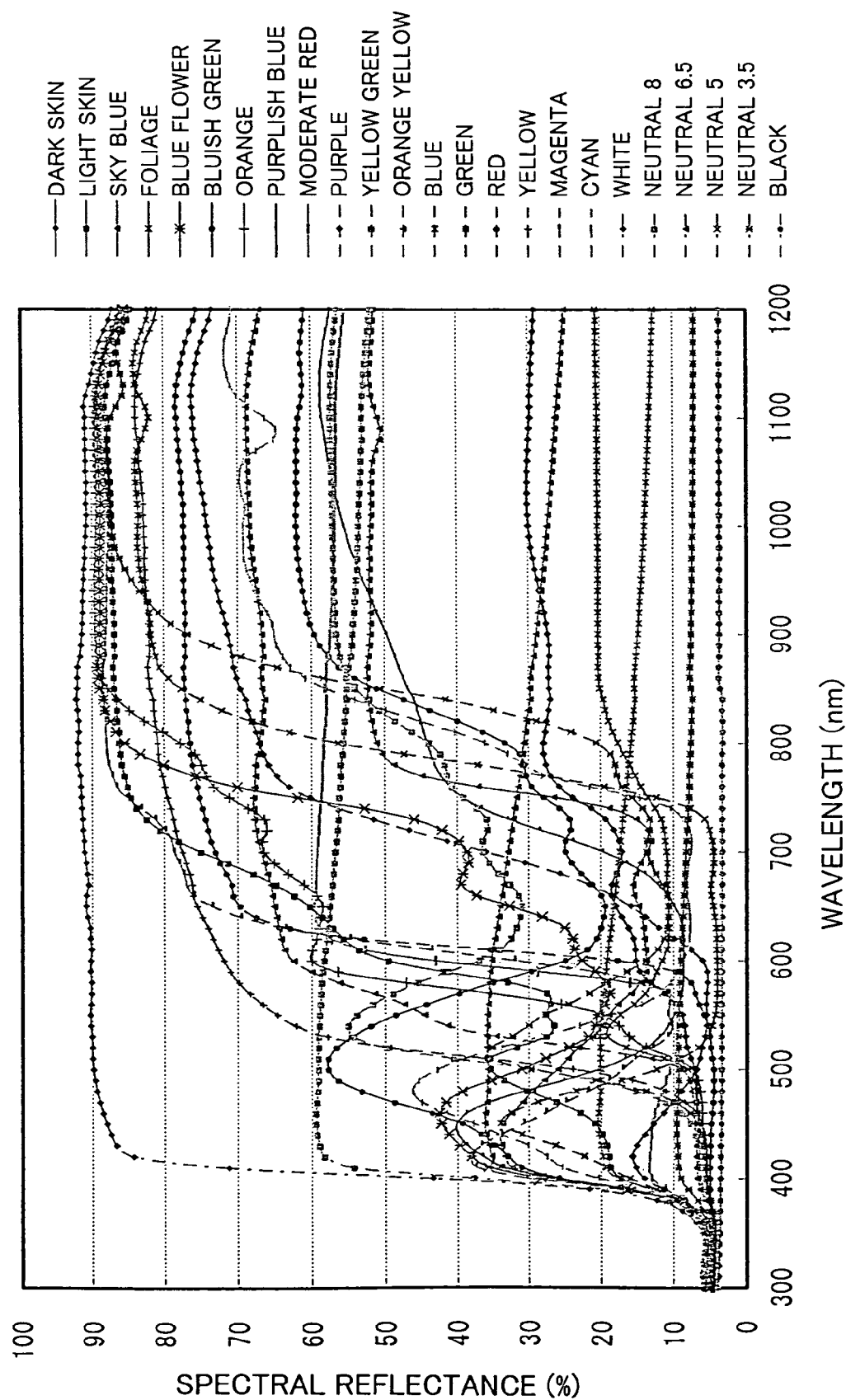
FIG. 31 shows the spectral reflectance curves of the color patches of the Macbeth Color Checker.

The Macbeth Color Checker used as the subject has twenty-four color patches representing natural colors specifically chosen to include colors that appeal to the human memory (skin color, the green of foliage, the blue of the sky, etc.); the spectral reflectance curves of the twenty-four color patches in the wavelength range from 300 nm to 1200 nm are shown in FIG. 31. The curves in FIG. 31 correspond to the color patches as follows:

1. Dark skin,
2. Light skin,
3. Blue sky,
4. Foliage,
5. Blue flower,
6. Bluish green,
7. Orange,
8. Purplish blue,
9. Moderate red,
10. Purple,
11. Yellow green,
12. Orange yellow,
13. Blue,
14. Green,
15. Red,
16. Yellow,
17. Magenta,
18. Cyan,
19. White,
20. Neutral 8,
21. Neutral 6.5,
22. Neutral 5,
23. Neutral 3.5,
24. Black (Japanese translations of the above names of the color patches are given in "Shinpen Shikisai Kagaku Handbukku, second edition" edited by the Color Science Association of Japan.)

The products of the spectral curve of the illumination shown in FIG. 13, the spectral reflectance curves of the color patches shown in FIG. 31, and the spectral sensitivity curves indicated by dashed lines in FIG. 7 are integrated over all wavelengths to calculate the red, green, and blue signals corresponding to each color patch, and the Rt, Gt, and Bt signals are calculated by adjusting the white balance so as to equalize the values of the red, green, and blue signals integrated over the entire screen, or alternatively, using white as the basis, so as to equalize the integrated values of the neutral parts in the checker.

Next, the products of the spectral curve of the illumination shown in FIG. 13, the spectral reflectance curves of the color patches shown in FIG. 31, and the spectral sensitivity curves shown in FIG. 28 are integrated over all wavelengths to obtain the red, green, and blue signals corresponding to each color patch, and the white balance is adjusted by multiplying the red, green, and blue color signals by the values of the white balance coefficients obtained from the spectral sensitivity curves (indicated by dashed lines in FIG. 7) set as the color target to obtain signals R2, G2, and B2.

Signals Rt, Gt, and Bt, and signals R3, G3, and B3 are thus obtained for each of the twenty-four patches, and the values of coefficients e11 to e33 in equation (B2) can be calculated by use of these values using the least squared error method.

FIG. 32 shows the color errors of the signals R3, G3, and B3 obtained by using matrix coefficients calculated as above in the matrix calculation given by equation (B2), and the color errors of the signals Rt, Gt, and Bt calculated by use of the spectral sensitivity curves indicated by dashed lines in FIG. 7. The matrix coefficients were set as: e11=0.3288, e12=0.4454, e13=−0.3080, e21=−0.1981, e22=1.1294, e23=−0.1594, e31=−0.1421, e32=0.1495, and e33=0.7857. The color error $\Delta E^*ab$ (defined in Japanese Industrial Standard Z8730-1996) is calculated as follows:

$$\sqrt{\Delta L^{*2} + \Delta a^{*2} + \Delta b^{*2}}$$

As shown in FIG. 32, the mean color error is 3.0, which indicates that to the human eye, the reproduced colors appear nearly identical to the original colors.

Figure 33:
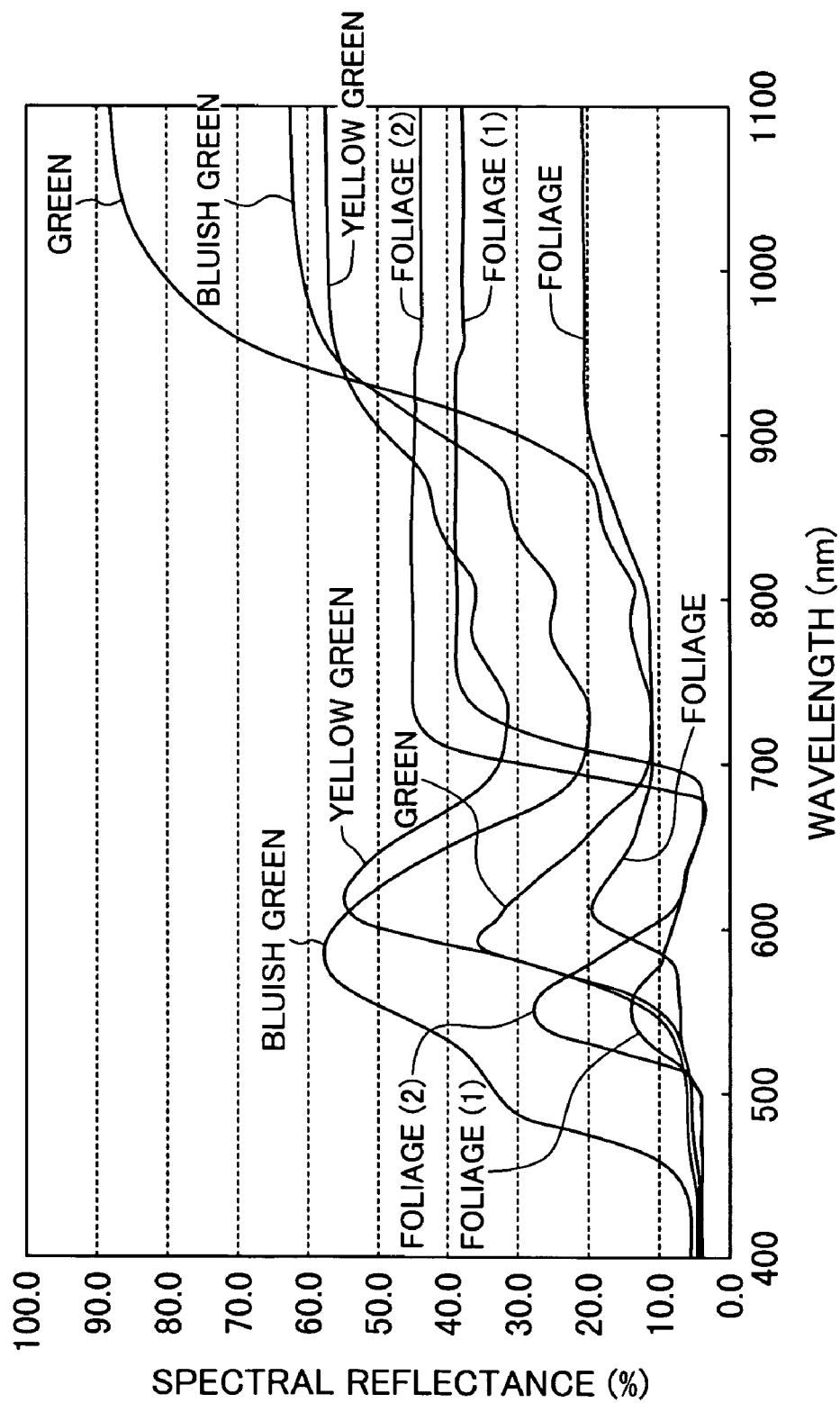
FIG. 33 shows spectral reflectance curves of foliage and other green colors in the Macbeth Color Checker.

Nevertheless, since the above matrix coefficients are calculated using a standard color chart such as the Macbeth Color Chart as the subject, they are not necessarily appropriate for all the colors appearing in actual subjects. In particular, although the Macbeth Color Checker is constructed so as to include distinctive natural colors as far as possible, this takes into account only the visible spectral region. When the near infrared region is considered as well, some colors may differ from the colors in the Macbeth Color Checker. The Macbeth Color Checker is given in the form of a chart, and pigments such as paint are used for the color patches. Natural foliage, for example, is perceived as the same green color in the visible spectral region, but has a spectral reflectance that differs from that of artist's green. FIG. 33 shows the spectral transmittance curves of the 'Foliage', 'Bluish green', 'Yellow green', and 'Green' patches given as examples of the green color in the Macbeth Color Checker, and two spectral transmittance curves ('foliage (1)' and 'foliage (2)') of living foliage growing in nature. The 'Foliage' color patch, for example, is designed to reproduce the color of foliage, but it has a spectral curve that differs from that of living foliage, particularly in the near infrared region above 700 nm; the reflectance curves of living foliage rise sharply at 700 nm. As mentioned before, since the human eye has barely any sensitivity beyond a wavelength of 700 nm, the colors of the color patches and the colors of foliage are perceived as virtually identical colors, but since the spectral sensitivity curves of the imaging means 111 shown in FIG. 28 are sensitive to near infrared light, this results in a color reproduction that is vastly different; for example, the value of the red signal increases unnecessarily and leads to color reproduction that makes the green color appear brown.

Figure 34:
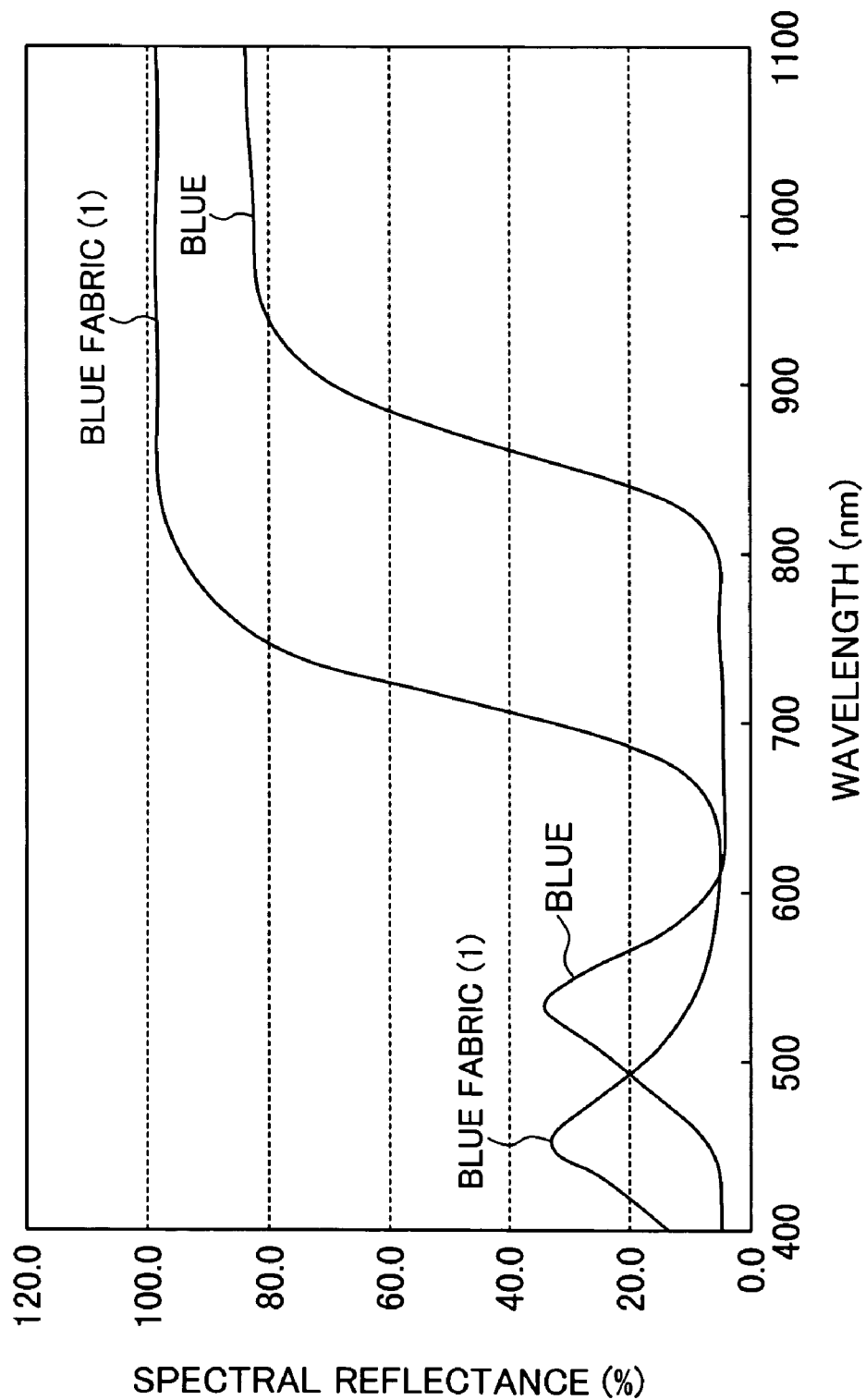
FIG. 34 shows the spectral reflectance curves of the blue color of a synthetic fiber and the blue color in the Macbeth Color Checker.

Similarly, the spectral reflectance of synthetic fabrics also differs from the spectral reflectance of pigments in the near infrared region, so that even if two colors appear identical in the visible spectral region, when near infrared light is included, there are wide color discrepancies. FIG. 34 shows the spectral reflectance curves of the blue color of a synthetic fiber ('Blue fabric (1)') and 'Blue' in the Macbeth Color Checker. Like foliage, synthetic fabric also has a reflectance curve that rises sharply at 700 nm. Therefore, even though the colors appear substantially identical to the human eye, they are reproduced in very different ways by the imaging means 111, which is sensitive to light in the near infrared region as shown in FIG. 28; for example, the red signal increases unnecessarily and leads to color reproduction that makes blue fabric appear purple.

As described above, it is possible to realize good reproducibility by use of the above-mentioned matrix coefficients for subject colors represented by pigments such as artists' colors and paint; for colors of foliage and synthetic fabric, however, since the spectral reflectance curves differ greatly at wavelengths beyond 700 nm, the result is faulty color reproduction.

Figure 35:
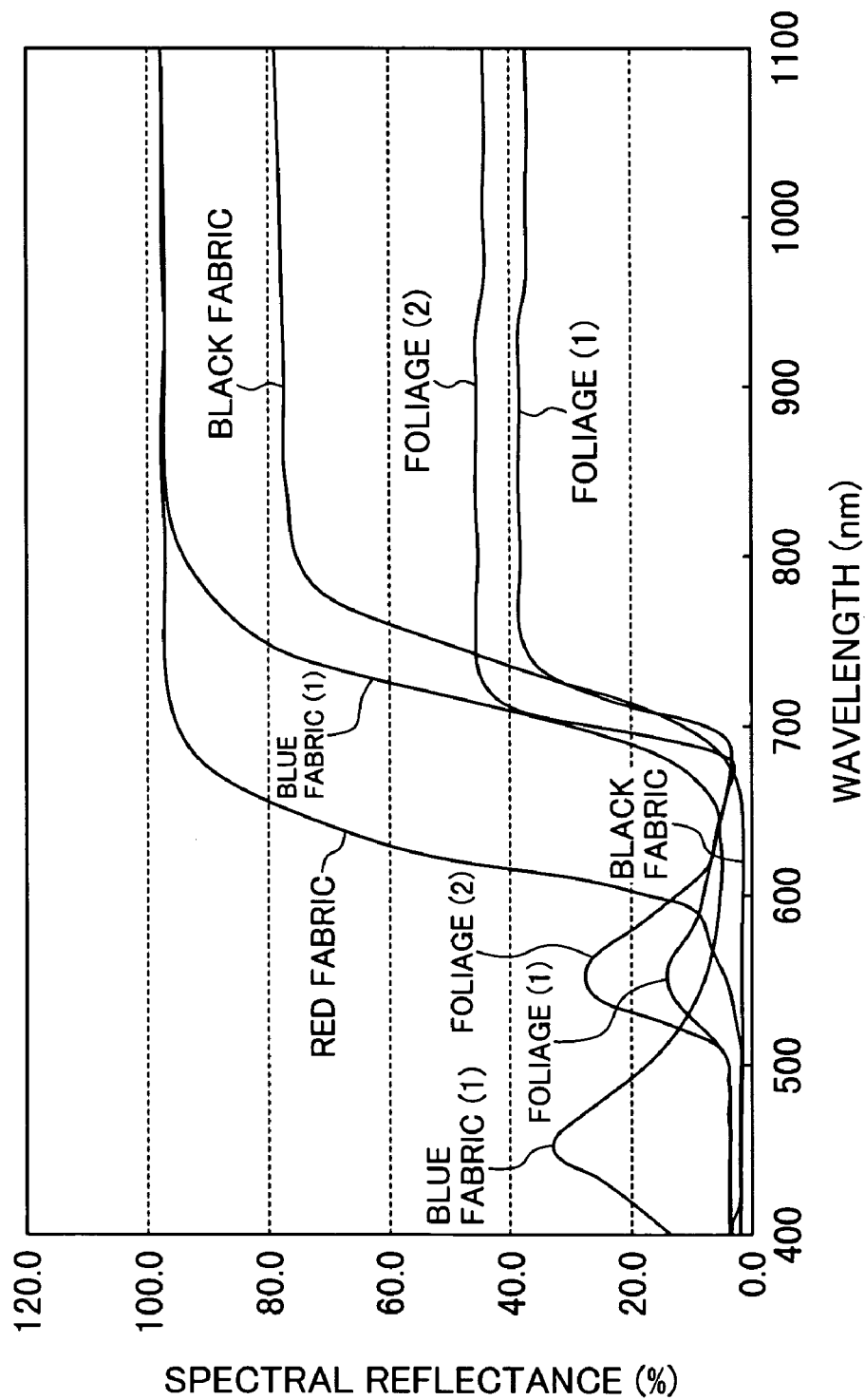
FIG. 35 shows the spectral reflectance curves of exceptional colors.

FIG. 35 shows the spectral reflectance curves of two types of natural foliage ('foliage (1)' and 'foliage (2)') and the blue, red, and black colors of a synthetic fiber ('blue fabric (1)', 'red fabric', and 'black fabric'), by way of example. FIG. 36 shows the color error $\Delta E^*ab$ for a new set of matrix coefficients that were found from these five colors and the twenty-four patches in the Macbeth Color Checker, twenty-nine colors in total, by use of the least squares method mentioned above. The matrix coefficients were set as follows: $e11=0.2925$, $e12=0.5184$, $e13=-0.3522$, $e21=-0.2118$, $e22=1.1587$, $e23=-0.1804$, $e31=-0.1541$, $e32=0.1762$, and $e33=0.7663$. The mean value of the color error for the color patches in the Macbeth Color Chart (color numbers 1 to 24) is 2.9, which is substantially the same as the value obtained using only the twenty-four patches, indicating that good reproducibility is achieved; the color errors for the newly added five patches are large, however, and except for the red synthetic fabric, they have large color errors, with values greater than nine.

Therefore, the colors of foliage and synthetic fibers, which have a high reflectance at wavelengths of 700 nm and longer where the spectral sensitivity curves (indicated by dashed lines in FIG. 7) set as color targets are insensitive, are taken to be exceptional colors, and matrix coefficients corresponding to the exceptional colors are applied to realize good reproducibility even for the colors of foliage and synthetic fibers.

Matrix coefficients suitable for the exceptional colors may be calculated using the least squares method so that the values of the spectral reflectance curves of the exceptional colors obtained by use of the spectral sensitivity curves in FIG. 28 approximate the values of the spectral reflectance curves of the exceptional colors obtained by use of the spectral sensitivity curves indicated by dashed lines in FIG. 7, which are set as the color target.

A set of matrix coefficients obtained in this way is: $e11=0.4624$, $e12=-0.1669$, $e13=-0.4632$, $e21=-0.1229$, $e22=0.8402$, $e23=-0.2531$, $e31=-0.0798$, $e32=-0.0769$, and $e33=0.6867$. The matrix coefficients obtained for the exceptional colors will be referred to as second matrix coefficients to differentiate them from the above-mentioned matrix coefficients for the colors of pigments, for example, $e11=0.3288$, $e12=0.4454$, $e13=-0.3080$, $e21=-0.1981$, $e22=1.1294$, $e23=-0.1594$, $e31=-0.1421$, $e32=0.1495$, and $e33=0.7857$, which will be referred to as first matrix coefficients.

The values of the first and second matrix coefficients are predetermined and stored in the coefficient setting means 106; the coefficient setting means 106 receives the first to third color signals R12, G12, and B12 output from the color signal generating means 102, decides whether the combination of these signals represents one of the predetermined exceptional colors, selects the second matrix coefficients when it decides that the signals represent an exceptional color, selects the first matrix coefficients when it decides that the signals do not represent an exceptional color, and supplies the selected matrix coefficients to the spectral sensitivity correction means 104.

The spectral sensitivity correction means 104 performs a matrix calculation for spectral sensitivity correction by using the matrix coefficients supplied from the coefficient setting means 106.

The coefficient setting means 106 has an identification signal generating means 141, color identifying means 142, and a coefficient deciding means 143 as shown in FIG. 27, for example.

The identification signal generating means 141 inputs the signals R12, G12, and B12, and calculates multiple signals, for example, three or more signals (identification signals), necessary for discriminating a predetermined target color.

The color identifying means 142 decides whether the combination of the identification signals output from the identification signal generating means 141 satisfies a prescribed condition, and outputs a discrimination signal DS representing the result of the decision. Specifically, when the signals satisfy the prescribed condition the color identifying means 142 decides that they represent an exceptional color, and sets the discrimination signal DS to a first value, for example, to '1'. Otherwise, the discrimination signal DS is set to a second value: for example, '0' (zero).

The coefficient deciding means 143 outputs the appropriate matrix coefficients to the spectral sensitivity correction means 104 according to the value of the discrimination signal DS supplied from the color identifying means 142.

The processes will be described in more detail below.

The identification signal generating means 141 generates the identification signals by adding signals R12 and G12 to generate a first sum signal Ye, adding signals G12 and B12 to generate a second sum signal Cy, and adding signals R12 and B12 to generate a third sum signal Mg. The identification signal generating means 141 further generates a fourth sum signal Z as a reference for the signal level by adding signals R12, G12, and B12 according to a prescribed ratio a:b:c. The identification signal generating means 141 then outputs the input signals R12, G12, and B12 and the newly generated signals Mg, Cy, Ye, and Z to the color identifying means 142. The values of a, b, and c may be chosen arbitrarily; as one example, if a is set to seven-tenths, b to two-tenths, and c to one-tenth (a:b:c=0.7:0.2:0.1), the value of signal Z is obtained from the following equation:

$$Z=0.7R12+0.2G12+0.1B12$$

The color identifying means 142 uses the seven signals R12, G12, B12, Mg, Cy, Ye, and Z that are input to discriminate the colors of pigments (normal colors) and the exceptional colors according to predetermined criteria. Inequalities (B3), (B4), and (B5) represent exemplary criteria for deciding whether a color is an exceptional color. The color is determined to be an exceptional color if equations (B3), (B4), and (B5) are all satisfied.

$$Cy/Z \geq 1.0 \quad (B3)$$

$$|Ye/Mg-R12/Cy| \leq 0.2 \quad (B4)$$

$$|R12/Cy-G12/B12| \geq 0.05 \quad (B5)$$

Inequality (B3) tests whether the ratio Cy/Z of sum signal Cy to sum signal Z is equal to or greater than a first prescribed value (1.0), inequality (B4) tests whether the absolute value of the difference between the ratio Ye/Mg of sum signal Ye to sum signal Mg and the ratio R12/Cy of color signal R12 to sum signal Cy is equal to or less than a second prescribed value (0.2), and inequality (B5) tests whether the absolute value of the difference between the ratio R12/Cy of color signal R12 to sum signal Cy and the ratio G12/B12 of color signal G12 to color signal B12 is equal to or greater than a third prescribed value.

Figure 37:
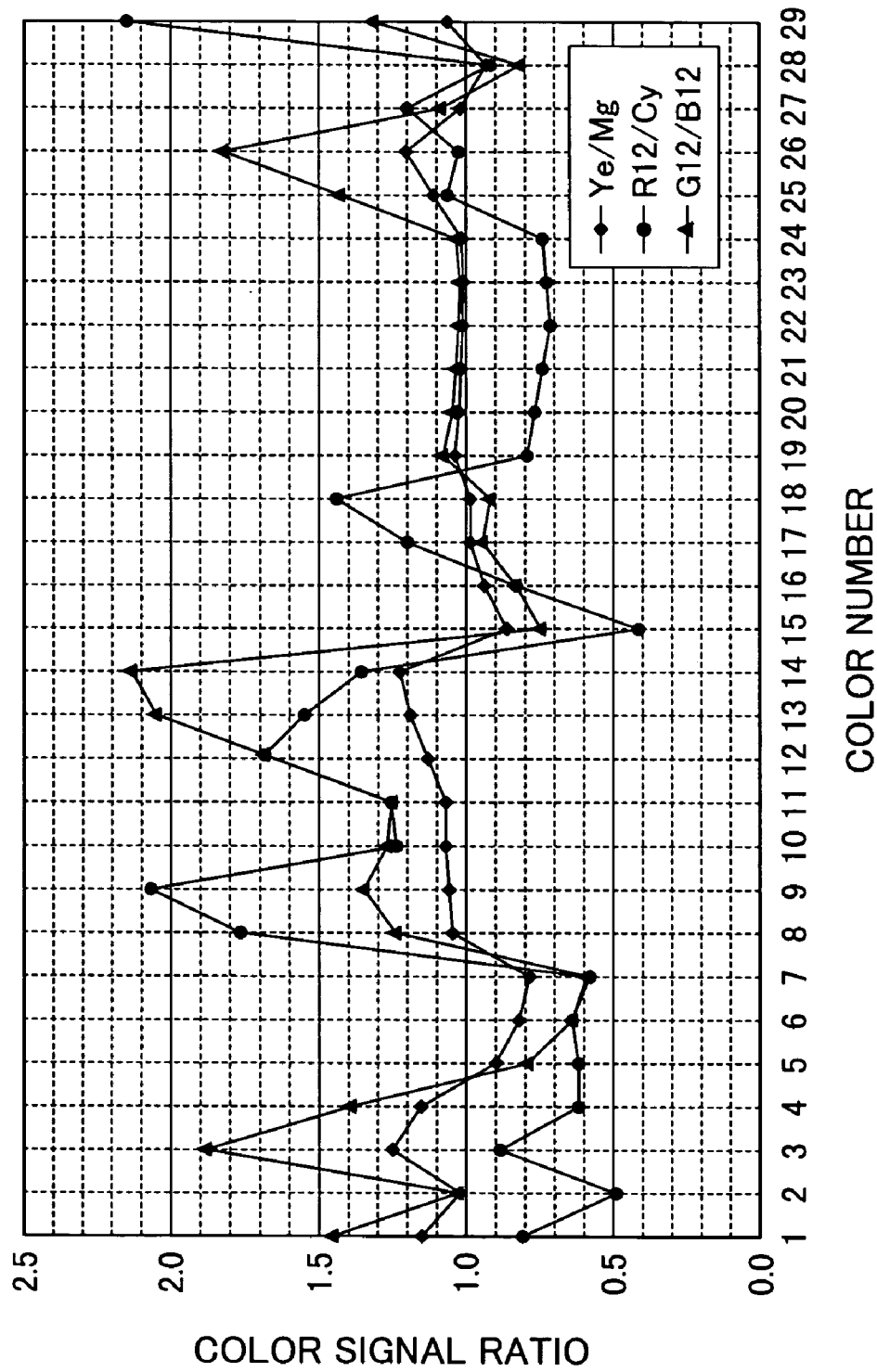
FIG. 37 shows the Ye/Mg, R12/Cy, and G12/B12 ratios of the signals used in color identification.

FIG. 37 shows the Ye/Mg, R12/Cy, and G12/B12 ratios of the twenty-four colors in the Macbeth Color checker and five exceptional colors. FIG. 38 shows the Cy/Z ratio of each patch. The color numbers of the patches in the Macbeth Color Checker are the same as the Macbeth Color-Checker numbers given above; color number 25 represents the color of a black synthetic fiber (black fabric), color number 26 represents foliage (1), color number 27 represents the color of a red synthetic fiber (red fabric), color number represents foliage (2), and color number 29 represents the color of a blue synthetic fiber (blue fabric (1)). If the color characteristics of each of the colors are ascertained using the seven signals mentioned above, it becomes possible to discriminate a majority of the colors comprising pigments (the color patches in the Macbeth Color Checker) and the exceptional colors such as the colors of foliage and synthetic fiber. Of the exceptional colors, the red synthetic fiber color could not be identified from inequalities (B3), (B4), and (B5); however, as shown in FIG. 36, since the color error of the red synthetic fiber color is 2.0 even when conventional matrix coefficients are used, it poses no problem if this color is not determined to be an exceptional color.

The color identifying means 142 discriminates the colors based on the above mentioned decision standard, and sets the value of the discrimination signal DS to '1' when it decides that the color is an exceptional color.

The coefficient deciding means 143 selects and outputs the first matrix coefficients or the second matrix coefficients according to the value of the discrimination signal DS supplied from the color identifying means 142. Specifically, the coefficient deciding means 143 outputs the first matrix coefficients set as described above when the value of the discrimination signal DS is zero, and outputs the second matrix coefficients when the value of the discrimination signal DS is one (when the color is an exceptional color).

The spectral sensitivity correction means 104 performs a matrix calculation using the first matrix coefficients or the second matrix coefficients supplied from the coefficient deciding means 143.

FIG. 39 shows the color error $\Delta E^*ab$, that is, the difference between the target colors and the colors reproduced by the matrix calculation described above from the twenty-four colors in the Macbeth Color Checker and the five exceptional colors. As shown in FIG. 39, the mean value of the color error of colors 25 to 29 is 3.8, which is smaller than the mean value of the color errors of colors 25 to 29 shown in FIG. 36, which was 11.3; this demonstrates that color reproducibility of the exceptional colors is greatly improved. If the matrix coefficients are switched by the spectral sensitivity characteristic correction means 6 in the above way according to whether the color is an exceptional color or not, it is possible to realize appropriate color reproducibility for any kind of color, and to correct for unnecessary signals due to incident near infrared light.

In the above example, the coefficient deciding means 143 outputs the first matrix coefficients or the second matrix coefficients according to the detection signal from the color identifying means 142, and the spectral sensitivity correction means 104 performs the matrix calculation using the supplied matrix coefficients; it is also possible for the spectral sensitivity correction means 104 to prestore the first and second matrix coefficients, and select either the first matrix coefficients or the second matrix coefficients to use in the matrix calculation according to the detection signal from the color identifying means 142. It is then unnecessary for the coefficient setting means 106 to have a coefficient deciding means 143. In this case, the coefficient deciding means can be considered to be incorporated into the spectral sensitivity correction means 104.

Though the spectral sensitivity correction means 104 performs a three-row-by-three-column matrix calculation in the above example, the matrix calculation performed by the spectral sensitivity correction means 104 is not limited to a calculation using a three-row-by-three-column coefficient matrix; for example, the spectral sensitivity correction means 104 may use input signals R12, G12, B12 raised to a power to perform the three-row-by-nine-column matrix calculation given by equation (B6). Similar effects are obtained if first matrix coefficients, suitable for normal colors such as the colors of pigments, and second matrix coefficients, suitable for exceptional colors such as the colors of foliage and synthetic fibers, are provided and used switchably, and additionally, since the number of the matrix coefficients increases, it is possible to further reduce the color error with respect to the target colors.

$$\begin{pmatrix} R13 \\ G13 \\ B13 \end{pmatrix} = \begin{pmatrix} r11 & r12 & r13 & r14 & r15 & r16 & r17 & r18 & r19 \\ g11 & g12 & g13 & g14 & g15 & g16 & g17 & g18 & g19 \\ b11 & b12 & b13 & b14 & b15 & b16 & b17 & b18 & b19 \end{pmatrix} \begin{pmatrix} R12 \\ G12 \\ B12 \\ R12^i \\ G12^i \\ B12^i \\ R12^j \\ G12^j \\ B12^j \end{pmatrix} \quad (B6)$$

In the above equation, r11 to r19, g11 to g19, and b11 to b19 represent matrix coefficients, i is a constant greater than unity, and j is a constant less than unity.

In the above example, the white balancing means 115 integrates the color signals over one screen, but it is possible to integrate the signals over more than one screen. Similarly, the ratios $\Sigma Rt/\Sigma Gt$ and $\Sigma Bt/\Sigma Gt$ of the integrated values may be ratios of values integrated over more than one screen.

In the above example, signals obtained from the imaging means 111 and having the spectral sensitivity curves indicated by the dashed lines in FIG. 7 were set as target signals; it is also possible to set signals obtained from the imaging means 111 and having spectral sensitivity curves identical to the color matching functions in FIG. 6 as the target signals. In other words, color signals obtained when the total characteristics from the color signal generating means 102 to the spectral sensitivity correction means 104 have spectral sensitivity curves that approximate the CIE 1931 color matching functions or spectral sensitivity curves obtained by a linear transformation thereof, or human chromatic curves or spectral sensitivity curves obtained by a linear transformation thereof, may be set as the target signals.

Embodiment B2

Figure 40:
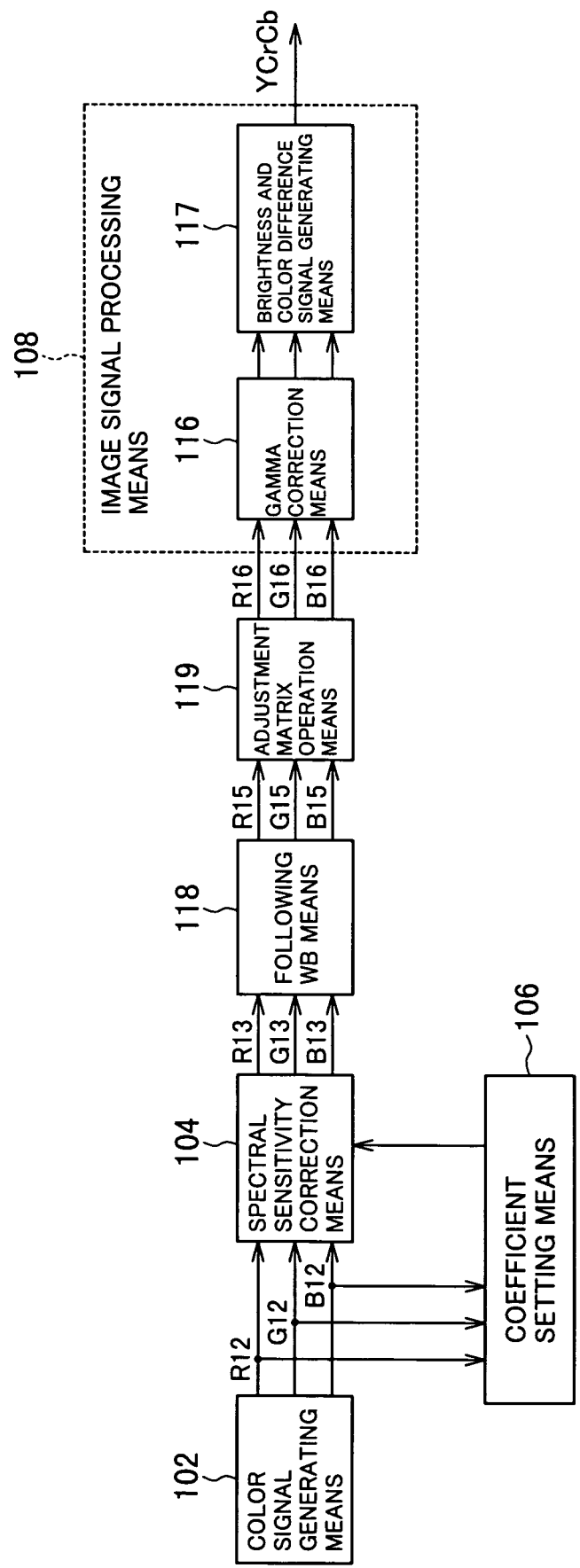
FIG. 40 is a block diagram showing the imaging device in embodiment B2 of this invention.

FIG. 40 is a schematic block diagram showing an imaging device according to embodiment B2 of this invention.

The imaging device in embodiment B2 is generally similar to the imaging device in embodiment B1 except that a following white balancing (WB) means 118 and a three-row-by-three-column adjustment matrix operation means 119 are provided between the coefficient setting means 106 and the image signal processing means 108.

The internal details of the color signal generating means 102 and coefficient setting means 106 are omitted in FIG. 40.

The white balancing means 115 in the color signal generating means 102 could be referred to as the preceding white balancing means to differentiate it from the following white balancing means 118.

The following white balancing means 118 performs a white balance process on the signals R13, G13, B13 output from the spectral sensitivity correction means 104 to output signals R15, G15, and B15.

Figure 41:
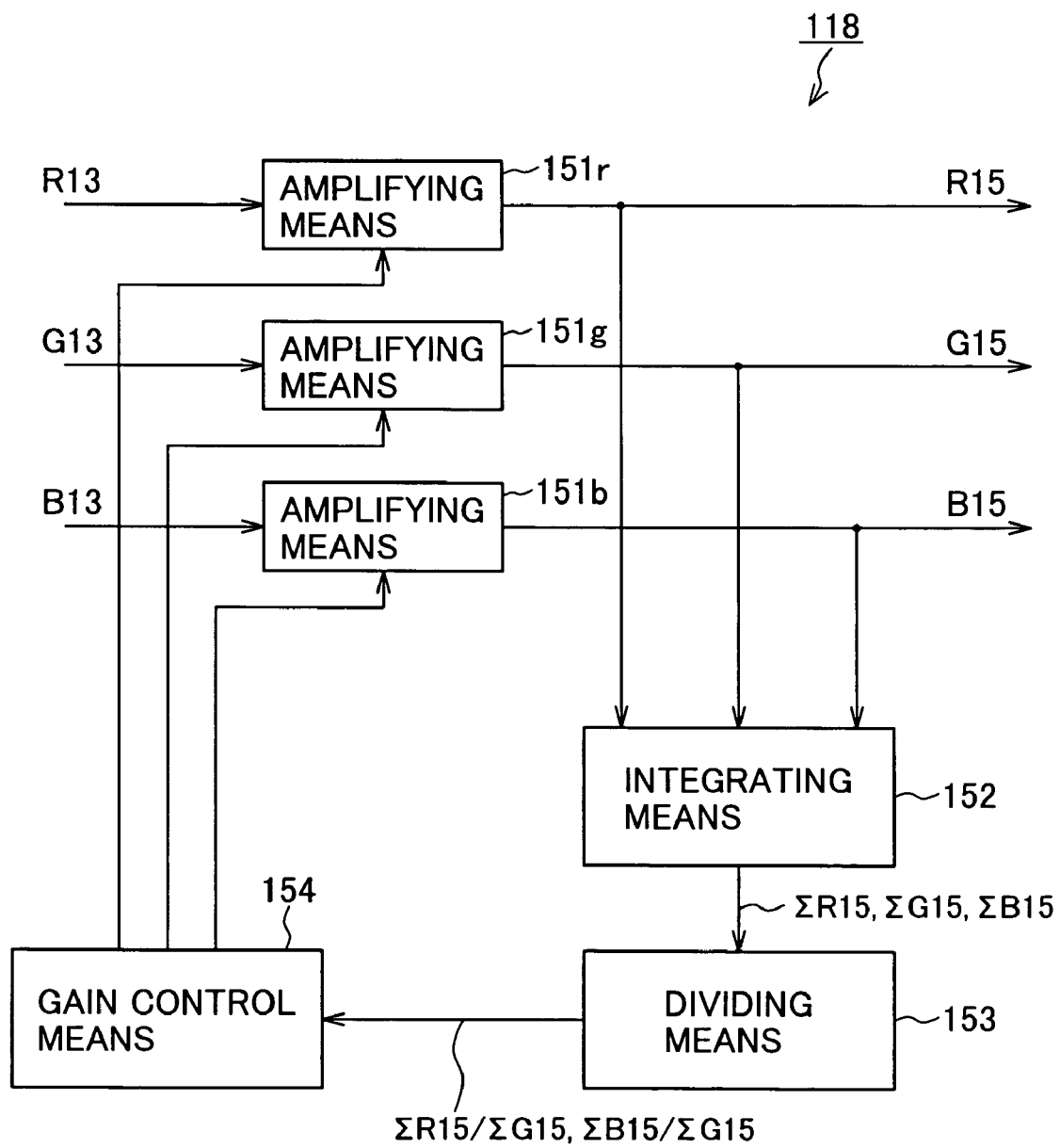
FIG. 41 is a block diagram showing an exemplary structure of the white balancing means 118 in FIG. 40.

As shown in FIG. 41, the following white balancing means 118 has amplifying means 151r, 151g, and 151b for amplifying color signals R13, G13, and B13 to generate color signals R15, G15, and B15, a integrating means 152 for integrating color signals R15, G15, and B15 to generate integrated values $\Sigma R15$, $\Sigma G15$, and $\Sigma B15$, a dividing means 153 for obtaining the ratios $\Sigma R15/\Sigma G15$ and $\Sigma B15/\Sigma G15$ of the integrated values, and a display driving means 154 for controlling the gain of amplifying means 151r, 151g, and 151b according to the ratios $\Sigma Rl5/\Sigma G15$ and $\Sigma Bl5/\Sigma G15$ of the integrated values output from the dividing means 153.

As described above, the spectral sensitivity correction means 104 carries out a color correction process by performing a matrix calculation on the R12, G12, and B12 signals to obtain color signals having the spectral sensitivity curves indicated by the dashed lines in FIG. 7 that are set as the color target; exactly the same values as the signals of the color target cannot be obtained, however, and error occurs for each patch as listed in FIG. 39.

Therefore, although the white balance is preadjusted in the white balancing means 115, the white balance adjustment itself is slightly in error, by the amounts listed above; in order to correct this error, the values of the signals integrated over the entire screen are recalculated by the integrating means 152, and using the ratios of the integrated values calculated by the dividing means 153, the display driving means 154 performs another white balance process to equalize the ratios of the integrated values. It is thereby possible to perform a more precise white balance adjustment.

The adjustment matrix operation means 119 performs a three-row-by-three-column matrix calculation to change the color reproducibility. In this invention, color signals obtained through the spectral sensitivity curves indicated by dashed lines in FIG. 7 are set as color target signals Rt, Gt, Bt; however, the spectral sensitivity curves indicated by dashed lines in FIG. 7 and human spectral sensitivity curves (color matching functions) do not match perfectly.

Generally, the spectral sensitivity curves (color matching functions) of the imaging device should match the human spectral sensitivity curves completely, or alternatively, they should satisfy the Luther condition, according to which they are a linear transformation of the human spectral sensitivity curves; however, since the spectral sensitivity curves of the imaging device differ from the human spectral sensitivity curves, in order to obtain good color reproducibility under specific types of typical illumination, a color adjustment is carried by the adjustment matrix operation means 119, for example, so that the colors approximate the colors perceived by the human eye. An imaging device is in practice not a full-scale color measuring device, and so conventional commercial imaging devices are generally thought to be acceptable, but when there is still concern over the difference from the colors perceived by the human eye, a three-row-by-three-column matrix calculation is performed to further improve the color reproducibility.

The color signals R16, G16, and B16 obtained by implementing such improvements are input to the gamma correction means 116.

Embodiment B3

Figure 42:
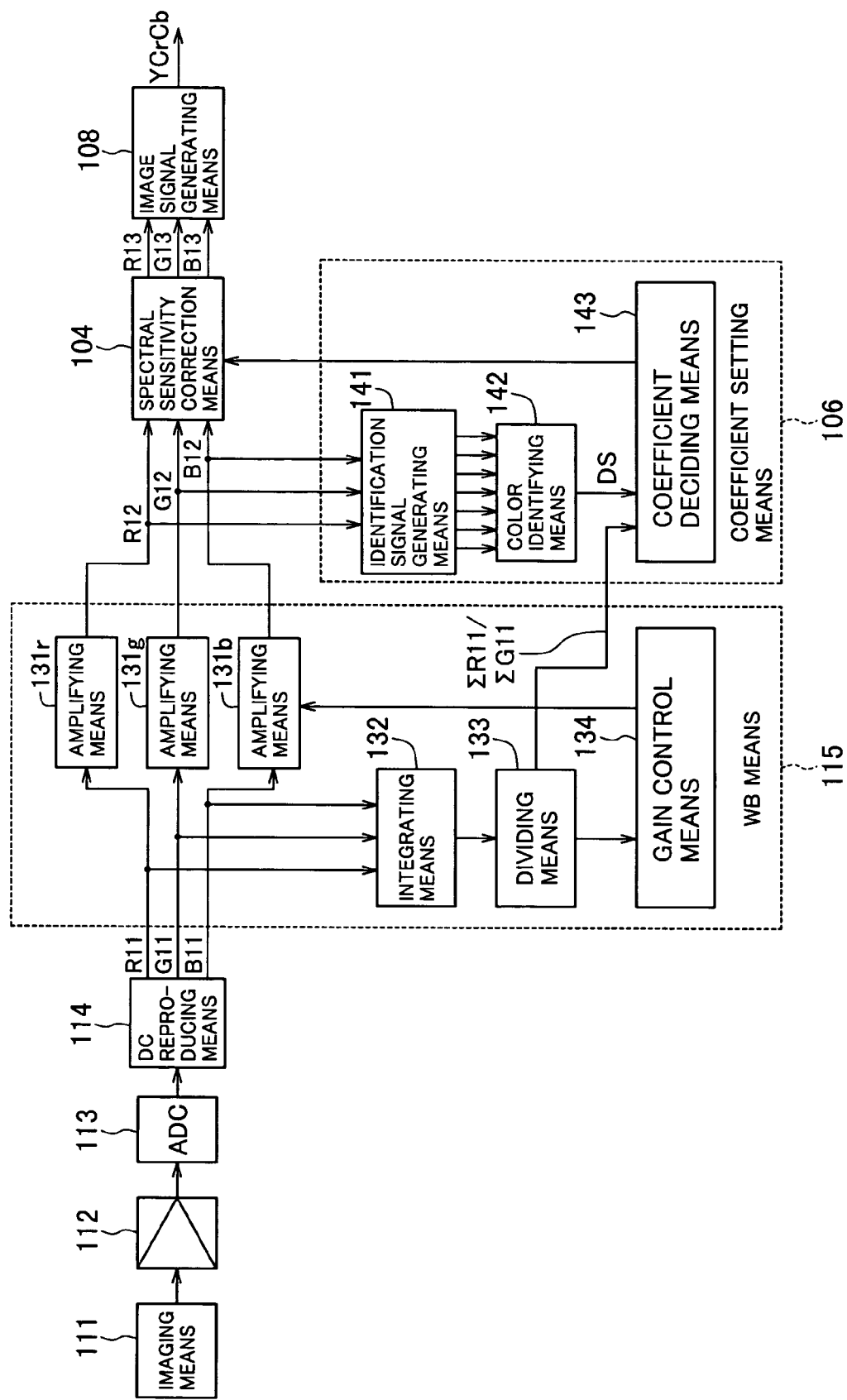
FIG. 42 is a block diagram showing the imaging device in embodiment B3 of this invention.

FIG. 42 is a schematic block diagram showing an imaging device according to embodiment B3 of this invention.

The imaging device in embodiment B3 is generally similar to the imaging device in embodiment B1, and FIG. 42 is similar to FIG. 27 except that FIG. 42 includes the internal details of the white balancing means 115, which are similar to those shown in FIG. 29. The internal details of the image signal processing means 108 are omitted.

The imaging device in embodiment B3 differs from the imaging device in embodiment B1 in that the output $\Sigma R11/\Sigma G11$ of the ADC 113 in the white balancing means 115 is input to the coefficient deciding means 143, and different sets of matrix coefficients corresponding to the values of a plurality of different color temperatures are stored in the coefficient deciding means 143; the coefficient deciding means 143 selects one set of matrix coefficients from the multiple sets of matrix coefficients, and selects and outputs the first and second matrix coefficients from the selected set according to the output of the color identifying means 142.

The imaging device in embodiment B3 achieves good color reproducibility regardless of the color temperature of the illumination by changing the matrix coefficients used in the spectral sensitivity correction means 104 according to the color temperature of the illumination.

Since the spectral sensitivity curves of the imaging means (FIG. 28) differ from the ideal spectral sensitivity curves, color reproducibility varies depending on the color temperature of the illumination. The matrix coefficients used to carry out color correction are calculated so as to match the color reproducibility obtained from the ideal spectral sensitivity curves under illumination with a certain color temperature, resulting in a conditional color match. Therefore, when the color temperature of the illumination varies, it is necessary to change the matrix coefficients for converting the obtained colors to the target colors (color correction) according to the color temperature of the illumination.

The color temperature can be derived from the ratio $\Sigma R11/\Sigma G11$ (or $\Sigma B11/\Sigma G11$) based on the graph shown in FIG. 30. When the matrix coefficients are changed according to the color temperature of the illumination, the corrective matrix calculation is performed using the following equation (B7) instead of equation (B2).

$$\begin{pmatrix} R13 \\ G13 \\ B13 \end{pmatrix} = \begin{pmatrix} e11(ct) & e12(ct) & e13(ct) \\ e21(ct) & e22(ct) & e23(ct) \\ e31(ct) & e32(ct) & e33(ct) \end{pmatrix} \begin{pmatrix} R12 \\ G12 \\ B12 \end{pmatrix}$$

$$= \begin{pmatrix} e11(\Sigma R11/\Sigma G11) & e12(\Sigma R11/\Sigma G11) & e13(\Sigma R11/\Sigma G11) \\ e21(\Sigma R11/\Sigma G11) & e22(\Sigma R11/\Sigma G11) & e23(\Sigma R11/\Sigma G11) \\ e31(\Sigma R11/\Sigma G11) & e32(\Sigma R11/\Sigma G11) & e33(\Sigma R11/\Sigma G11) \end{pmatrix} \begin{pmatrix} R12 \\ G12 \\ B12 \end{pmatrix}$$
(B7)

ct indicates color temperature, and e11(ct) to e33(ct) indicate that e11 to e33 depend on ct. Similarly, e11($\Sigma R11/\Sigma G11$) to e33($\Sigma R11/\Sigma G11$) indicate that e11 to e33 depend on $\Sigma R11/\Sigma G11$.

The matrix coefficients e11($\Sigma R11/\Sigma G11$) to e33($\Sigma R11/\Sigma G11$) for different color temperatures are obtained in the following way. For example, the twenty-four colors in the Macbeth Color Checker are used; red, green, and blue color signals are obtained through the spectral sensitivity curves in FIG. 28 for each color temperature, and the white balance adjustment described above is performed on the signals to obtain signals R12, G12, and B12; red, green, and blue color signals are obtained through the ideal spectral sensitivity curves (indicated by dashed lines in FIG. 7) for each color temperature, and the white balance adjustment described above is performed on these signals to obtain signals Rt, Gt, and Bt; and matrix coefficients making the values of signals R12, G12, and B12 equal the values of signals Rt, Gt, and Bt are obtained by the least squares method. Similarly, exceptional colors are used to obtain second matrix coefficients for each color temperature. In this way, sets of first and second matrix coefficients are obtained for every color temperature for which the calculations are carried out. A greater number of different color temperatures enables a more precise color correction to be made. It is also possible to use a mathematical formula to change the coefficients by different amounts according to the color temperature.

As described above, since the ratio $\Sigma R11/\Sigma G11$ corresponds to the color temperature, different sets of first matrix coefficients for normal colors and second matrix coefficients for exceptional colors are prestored in the coefficient deciding means 143, indexed according to the ratio $\Sigma R11/\Sigma G11$, which corresponds to the color temperature. The coefficient deciding means 143 thus stores multiple sets of matrix coefficients for multiple color temperatures.

The dividing means 133 calculates the ratios $\Sigma R1/\Sigma G11$ and $\Sigma B11/\Sigma G11$ of the integrated color signals and outputs the ratios to the gain control means 134; in this embodiment, the ratio $\Sigma R11/\Sigma G11$ is also output to the coefficient deciding means 143.

The coefficient deciding means 143 selects one set of matrix coefficients from the multiple sets of matrix coefficients according to the value of the ratio $\Sigma R11/\Sigma G11$ supplied from the dividing means 133, selects the first matrix coefficients or the second matrix coefficients from the selected set of matrix coefficients, and outputs the selected matrix coefficients to the spectral sensitivity correction means 104. The spectral sensitivity correction means 104 performs a corrective matrix calculation using the matrix coefficients supplied from the coefficient deciding means 143. It is thereby possible to realize good color reproducibility by selecting appropriate coefficients for the correction matrix according to the color temperature of the illumination and also according to whether the color is an exceptional color.

It is possible for the spectral sensitivity correction means 104 to prestore multiple sets of first matrix coefficients indexed by color temperature and second matrix coefficients indexed by color temperature and select either the first or the second matrix coefficients according to the identification signal received from the color identifying means 142, then select one set of matrix coefficients from the multiple sets of matrix coefficients according to the ratio $\Sigma R11/\Sigma G11$ received from the dividing means 133.

The sets of matrix coefficients used in the above example are indexed by the ratio $\Sigma R11/\Sigma G11$, corresponding to the color temperature, but it is also possible to index the sets of matrix coefficients according to the ratio $\Sigma B11/\Sigma G11$, which likewise corresponds to the color temperature. Since the ratios ΣR11/ΣG11 and ΣB11/ΣG11 are related by a one-to-one correspondence, it makes no real difference which ratio is used. The reciprocals of the ratios can also be used with no real difference.

Embodiment B4

In the above embodiments B1 to B3, when the processes are carried out for still images, it is possible to realize the above processes, particularly the steps carried out in the white balancing means 115 and the subsequent steps, by use of software, that is, by a programmed computer.

Embodiment B5

The imaging devices in the above embodiments are applicable to a video camera, a camcorder, a digital still camera, a PC camera, or a digital still camera built into a mobile phone or a mobile terminal device, and may be used for imaging either moving or still images; there is no need to mount an IRCF, and the imaging devices may also be applied to surveillance cameras and cameras on board vehicles, which are often used under dark conditions.

Figure 43:
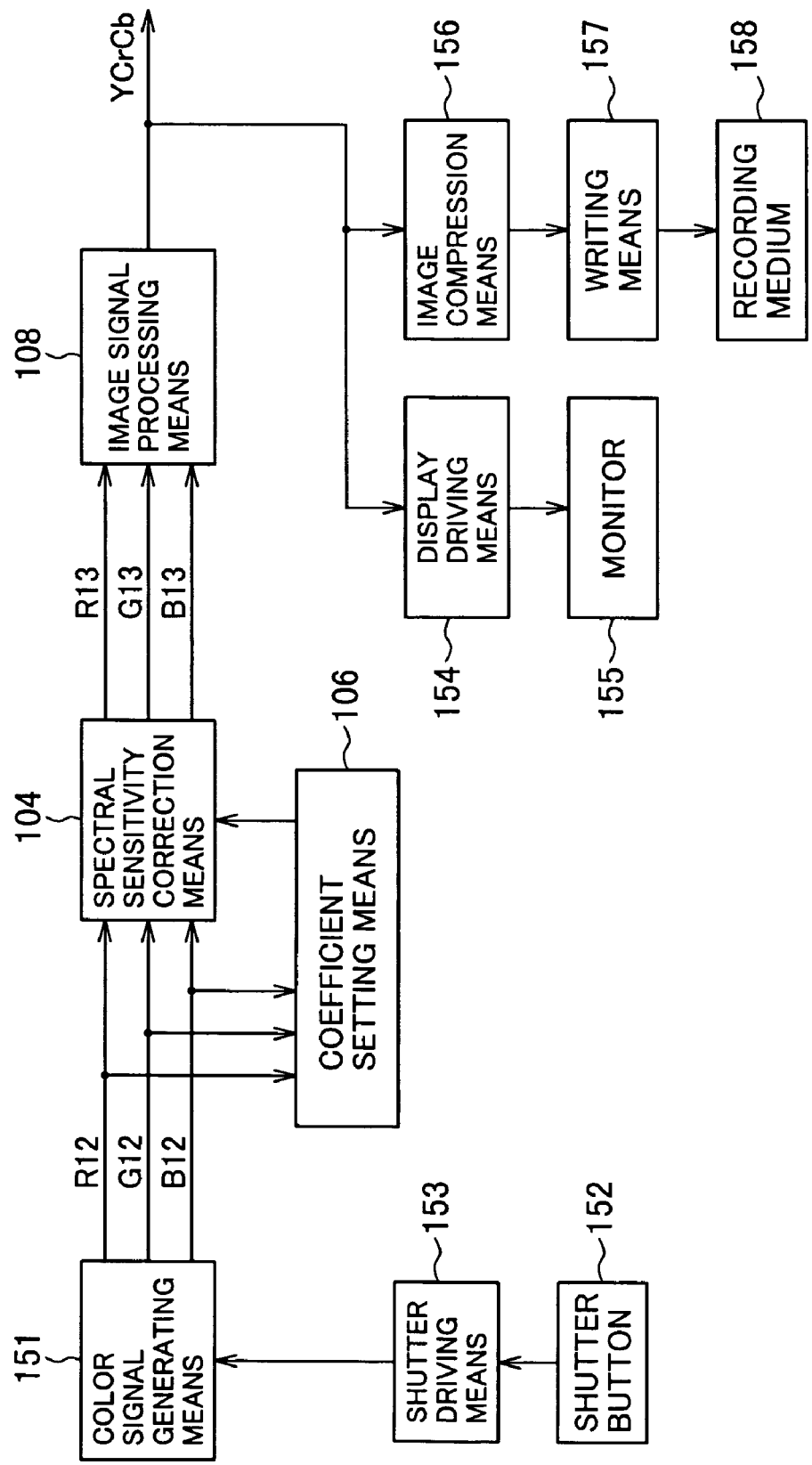
FIG. 43 is a block diagram showing the structure of the camera in embodiment B5.

An exemplary structure of a digital still camera having the imaging device will now be described with reference to FIG. 43. As shown in FIG. 43, in addition to the elements constituting the imaging device in FIG. 27, this digital still camera has a color signal generating means 151 in place of a color signal generating means 102, and further has a shutter button 152, a shutter driving means 153, a display driving means 154, a monitor 155, an image compression means 156, and a writing means 157.

The shutter driving means 153 activates a shutter in the color signal generating means 151 in response to the operation of the shutter button 152. The display driving means 164 receives the output of the image signal processing means 108 and displays an image on the monitor 155, which is used as the viewfinder. The monitor 155 includes a liquid crystal display device, for example, and is activated by the display driving means 154 to display the image captured by the imaging means in the color signal generating means 151. The image compression means 156 receives the output of the image signal processing means 108 and performs image compression as specified in the JPEG standard, for example. The writing means 157 writes the data compressed by the image compression means 156 into the recording medium 158.

When the imaging device is used to capture a moving image and the image data are transmitted to a device not shown in the drawing, the output of the brightness and color difference signal generating means 117 is encoded to generate and output an NTSC signal.

Embodiment C1

Figure 44:
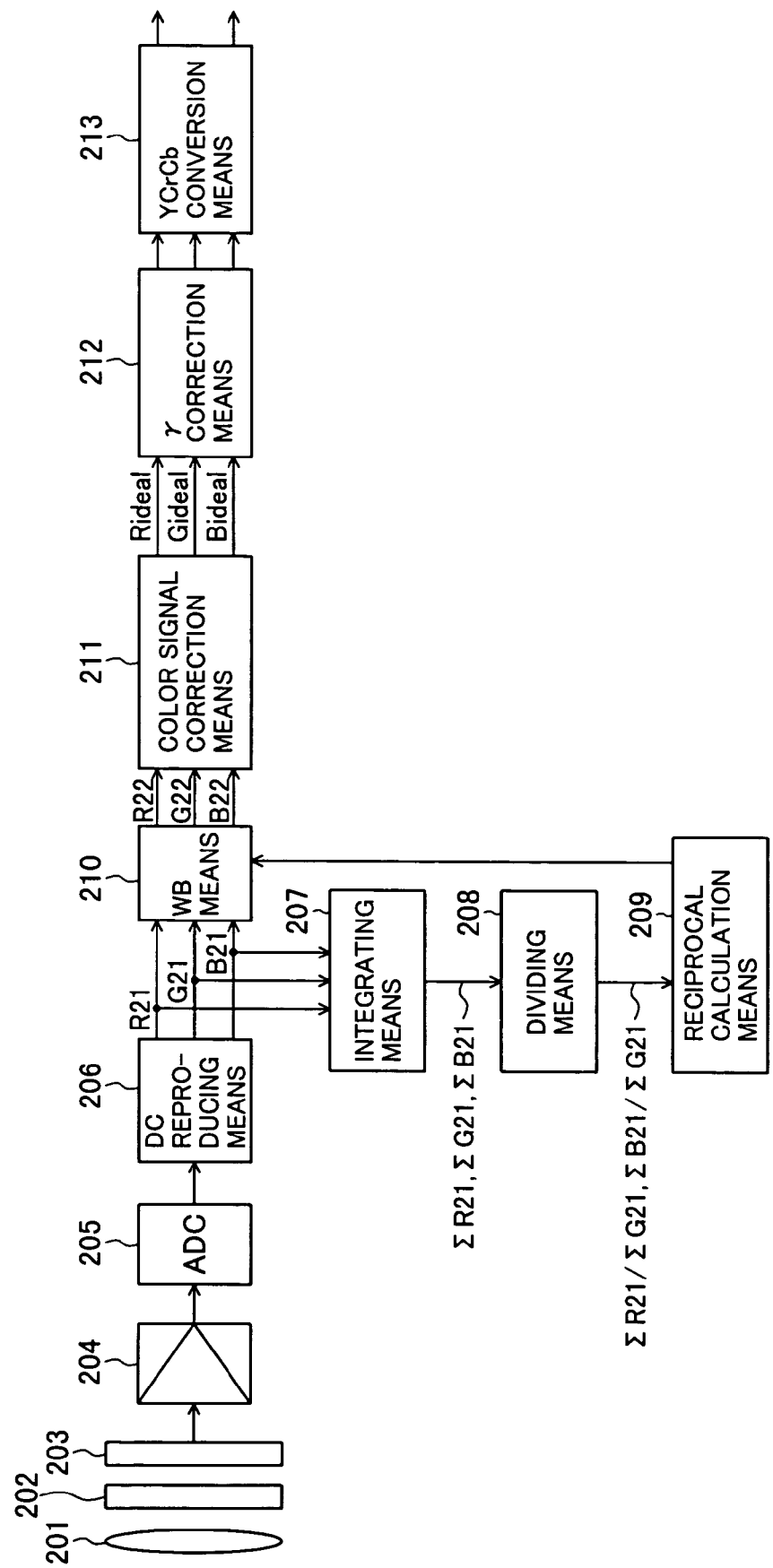
FIG. 44 is a block diagram showing the structure of the imaging device in embodiment C1 of this invention.

FIG. 44 is a schematic block diagram showing the imaging device in embodiment C1 of this invention. In FIG. 44, the lens 201 focuses the light reflected from the subject to be imaged by the inventive imaging device on the photoreceptive surface of the imaging element 203. First, however, the focused light enters the optical filter 202.

The optical filter 202 is disposed between the lens 201 and the imaging element 203, and attenuates incident light in a prescribed wavelength region (details will be given later). The light exiting the optical filter 202 strikes the photoreceptive surface mentioned above.

Figure 45:
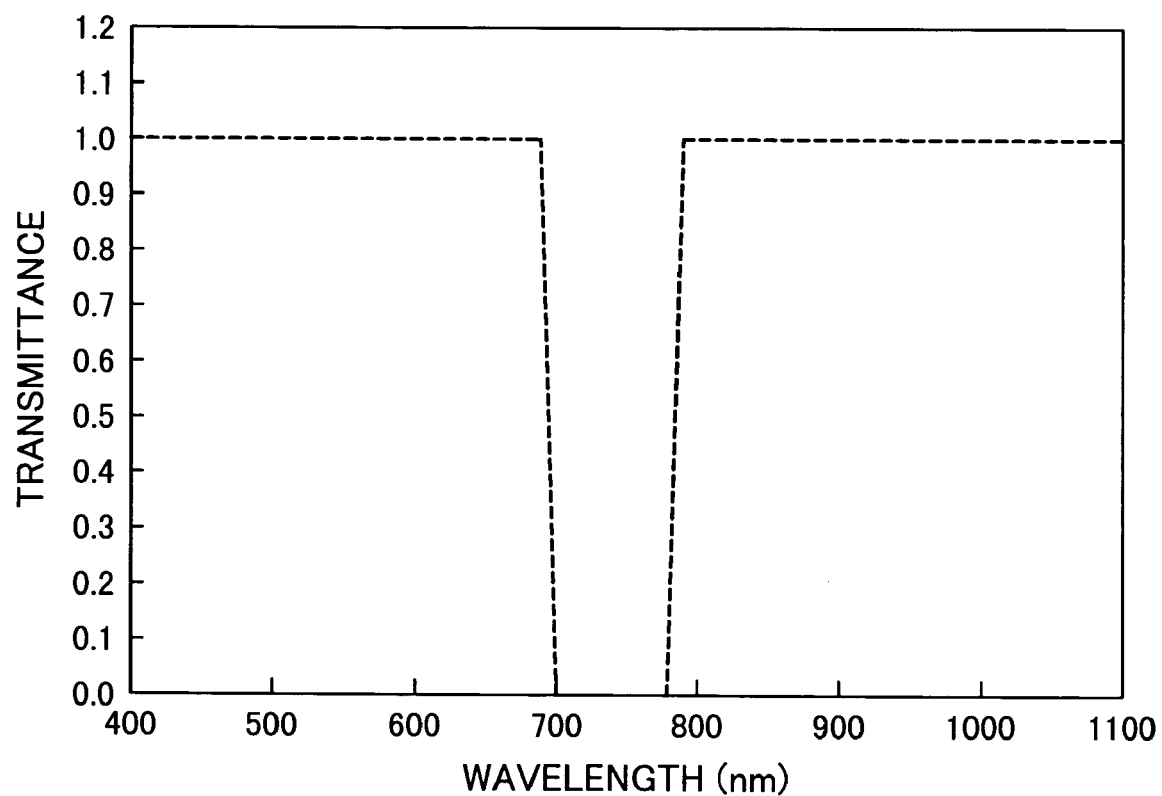
FIG. 45 is a graph illustrating the transmittance of the optical filter 202 in embodiment C1.

FIG. 45 is a graph illustrating the transmittance of the optical filter 202 in embodiment C1. As shown in FIG. 45, the optical transmittance of the optical filter 202 in embodiment C1 is low in the wavelength region from substantially 700 nm to 780 nm, and high in other regions. In the description below, the optical filter 202 is referred to as a long-wavelength optical filter 202 or near infrared band-cut filter (NIRBCF) 202.

The imaging element 203 outputs red, green, and blue signals (also referred to below as color signals) corresponding to the light exiting the NIRBCF 202 to the amplifying means 204. An appropriate imaging element 203 is, for example, a charge coupled device (CCD) sensor or a complimentary metal oxide semiconductor (CMOS) sensor.

When the imaging device is equipped with a single CCD sensor or CMOS sensor (hereinafter referred to as a single element sensor), color filters for resolving different colors of incident light (hereinafter referred to as color separation filters) are disposed on the single sensor element. The color separation filters comprise a plurality of color filters corresponding to the pixels of the imaging element 203.

To obtain color signals corresponding to the colors red, green, and blue, for example, red (R), green (G), and blue (B) primary color filters that pass optical bands corresponding to red, green, and blue may be used as color separation filters. It is also possible to use complementary filters comprising magenta (Mg), cyan (Cy), yellow (Ye), and green (G) color filters. Embodiment C1 describes a case in which primary color filters are disposed on the imaging element 203.

Specifically, the above-described CCD or CMOS or other imaging element 203 comprises photodiodes (not shown), and the photodiodes constitute the pixels of the imaging element. The primary color filters are disposed on the imaging element 203; the red filters that pass red light, the green filters that pass green light, and the blue filters that pass blue light are disposed on respective photodiodes.

The photodiodes with red filters generate the red signal, the photodiodes with green filters generate the green signal, and the photodiodes with blue filters generate the blue signal; the red, green, and blue signals are output from the imaging element 203 to the amplifying means 204.

The amplifying means 204 amplifies the signals output from the imaging element 203 and outputs the signals to the analog-to-digital converter 205 (hereinafter referred to as the ADC 205). The ADC 205 converts the signals output from the amplifying means 204 to digital signals and outputs the signals to the DC reproducing means 206. The DC reproducing means 206 reproduces the direct current levels based on the digital signals output from the ADC 205 and outputs the red, green, and blue signals to the integrating means 207 and the white balancing means 210.

Direct current reproduction is usually carried out so that the black level of the image signal is zero; this is done by a DC shift of the offset level of the image signals output from the amplifying means 204, or by a clamping process on the image signals. In the following description, the red, green, and blue signals output from the DC reproducing means 206 are referred to as the first red signal, the first green signal, and the first blue signal, or alternatively, as R21, G21, and B21.

The integrating means 207 integrates the values corresponding to the signals R21, G21, and B21 output from the DC reproducing means 206 over at least one screen, operating a screen at a time, and calculates the integrated values ΣR21 corresponding to R21, ΣG21 corresponding to G21, and ΣB21 corresponding to B21. The integrating means 207 outputs the signals corresponding to each integrated value to the dividing means 208.

The dividing means 208 divides ΣR21 or ΣB21 as output from the integrating means 207 by ΣG21 to obtain the ratios ΣR21/ΣG21 and ΣB21/ΣG21 of the integrated values. The dividing means 208 then outputs the ratios ΣR21/ΣG21 and ΣB21/ΣG21 of the integrated values to the reciprocal calculation means 209. The reciprocal calculation means 209 calculates the reciprocal of the ratios of the integrated values, that is, the reciprocal of ΣR21/ΣG21 (also referred to below as the first reciprocal) and the reciprocal of ΣB21/ΣG21 (also referred to below as the second reciprocal) and outputs the values to the white balancing means 210.

The white balance means 210 performs a white balance adjustment based on the signals R21, G21, and B21 output from the DC reproducing means 206 and the first and second reciprocals output from the reciprocal calculation means 209.

Specifically, the white balancing means 210 has amplifying means (not shown) corresponding to the R21, G21, and B21 signals, and the amplifying means corresponding to R21 amplifies the R21 signal with a gain coefficient equal to the first reciprocal (the reciprocal of ΣR21/ΣG21). Similarly, the amplifying means corresponding to B21 amplifies the B21 signal with a gain coefficient equal to the second reciprocal (the reciprocal of ΣB21/ΣG21). The gain coefficient in the amplifying means corresponding to G21 is set to '1'.

As described above, the white balancing means 210 performs a white balance adjustment by amplifying signals R21, G21, and B21 with the amplifying means corresponding to each signal, and outputs the red, green, and blue signals after white balance adjustment to the color signal correction means 211. In the following description, the red, green, and blue signals output from the white balancing means 210 are referred to as the second red signal, the second green signal, and the second blue signal, or alternatively, as R22, G22, and B22, respectively.

The color signal correction means 211 performs a matrix calculation based on the signals R22, G22, and B22 output from the white balancing means 210 to correct the signals R22, G22, and B22 such that the colors in the image captured by the imaging device match predetermined target colors (details will be given later). The color signal correction means 211 then outputs the red signal, the green signal, and the blue signal obtained as a result of the correction to the γ (gamma) correction means 212.

The matrix coefficients used in the matrix calculation performed in the color signal correction means 211 are set on the basis of the above the target colors (details will be given later). In the following description, the color signals output from the color signal correction means 211 are referred to as Rideal, Gideal, and Bideal.

Specifically, the color signal correction means 211 performs a linear matrix calculation given by equation (C1) below according to signals R22, G22, and B22 to correct the red, green, and blue signals so that the colors reproduced in the inventive imaging device match the target colors.

$$\begin{pmatrix} Rideal \\ Gideal \\ Bideal \end{pmatrix} = \begin{pmatrix} r21 & r22 & r23 \\ g21 & g22 & g23 \\ b21 & b22 & b23 \end{pmatrix} \begin{pmatrix} R22 \\ G22 \\ B22 \end{pmatrix} \quad (C1)$$

In equation (C1), r21, r22, r23, g21, g22, g23, b21, b22, and b23 represent matrix coefficients, which are predetermined constants (details will be described later). Hereinafter, the matrix coefficients are referred to as correction matrix coefficients, and the matrix comprising the correction matrix coefficients is referred to as the correction coefficient matrix.

The γ correction means 212 performs a gamma correction on the signals Rideal, Gideal, and Bideal output from the color signal correction means 211. Specifically, the γ correction means 212 performs a nonlinear transformation on the color signals output from the color signal correction means 211. The YCrCb conversion means 213 converts the signals Rideal, Gideal, and Bideal output from the γ correction means 212 to a Y signal, Cr signal, and Cb signal, and outputs the converted signals. The Y signal is the brightness signal, and the Cr signal and the Cb signal are color difference signals.

The conversion of the color signals (signals Rideal, Gideal, and Bideal in embodiment C1) to the brightness signal and color difference signals is usually carried out by performing a matrix calculation on the color signals using a three-row-by-three-column coefficient matrix. Specifically, a linear matrix calculation given by equation (C2) below is performed.

$$\begin{pmatrix} Y \\ Cr \\ Cb \end{pmatrix} = \begin{pmatrix} y1 & y2 & y3 \\ cr1 & cr2 & cr3 \\ cb1 & cb2 & cb3 \end{pmatrix} \begin{pmatrix} Rideal \\ Gideal \\ Bideal \end{pmatrix} \quad (C2)$$

The matrix coefficients in the three-row-by-three-column coefficient matrix in equation (C2) (which may be referred to as conversion matrix coefficients, while the matrix comprising the conversion matrix coefficients is referred to as the conversion coefficient matrix) are set to, for example, the following values, which are specified in standard 61966-2-1 of the International Electrotechnical Commission (IEC): y1=0.2990, y2=0.5870, y3=0.1140, cr1=0.5000, cr2=−0.4187, cr3=−0.0813, cb1=−0.1687, cb2=−0.3313, and cb3=0.5000.

The brightness signal and the color difference signals output from the YCrCb conversion means 213 are processed according to the apparatus or system to which the inventive imaging device is applied. For example, when the imaging device is applied to a digital camera or a mobile phone, the brightness signal and the color difference signals output from the YCrCb conversion means 213 are compressed as specified in the JPEG standard, and then stored in a memory means such as a semiconductor memory or a prescribed storage medium. When the brightness signal and the color difference signals output from the YCrCb conversion means 213 are used as television signals, the brightness signal and the color difference signals are encoded into NTSC signals, for example.

The correction of the color signals (also referred to below as color correction) in the color signal correction means 211 will now be described in detail.

Figure 46:
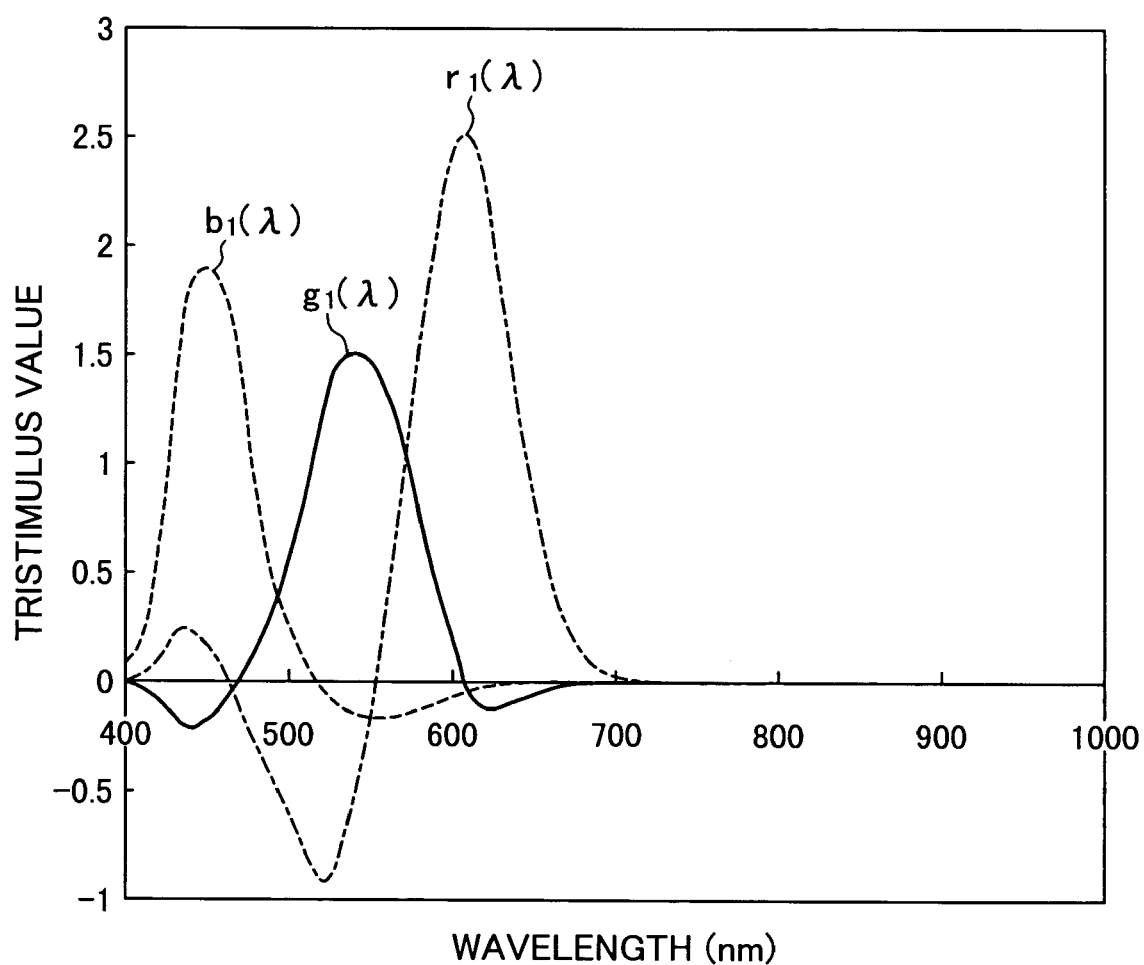
FIG. 46 is a graph illustrating color matching functions.

FIG. 46 is a graph illustrating the red, green, and blue spectral sensitivity curves representing human chromatic characteristics (which may be referred to as the color-matching functions of the red, green, and blue color system, or simply as color-matching functions). In FIG. 46, the horizontal axis indicates the wavelength, and the vertical axis indicates the tristimulus value.

The curves shown in FIG. 46 represent the mean values of the color-matching functions of a person with normal color vision, as specified by the Commission Internationale de l'Eclairage (CIE) in 1931.

When the adaptability of human color perception (for example, human chromatic adaptability or the like) is not taken into account, color perceived by humans may be expressed in a simplified manner if the color-matching functions corresponding to the colors red, green, and blue (r1(λ), g1(λ), and b1(λ)) shown in FIG. 46, the spectral reflectance of the subject, and the spectral radiant intensity of the illumination are multiplied together, and the resulting products are integrated in the visible spectral region according to each color (thereby obtaining three integrated values, integrated separately for the colors red, green, and blue). The color-matching functions are known, and the spectral reflectance of the subject and the spectral radiant intensity of the illumination are unambiguously determined if the subject and the illumination are determined. Therefore, once the subject and the illumination are decided on, it is possible to obtain the three integrated values. In the imaging device in embodiment C1, colors obtained from the color-matching functions shown in FIG. 46 are set as color targets. Good color reproducibility is said to be achieved when colors are reproduced so that they approximate the colors obtained from the color-matching functions.

As shown in FIG. 46, the human chromatic curves are sensitive only in the wavelength region from 380 nm to 780 nm, which is the so-called visible spectral region. Even in the visible spectral region, there is barely any sensitivity on the longer wavelength side of the visible spectral region, specifically, in the longer wavelength region beyond 700 nm.

On the other hand, the imaging element 203 has photodiodes for performing photoelectric conversion formed from a semiconductor material such as silicon (Si). The imaging element 203 is therefore sensitive from the visible spectral region to the near infrared region (around 1000 nm) Thus, when the imaging means 1 is provided with red, green, and blue color filters for resolving different colors, red, green, and blue signals corresponding to the products of the spectral curves of the color filters and the spectral sensitivity curves of the photodiodes are output from the imaging element 203.

Figure 47:
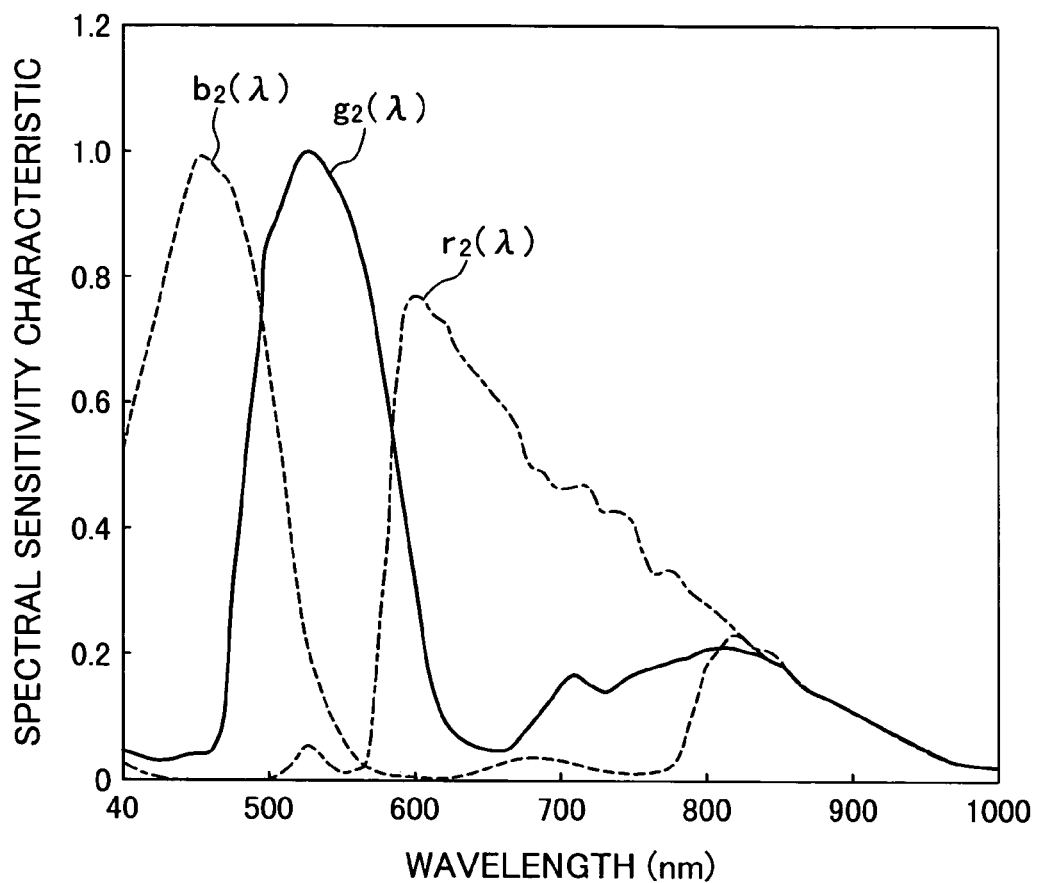
FIG. 47 is a graph illustrating the spectral sensitivity curves of the imaging element.

FIG. 47 is a graph illustrating the spectral sensitivity curves of the imaging element 203. FIG. 47 shows the spectral sensitivity curves of the red, green, and blue signals of the imaging element 203 represented by the products of the spectral curves of the color filters and the spectral sensitivity curves of the photodiodes constituting the imaging element 203; the vertical axis indicates the spectral sensitivity characteristics, and the horizontal axis indicates the wavelength. In the graph, $r2(\lambda)$ denotes the red spectral sensitivity curve, $g2(\lambda)$ denotes the green spectral sensitivity curve, and $b2(\lambda)$ denotes the blue spectral sensitivity curve.

The spectral sensitivity curves will now be described in detail. In FIG. 47, the spectral sensitivity curve ($b2(\lambda)$) corresponding to the blue signal begins rising at a wavelength of substantially 380 nm and peaks at around 450 nm, after which it decreases and remains low from substantially 550 nm onward. It then becomes comparatively high again after substantially 800 nm in the infrared region.

The spectral sensitivity curve ($g2(\lambda)$) corresponding to the green signal begins rising at a wavelength of substantially 450 nm and peaks at around 550 nm, after which it decreases until it drops to a minimum at around 650 nm. It then becomes comparatively high again after substantially 700 nm. The spectral sensitivity curve ($r2(\lambda)$) corresponding to the red signal begins rising at a wavelength of substantially 560 nm and peaks at around 600 nm, after which it decreases gradually in the infrared region.

The red color filter has a relatively high transmittance in the infrared region, compared to the other color filters, and so the imaging element 203 is sensitive to infrared light. The blue color filter that passes blue light and the green color filter that passes green light also have a certain transmittance in the near infrared region. This is because the red, green, and blue filters are usually constructed using dyes or pigments containing the respective colors, and the spectral transmittances of the filters depend on their constituent materials; their transmittance curves become comparatively high again from the longer wavelength side of the visible spectral region to the infrared region.

If the color-matching functions (human chromatic curves) shown in FIG. 46 and the spectral sensitivity curves ($r2(\lambda)$, $g2(\lambda)$, and $b2(\lambda)$) of the imaging element 203 shown in FIG. 47 are compared, they differ greatly in that the imaging element 203 is sensitive from the longer wavelength side of the visible spectral region to the infrared region, but the human chromatic curves are insensitive in that wavelength region. The difference between the spectral sensitivity curves is particularly significant in the infrared region (from 780 nm to 1100 nm).

A conventional imaging device addresses the difference between the color-matching functions and the spectral sensitivity curves of the imaging element 203 in the infrared region and eliminates the effects of the infrared spectral sensitivity of the imaging element 203 by placing an infrared cut filter (IRCF) between the lens 201 and the imaging element 203 to block rays in the infrared region.

The IRCF used in a conventional imaging device has one hundred percent optical transmittance in the short wavelength region up to a wavelength of substantially 650 nm, but its transmittance drops sharply in the range of substantially 650 nm to 700 nm, after which there is barely any transmittance at all in the long wavelength region (infrared region), where sensitivity of the imaging element vanishes.

Figure 48:
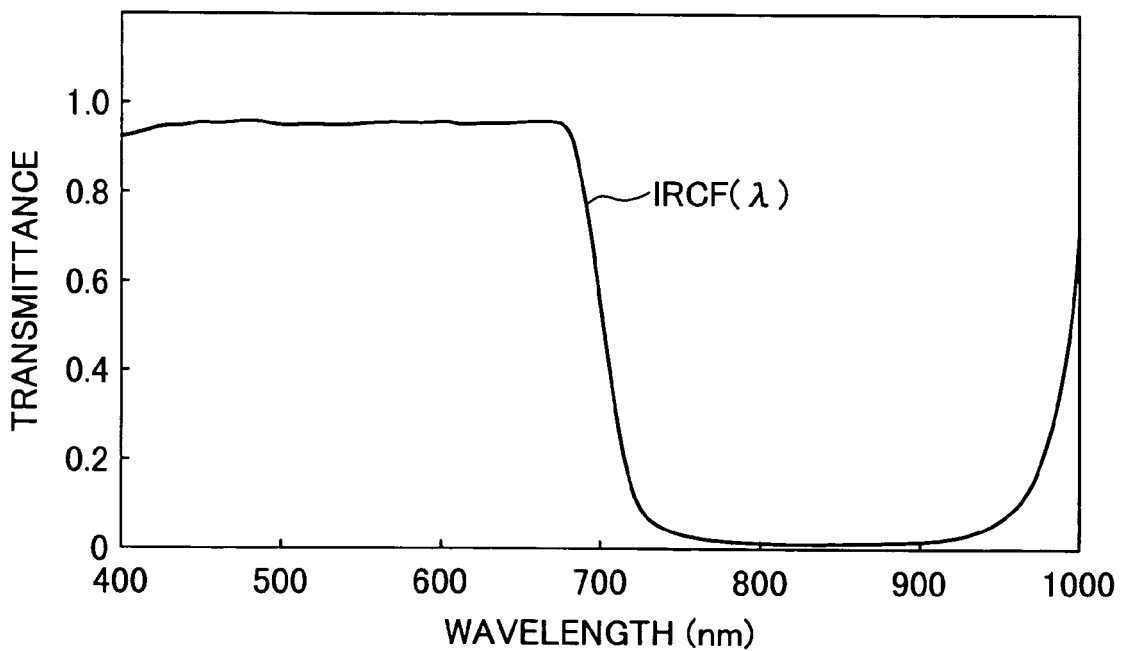
FIG. 48 is a graph illustrating an exemplary IRCF transmittance curve.

FIG. 48 is a graph illustrating an exemplary IRCF transmittance curve. The exemplary curve shown in FIG. 48 has its half power value (fifty percent transmittance) at 700 nm, and blocks all infrared rays of wavelengths 750 nm and longer.

The transmittance characteristics of an IRCF vary depending on its structure and constituent materials. The exemplary IRCF illustrated in FIG. 48 is an IRCF of the optical interference type comprising multiple thin film layers, which is able to achieve a sharp cutoff characteristic. An IRCF comprising multiple thin film layers has a transmittance that becomes comparatively high again in the longer wavelength region, and so the IRCF transmittance curve shown in FIG. 48 rises again from about 1000 nm. Nevertheless, since the imaging element has substantially zero spectral sensitivity around 1000 nm, the product of their values is substantially zero, and color reproducibility is therefore unaffected.

As an example of an IRCF using light absorption, usually an IRCF known as blue glass is used. Blue glass is unable to realize a sharp cutoff characteristic, and its half power value occurs at substantially 650 nm. Whichever type of IRCF is used, the objective in using the IRCF is to make the spectral sensitivity curves of the imaging element approximate the color matching functions. The IRCF is accordingly designed to have a cutoff characteristic curve with substantially zero transmittance at wavelengths beyond 700 nm.

Figure 49:
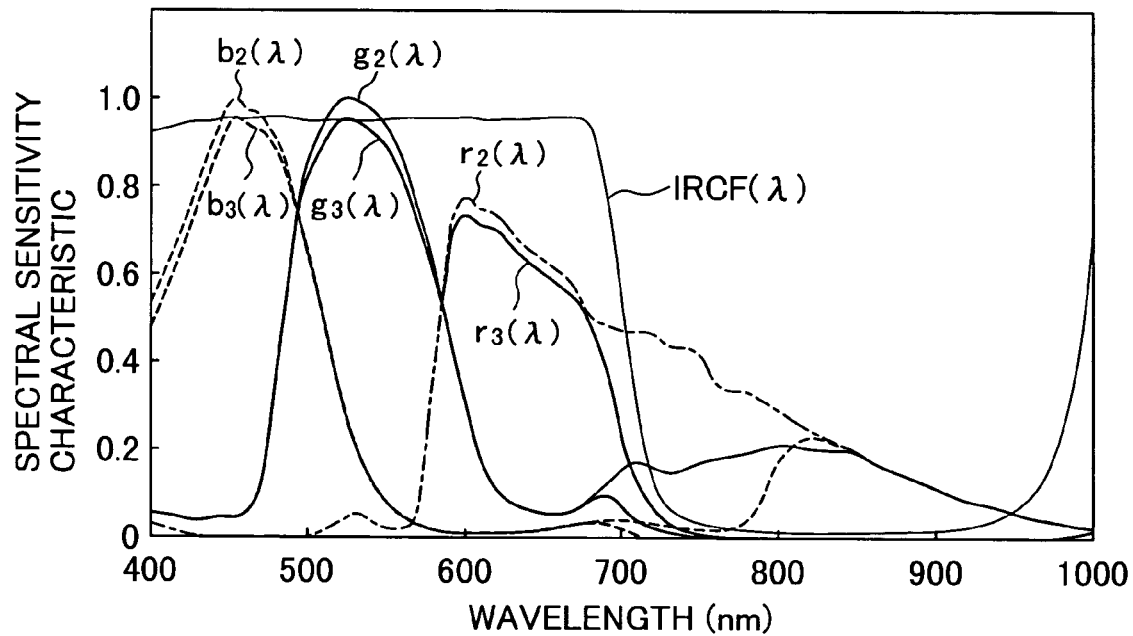
FIG. 49 is a graph illustrating the spectral sensitivity curves of a conventional imaging device.

FIG. 49 is a graph illustrating the spectral sensitivity curves of a conventional imaging device. In FIG. 49, $IRFC(\lambda)$ denotes the transmittance curve of the IRCF shown in FIG. 48; $r2(\lambda)$, $g2(\lambda)$, and $b2(\lambda)$ denote the spectral transmittance curves illustrated in FIG. 47. $r3(\lambda)$, $g3(\lambda)$, and $b3(\lambda)$ denote the spectral transmittance curves of the products of the spectral transmittance curves ($r2(\lambda)$, $g2(\lambda)$, and $g2(\lambda)$) in FIG. 47 and the IRCF transmittance curve in FIG. 48 (in other words, the spectral sensitivity curves of the conventional imaging device).

As described above, a conventional imaging device captures images with an imaging element 203 having the spectral sensitivity curves indicated by $r3(\lambda)$, $g3(\lambda)$, and $b3(\lambda)$ in FIG. 49, but in precise terms, the spectral sensitivity curves of the conventional imaging device shown in FIG. 49 differ from the color matching functions shown in FIG. 46. Accordingly, with the spectral sensitivity curves of the conventional imaging device shown in FIG. 49, it is impossible to realize color reproducibility with exactly the same values as in an image obtained from the color matching functions in FIG. 46. Nevertheless, since nearly equivalent color reproducibility is achieved, the characteristics are considered to provide sufficient performance for a conventional imaging device. The term color reproducibility as used herein refers to making colors substantially match the colors perceived by the human eye, and to reproducing colors such that colors perceived as different become different colors, and colors perceived as the same become the same color.

As described above, because the spectral sensitivity curves of the imaging element 203 differ from human sensitivity curves particularly in the infrared region, an IRCF is placed in front of the imaging element 203 to make the spectral sensitivity curves approximate human sensitivity curves. The color reproducibility obtained from the sensitivity characteristics of human chromatic curves shown in FIG. 46 is set as the color target for color reproducibility in this embodiment.

Figure 50:
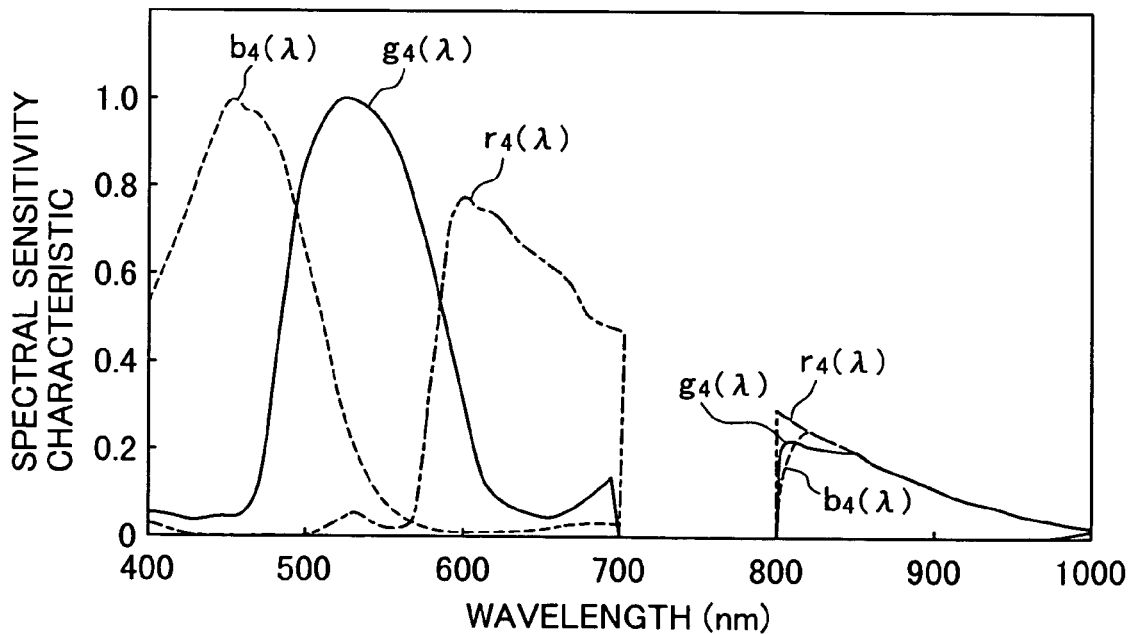
FIG. 50 is a graph illustrating the spectral sensitivity curves of the imaging device in embodiment C1.

FIG. 50 is a graph illustrating the spectral sensitivity curves of the imaging device in embodiment C1. As shown in FIG. 50, because the spectral sensitivity curves of the imaging device in embodiment C1 are represented by the products of the transmittance curve of the near infrared band-cut filter (NIRBCF) 202 (FIG. 45) and the spectral sensitivity curves of the imaging element 203 (FIG. 47), they are insensitive only in the wavelength region where the NIRBCF 202 does not transmit light. The signals output from the imaging element 203 in the imaging device in embodiment C1 have values obtained via the spectral sensitivity curves represented by the products of the NIRBCF 202 transmittance curve (FIG. 45) and the spectral sensitivity curves of the imaging element 203 (FIG. 47), that is, the spectral sensitivity curves shown in FIG. 50.

The operation of the color signal correction means 211 will now be described. As stated above, the color signal correction means 211 receives the R2, G2, and B2 signals output from the gamma correction means 7, and performs a linear matrix calculation given by equation (C1) to calculate the signals Rideal, Gideal, and Bideal to be set as the color target.

The coefficients in the correction matrix used in the color signal correction means 211 may be obtained in the following way, for example. The Macbeth Color Checker with twenty-four color patches (also referred to below simply as the color checker) is used as the evaluation chart for evaluating color reproducibility. The Macbeth Color Checker is a registered trademark of Gretag-Macbeth Holding AG.

The color checker chart is used as a subject; many of its twenty-four color patches represent natural colors specifically chosen to include colors that appeal to human memory (skin color, the green of foliage, the blue of the sky, etc.) The twenty-four color patches are as follows: 1: Dark skin, 2: Light skin, 3: Blue sky, 4: Foliage, 5: Blue flower, 6: Bluish green, 7: Orange, 8: Purplish blue, 9: Moderate red, 10: Purple, 11: Yellow green, 12: Orange yellow, 13: Blue, 14: Green, 15: Red, 16: Yellow, 17: Magenta, 18: Cyan, 19: White, 20: Neutral 8, 21: Neutral 6.5, 22: Neutral 5, 23: Neutral 3.5, and 24: Black.

Figure 51:
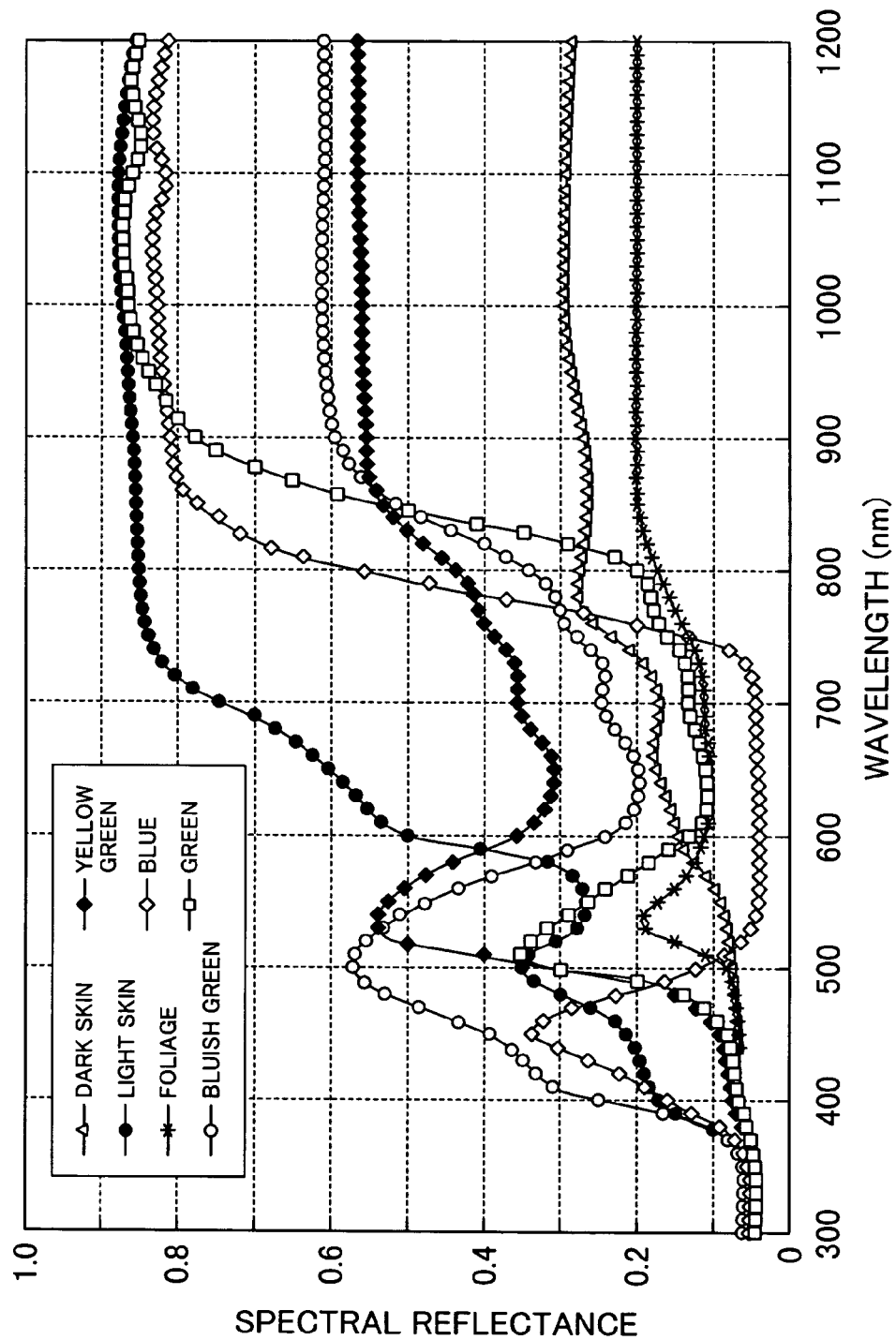
FIG. 51 is a graph illustrating the spectral reflectance curves of color patches in the Macbeth Color Checker.

FIG. 51 is a graph illustrating exemplary spectral reflectance curves of the color patches in the Macbeth Color Checker in the wavelength range from 300 nm to 1200 nm. Specifically, exemplary curves of 1: Dark skin, 2: Light skin, 4: Foliage, 6: Bluish green, 11: Yellow green, 13: Blue, and 14: Green are shown.

If the spectral sensitivity curves shown in FIG. 50, which are the products of the spectral sensitivity curves of the imaging element 203 in embodiment C1 and the NIRBCF 202 transmittance curve, the spectral radiant intensity of the illumination, and the spectral reflectance curves of the color checker, are multiplied together (first products), it is possible to calculate the red, green, and blue values corresponding to the color patches. The red, green, and blue values corresponding to the color target are obtained in a similar way from the products (second products) of the color matching functions shown in FIG. 46, the spectral radiant intensity of the illumination used in calculating the red, green, and blue values of the color patches, and the spectral reflectance curves of the color checker.

The nine correction matrix coefficients in the correction coefficient matrix given by equation (C1) may be calculated by use of the least squares method such that there is minimum difference between the red, green, and blue values corresponding to the twenty-four color patches obtained from the first products and the red, green, and blue values corresponding to the twenty-four color patches obtained from the second products (the color target). In the imaging device in embodiment C1, a spectral radiant intensity corresponding to 5000-K illumination was used to calculate the correction matrix coefficients.

The correction matrix coefficients calculated as described above can be preset in the color signal correction means 211, to obtain good color reproducibility when the color signals are corrected.

The selection of the wavelength region to be attenuated by the NIRBCF 202 will now be described. A typical evaluation chart commonly used in designing color reproducibility is the Macbeth Color Chart.

The correction matrix coefficients are calculated with the color checker as the subject, using only the color patches included in the color checker. Although the color checker is constructed so as to include distinctive natural colors as far as possible, the spectral reflectance of the color checker is constructed by taking into account only the visible spectral region. The spectral reflectance in the infrared region is therefore not taken into account. Thus, when the correction matrix coefficients calculated from the color checker are used, due to the effects of the infrared spectral reflectance corresponding to the color of the subject imaged by the imaging device, there is a possibility that good reproducibility will not be realized for the subject colors. In the following description, a subject color for which good reproducibility cannot be achieved by the imaging device is referred to as an exceptional color.

The effects of the infrared region refer to the fact that, for example, even when the spectral reflectance curves of the subject and the color patches show similar characteristics in the visible spectral region, (in other words, the colors are perceived as the same by the human eye), if the spectral reflectance curve of the subject has a large value in the infrared region, the color reproduced by the imaging device becomes different from the actual color.

Exceptional colors are, for example, the colors of foliage, synthetic fabric, and the like. For example, the human eye perceives artist's green and the green of foliage as the same color (in other words, the two colors have similar spectral reflectance characteristics in the visible spectral region); however, because the infrared spectral reflectance of foliage differs from the infrared spectral reflectance of artist's green, the green of foliage and artist's green become different colors when reproduced by the imaging device.

Figure 52:
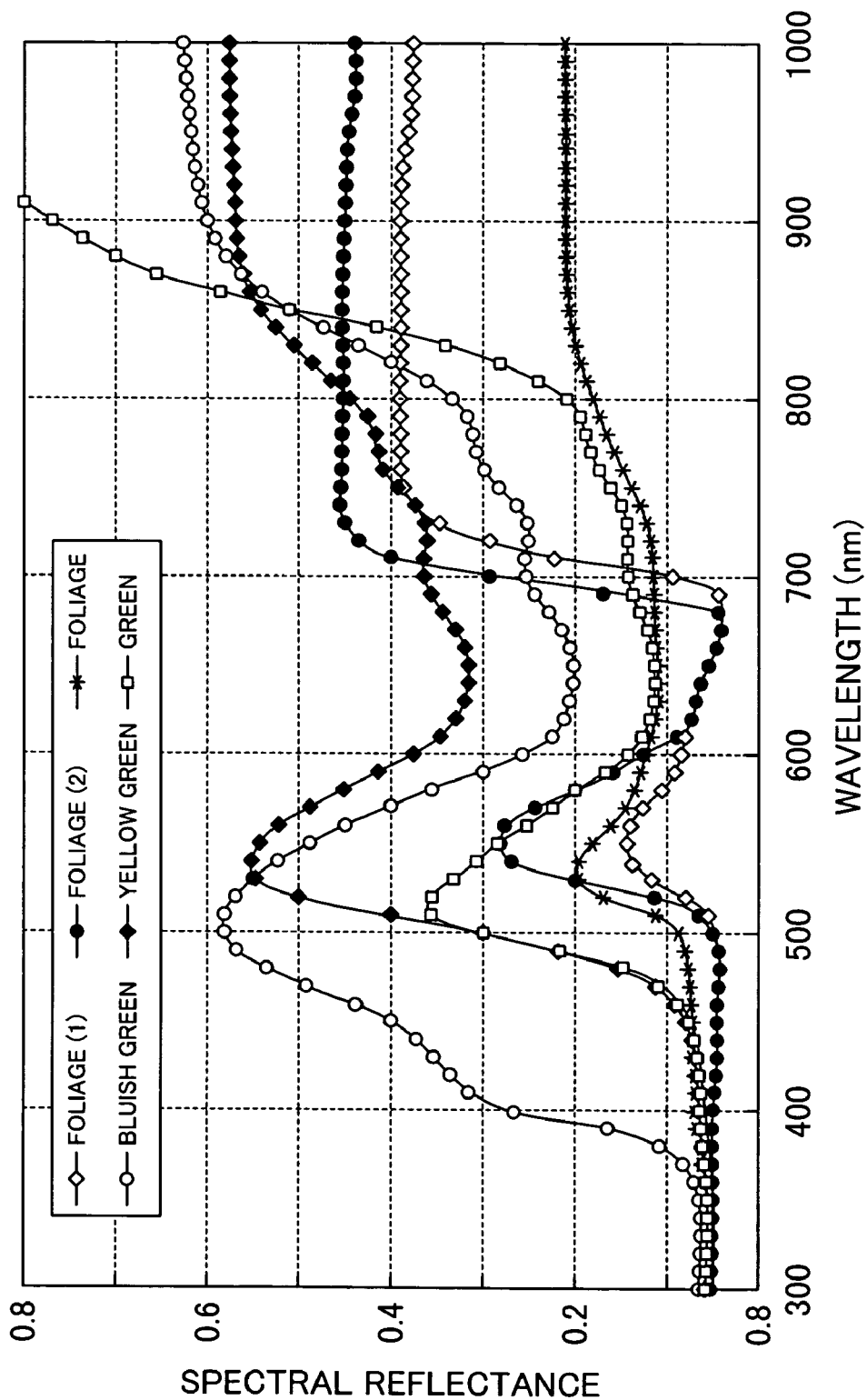
FIG. 52 is a graph illustrating the spectral reflectance curves of foliage.

FIG. 52 is a graph illustrating the spectral reflectance curve of foliage as an exemplary exceptional color. FIG. 52 shows the spectral transmittance curves of the Foliage, Bluish green, Yellow green, and Green patches given as examples of the green color in the Macbeth Color Checker, and the spectral transmittance curves of living foliage growing in nature (foliage (1) and foliage (2)).

When the color of foliage is reproduced, for example, the Foliage color patch shown in FIG. 52 is used. The spectral reflectance curve of the Foliage patch and the spectral reflectance curve of foliage (1) or foliage (2) show similar characteristics in the visible spectral region, rising to a peak at around 500 nm to 600 nm. The other greenish color patches also show similar characteristics. Differing from the other colors, however, the spectral reflectance curves of foliage (1) and foliage (2) rise sharply at around 700 nm.

As mentioned above, the human eye has barely any sensitivity in the longer wavelength side beyond 700 nm. The human eye accordingly perceives colors having similar spectral reflectance in the visible spectral region, such as those shown in FIG. 52, as substantially the same color. However, as shown in FIG. 47, since the imaging element 203 has spectral sensitivity curves which are also sensitive in the infrared region, it responds to infrared rays not perceived by the human eye. Thus, when an imaging element 203 that responds to infrared rays is used, color reproduction by the imaging device differs greatly. Specifically, the ratio of the red signal increases unnecessarily compared to the green signal or the blue signal so that the color of foliage which is actually green appears brownish when reproduced.

Figure 53:
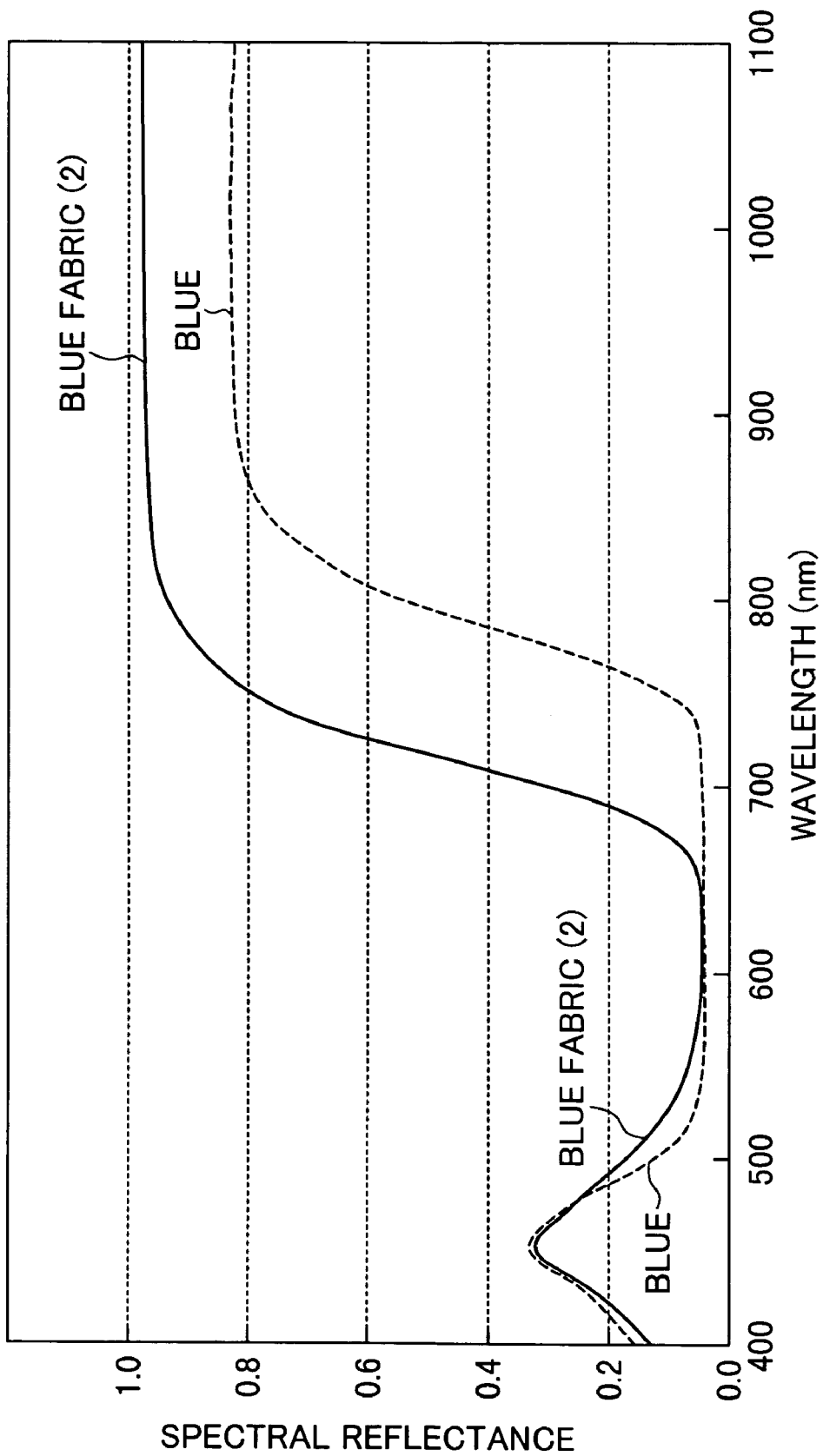
FIG. 53 is a graph illustrating the spectral reflectance curve of a synthetic fiber.

FIG. 53 is a graph illustrating the spectral reflectance curve of a synthetic fabric, given as another exemplary exceptional color. FIG. 53 shows the spectral reflectance curve of a blue synthetic fabric (hereinafter referred to as 'blue fabric (2)') and the spectral reflectance curve of the Blue patch in the color checker.

The spectral reflectance of the blue fabric and the spectral reflectance of the blue patch have similar curves in the visible spectral region in that both have peaks at about 450 nm. However, the spectral reflectance curve of the blue fabric rises sharply at around 650 nm. Accordingly, similar to foliage (1) and foliage (2), although the human eye, which is insensitive in the infrared region, perceives the blue color of the blue fabric and the blue color of the color checker patch as the same blue color, the imaging device, which is sensitive in the infrared region, reproduces the blue color of the blue fabric and the blue color of the color checker patch as different colors. Specifically, the ratio of the red signal increases unnecessarily compared to the green signal or the blue signal so that the color of the blue fabric, which should be blue, appears purple when reproduced.

Accordingly, the wavelength region to be attenuated by the NIRBCF 202 is set to prevent the red signal of exceptional colors from rising unnecessarily, in order to achieve color reproducibility that makes the colors reproduced by the imaging device substantially identical to the colors perceived by the human eye, but at the same time to pass enough long-wavelength light to enable high-sensitivity imaging. For the above reasons, the NIRBCF 202 used in embodiment C1 attenuates light in the wavelength region from 700 nm to 780 nm to prevent the red signal from rising unnecessarily, and at the same time, passes light of wavelengths 780 nm and longer to enable high-sensitivity imaging.

Figure 54:
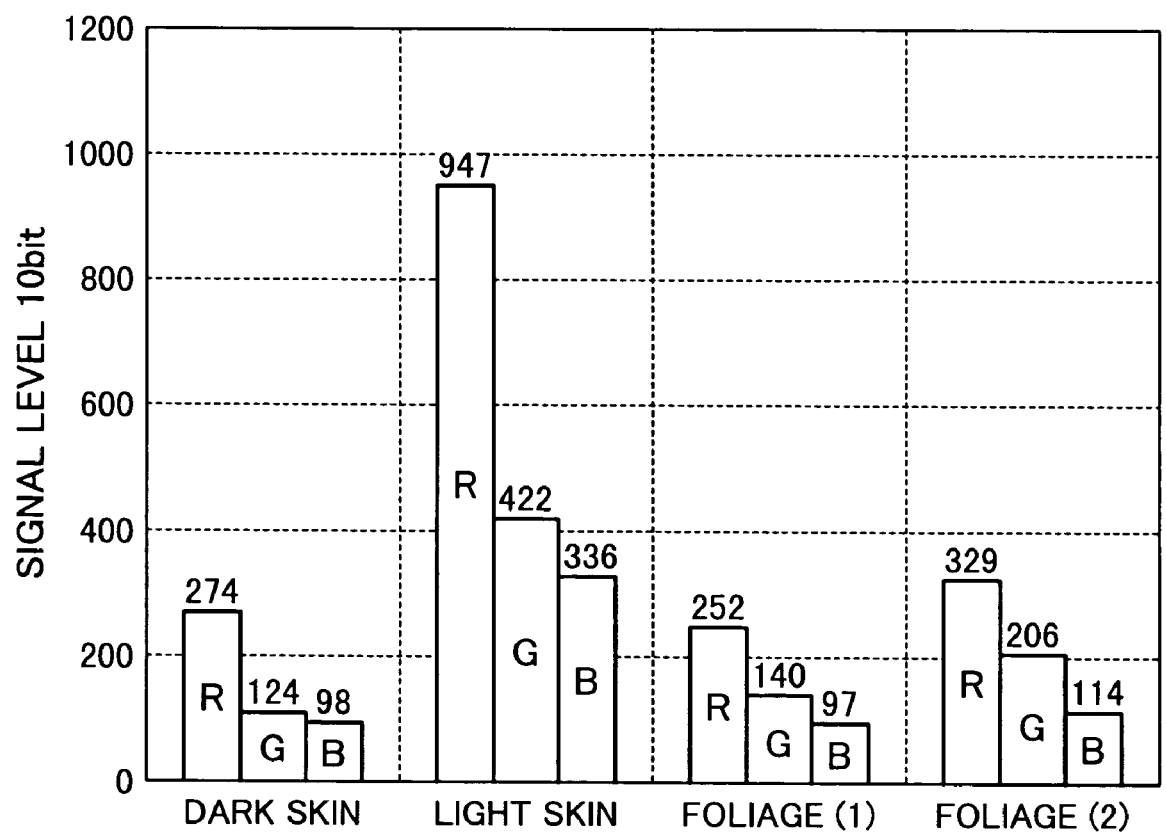
FIG. 54 is a graph illustrating the signal levels corresponding to the red, green, and blue outputs from the imaging element 203 in embodiment C1.
Figure 55:
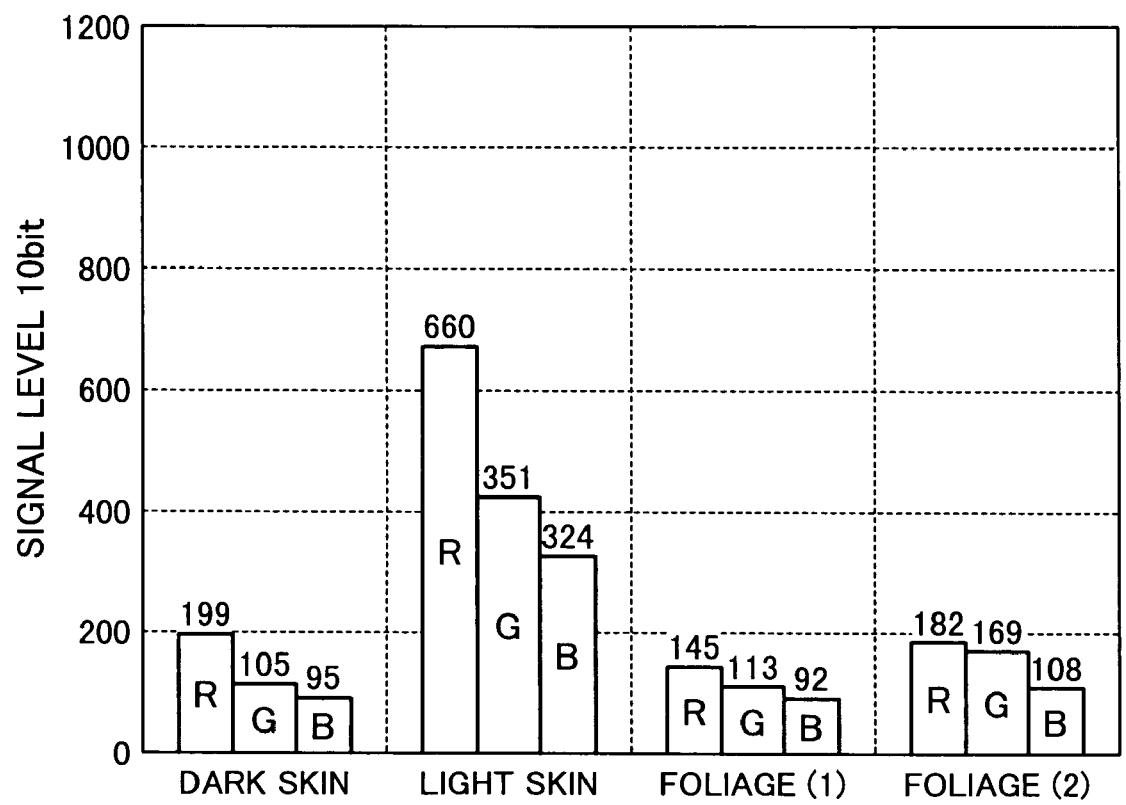
FIG. 55 is a graph illustrating signal levels of the red, green, and blue outputs from the imaging element 203 in embodiment C1.

FIGS. 54 and 55 illustrate the levels of the signals (hereinafter referred to as signal levels) corresponding to the red, green, and blue outputs from the imaging element 203 in embodiment C1. In FIGS. 54 and 55, the horizontal axis indicates the name of the subject, and the vertical axis indicates the signal level. The letters R, G, and B in the bars denote the red signal, the green signal, and the blue signal, respectively, and the numbers at the top of the bars denote the signal level values corresponding to the color signals.

FIG. 54 shows the signal levels calculated from the products of the spectral sensitivity curves shown in FIG. 47 (that is, the products of the spectral sensitivity curves of the color filters and the spectral sensitivity curves of the photodiodes constituting the imaging element 203), the spectral radiant intensity of the illumination, and the spectral reflectance of the subject.

FIG. 55 shows the signals levels calculated from the products of the spectral sensitivity curves shown in FIG. 50 (that is, the products of the transmittance curve of the NIRBCF 202, the spectral sensitivity curves of the color filters, and the spectral sensitivity curves of the photodiodes constituting the imaging element 203), the spectral radiant intensity of the illumination, and the spectral reflectance of the subject.

The spectral radiant intensity of the illumination used in calculating the signal levels shown in FIGS. 54 and 55 is the spectral radiant intensity of 5000-K illumination. The spectral reflectance curves of the Dark skin and Light skin patches are the spectral reflectance curves of the Macbeth Color Checker (FIG. 50), and the spectral reflectance curves of foliage (1) and foliage (2) are the curves shown in FIG. 51.

Since the 'Dark skin' and 'Light skin' patches in FIGS. 54 and 55 are not exceptional colors, it is possible for the imaging device to reproduce colors that approximate the color targets. 'Foliage (1)' and 'foliage (2)' are exceptional colors, so with a conventional imaging device, due to the effects of light in the infrared region, the level of the red signal increases compared to the green signal or the blue signal, as shown in FIG. 54. As a result, the ratios of the red signal to the green signal or the blue signal for 'foliage (1)' and foliage (2) become similar to the ratios for 'Dark skin' and 'Light skin'.

When the green of 'foliage (1)' and 'foliage (2)' is reproduced, if the signal level of the red signal is too large compared to the signal level of the green signal, even if a white balance adjustment or a color correction is performed in the white balancing means 210 or the color signal correction means 211 in the stages subsequent to the ADC 3, it is impossible to precisely correct the red signal. The green of foliage thus cannot be reproduced precisely. As a result, the color of foliage is reproduced by the imaging device so that it is similar to the target color for skin color in embodiment C1 or the color brown.

When the NIRBCF 202 is used, the signal level of the red signal is suppressed, as shown in FIG. 55. This is because the NIRBCF 202 attenuates light in the wavelength region of 700 nm to 780 nm. Particularly for 'foliage (1)' and foliage (2), since it is possible to remove light in the wavelength region where their spectral reflectance curves rise sharply (around 700 nm in FIG. 52), the signal level (ratio) of the red signal compared to the signal level of the green signal is effectively controlled. Therefore, differing from FIG. 54, the ratio of the red signal to the green signal or the blue signal can be reduced.

As described above, the imaging device in embodiment C1 is able to realize high-sensitivity imaging and color imaging with good color reproducibility without requiring means for moving an optical filter out of the light path or for switching optical filters.

If the wavelength region to be attenuated by the NIRBCF 202 is appropriately selected according to the spectral sensitivity characteristics of the imaging means and the spectral reflectance of the subject used in the imaging device in embodiment C1, it is possible to suppress the effects in the infrared region and obtain good color reproducibility for every color, exceptional or otherwise.

Furthermore, since the imaging device in embodiment C1 is sensitive in the infrared region, it is possible to realize monochrome high-sensitivity imaging just by switching the signal processing method.

In addition, since means for moving or switching an optical filter are unnecessary, the size of the imaging device can be easily reduced.

Embodiment C1 has been explained with the colors of foliage and blue fabric as exemplary exceptional colors; the imaging device in embodiment C1 is similarly able to obtain good color reproducibility for subject colors having spectral reflectance curves that rise sharply in the part of the visible spectral region near the infrared region.

In embodiment C1, the NIRBCF 202 attenuates the wavelength region from 700 nm to 780 nm, but as long as a certain amount of light in the infrared region is passed to enable high-sensitivity imaging, it is possible to set a wider wavelength region for attenuation. Thus, for example, light in the wavelength region from 700 nm to 850 nm may be attenuated.

In embodiment C1, the correction matrix coefficients are calculated and set beforehand using the twenty-four colors in the Macbeth Color Checker, but it is also possible to add the above-mentioned exceptional colors, such as the colors of foliage and synthetic fiber to the twenty-four colors, and use the spectral reflectance curves of more than twenty-four evaluation colors to calculate the correction matrix coefficients by the least squares method so as to minimize the color error values representing the differences from the color targets.

Embodiment C1 was described as setting a three-row-by-three-column correction coefficient matrix in the color signal correction means 211, but it is also possible to set, for example, a first correction coefficient matrix corresponding to colors other than the exceptional colors, and a second correction coefficient matrix corresponding to the exceptional colors such as the colors of foliage and synthetic fiber.

Embodiment C1 was described as using an imaging means equipped with primary color filters comprising red, green, and blue color filters, but it is also possible to use an imaging means provided with complementary filters comprising yellow, magenta, cyan, and green color filters. When complementary color filters are used, a three-row-by-four-column correction coefficient matrix given by equation (C3) below is set in the color signal correction means 211, and appropriate coefficients for the correction matrix are calculated in the same way as when primary color filters are used.

$$\begin{pmatrix} Rideal \\ Gideal \\ Bideal \end{pmatrix} = \begin{pmatrix} r31 & r32 & r33 & r34 \\ g31 & g32 & g33 & g34 \\ b31 & b32 & b33 & b34 \end{pmatrix} \begin{pmatrix} Ye \\ Mg \\ Cy \\ G \end{pmatrix} \quad (C3)$$

In equation (C3), matrix coefficients r31 to r34, g31 to g34, and b31 to b34 are determined in the same way as the matrix coefficients r21 to r23, g21 to g23, and b21 to b23 in equation (C1).

Embodiment C2

Figure 56:
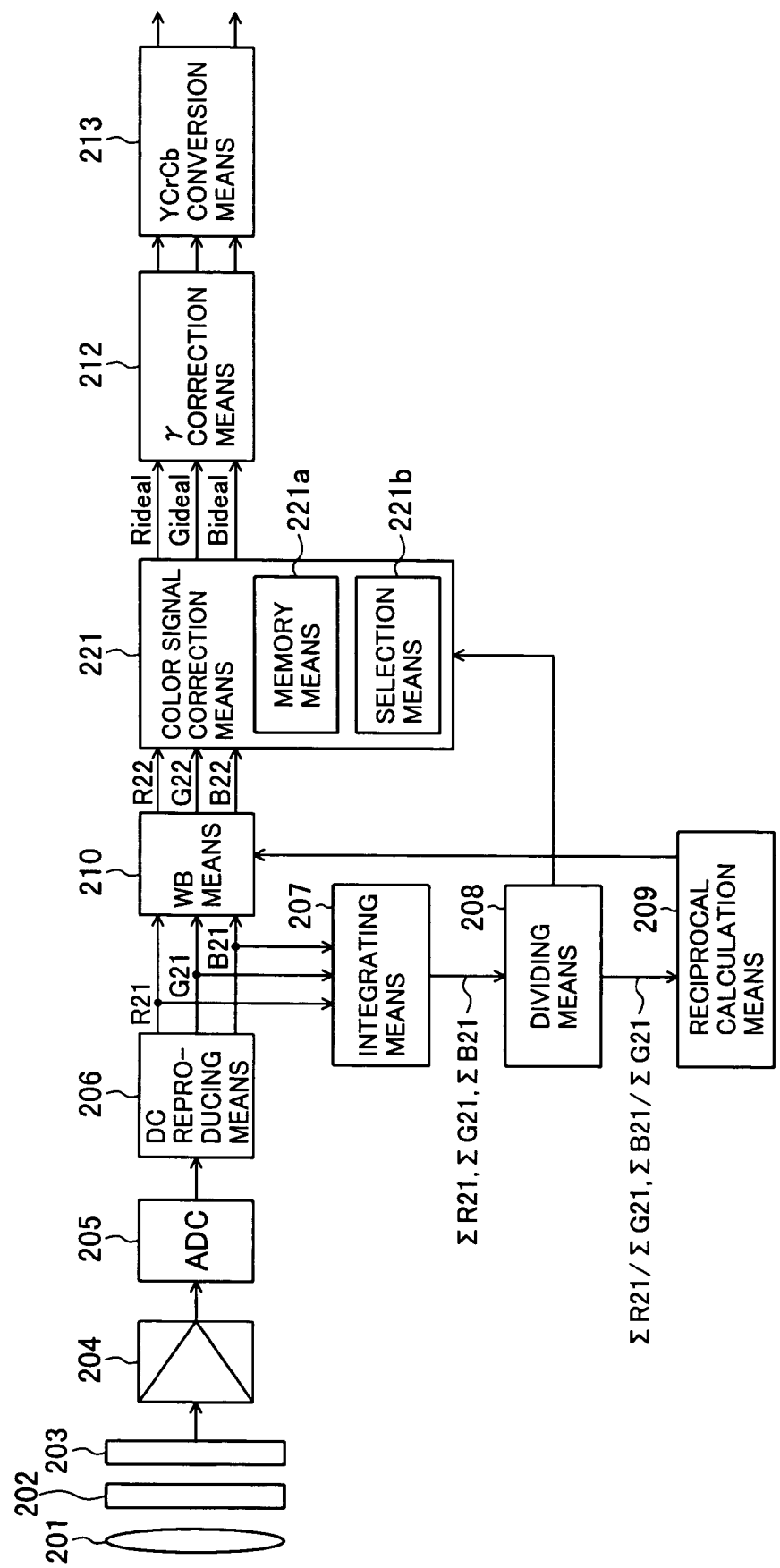
FIG. 56 is a block diagram showing the structure of the imaging device in embodiment C2 of the invention.

FIG. 56 is a block diagram showing the structure of the imaging device in embodiment C2 of the invention. In the following description, the structures explained in embodiment C1 are represented by similar reference characters, and descriptions are omitted. In FIG. 56, the color signal correction means 221 has a memory means 221a and a selection means 221b.

The memory means 221a stores a plurality of correction matrix coefficients used in the matrix calculation in the color signal correction means 221. The plurality of correction matrix coefficients are set according to the color temperature of the illumination used when imaging is performed by the imaging device (details will be given later).

The selection means 221b identifies the color temperature of the illumination based on the ratio of the integrated values input from the dividing means 208, and reads out the correction matrix coefficients stored in the memory means 221a. The color signal correction means 221 performs a matrix calculation using the correction matrix coefficients selected by the selection means 221b.

FIG. 12 shows the spectral radiant intensity of illumination with a 3000-K color temperature. FIG. 14 shows the spectral radiant intensity of illumination with a 6500-K color temperature. A comparison of FIGS. 12 and 14 shows that the spectral radiant intensity varies depending on the color temperature.

If, for example, the spectral sensitivity curves of the imaging device were identical to the curves expressing the color-matching functions shown in FIG. 46, then the white balance adjustment performed in the white balancing means 210 would always enable the imaging device to reproduce colors well, unaffected by the changes in the spectral radiant intensity of the illumination.

As explained in embodiment C1, however, the spectral sensitivity curves of the imaging device (FIG. 50) and the color-matching functions (FIG. 46) differ greatly. Thus, when the correction matrix coefficients calculated under 5000-K illumination in embodiment C1 are used, good color reproducibility is obtained when imaging is performed under 5000-K illumination (a conditional color match), but when illumination with a different color temperature is used, it is not always possible to obtain good color reproduction.

When imaging is performed under illumination sources with different color temperatures, e.g., when imaging is performed under the 3000-K illumination shown in FIG. 12 or the 6500-K illumination shown in FIG. 14, the imaging device will reproduce colors differently if the correction matrix coefficients calculated in embodiment C1 are used.

Therefore, in the imaging device in embodiment C2, optimal correction matrix coefficients for illumination sources with different color temperatures are precalculated and stored in the memory means 221a. The correction matrix coefficients may be calculated according to the method described in embodiment C1. That is, the coefficients may be calculated by use of the least squares method so that the red, green, and blue values corresponding to the products of the spectral radiant intensity of the illumination with an arbitrarily set color temperature, the spectral reflectance of the color checker, and the spectral sensitivity curves (FIG. 50) of the imaging device differ minimally from the red, green, and blue values corresponding to the products of the color-matching functions, the spectral radiant intensity of the illumination with the arbitrarily set color temperature, and the spectral reflectance of the color checker.

Figure 57:
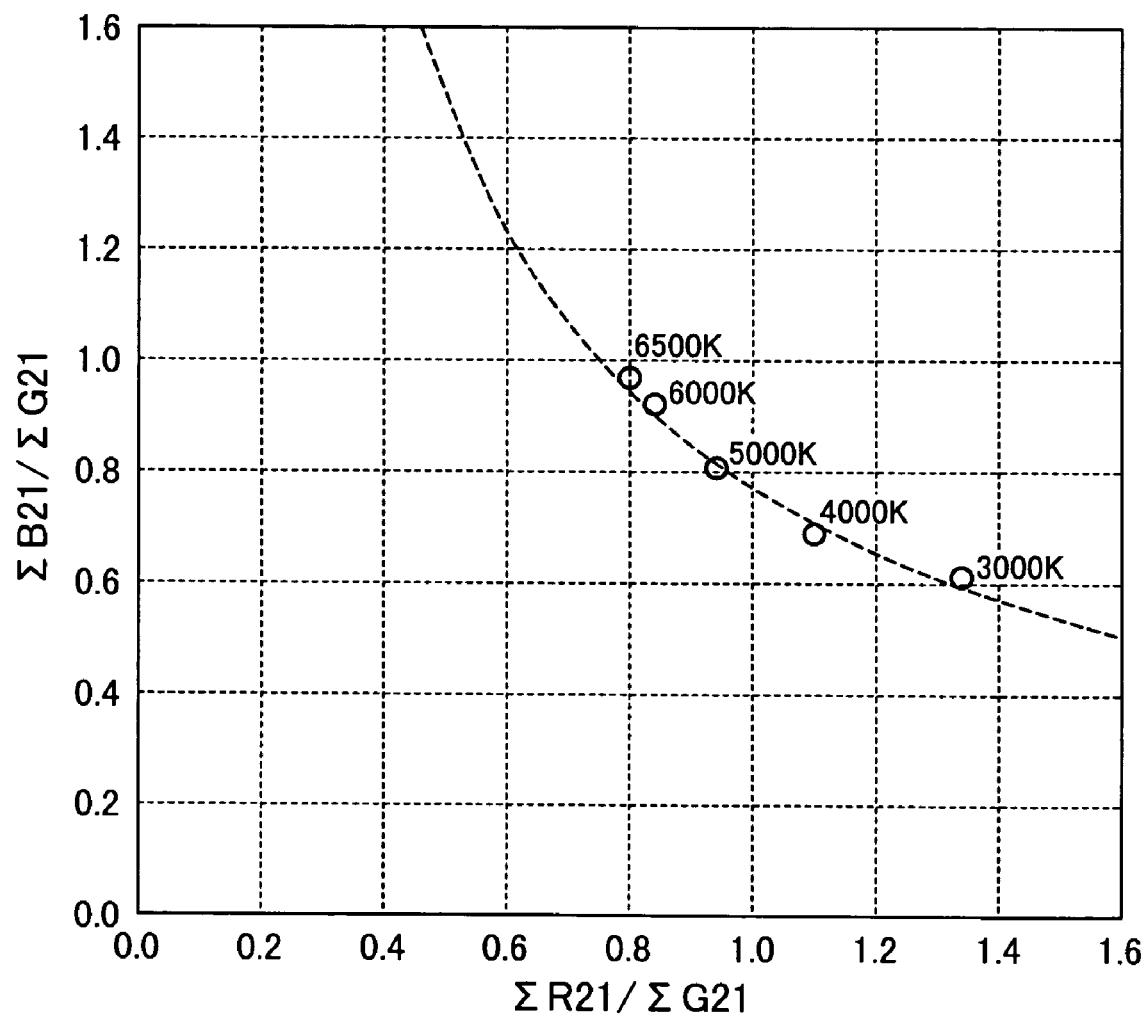
FIG. 57 is a graph illustrating the relation between ratios of integrated values and color temperatures.

FIG. 57 is a graph illustrating the relation between the ratios of the integrated values and the color temperature. In FIG. 57, the horizontal axis indicates the ratio ($\Sigma R21/\Sigma G21$) of the integrated values of signals R1 and G1; the vertical axis indicates the ratio ($\Sigma B21/\Sigma G21$) of the integrated values of signals B1 and G1. The white circles in the graph indicate points corresponding to different color temperatures.

As shown in FIG. 57, an unambiguous relation between the ratios ΣR21/ΣG21 and ΣB21/ΣG21 is obtained, corresponding to the color temperature. Thus, when ΣR21/ΣG21 or ΣB21/ΣG21 is known, it is possible to identify the color temperature of the illumination.

The curve shown in FIG. 57 is preset in the selection means 221b. The selection means 221b selects the correction matrix coefficients stored in the memory means 221a according to the ratio of the integrated values output from the dividing means 208. In other words, the selection means 221b selects the correction matrix coefficients corresponding to the color temperature indicated by the ratio of the integrated values.

The color signal correction means 211 performs a matrix calculation using the matrix coefficients selected by the selection means 221b to carry out a correction of the color signals. The matrix calculation carried out in the color signal correction means 221 in embodiment C2 is given by equations (C4A) and (C4B) below.

$$\begin{pmatrix} Rideal \\ Gideal \\ Bideal \end{pmatrix} = \begin{pmatrix} r21(\Sigma R21/\Sigma G21) & r22(\Sigma R21/\Sigma G21) & r23(\Sigma R21/\Sigma G21) \\ g21(\Sigma R21/\Sigma G21) & g22(\Sigma R21/\Sigma B21) & g23(\Sigma R21/\Sigma G21) \\ b21(\Sigma R21/\Sigma G21) & b22(\Sigma R21/\Sigma G21) & b23(\Sigma R21/\Sigma G21) \end{pmatrix} \begin{pmatrix} R22 \\ G22 \\ B22 \end{pmatrix} \quad \text{(C4A)}$$

$$\begin{pmatrix} Rideal \\ Gideal \\ Bideal \end{pmatrix} = \begin{pmatrix} r21(\Sigma B21/\Sigma G21) & r22(\Sigma B21/\Sigma G21) & r23(\Sigma B21/\Sigma G21) \\ g21(\Sigma B21/\Sigma G21) & g22(\Sigma B21/\Sigma B21) & g23(\Sigma B21/\Sigma G21) \\ b21(\Sigma B21/\Sigma G21) & b22(\Sigma B21/\Sigma G21) & b23(\Sigma B21/\Sigma G21) \end{pmatrix} \begin{pmatrix} R22 \\ G22 \\ B22 \end{pmatrix} \quad \text{(C4B)}$$

In equation (C4A), the notation (ΣR21/ΣG21) on the right of each correction matrix coefficient indicates that the coefficients are selected according to the ratio (ΣR21/ΣG21) of the integrated values output from the dividing means 208.

Similarly, in equation (C4B), the notation (ΣB21/ΣG21) on the right of each correction matrix coefficient indicates that the coefficients are selected according to the ratio (ΣB21/ΣG21) of the integrated values output from the dividing means 208.

As described above, the imaging device in embodiment C2 selects the correction matrix coefficients according to the color temperature and performs a matrix calculation using the selected correction matrix coefficients to carry out a color correction; good reproducibility is thus obtained even under illumination sources with different color temperatures.

Although embodiment C2 has been described as storing the curve shown in FIG. 57 in the selection means 221b, the curve need not be stored as such; for example, it is possible to have the selection means 221b store points on the curve corresponding to prescribed color temperatures (e.g., the points corresponding to 3000 K, 4000 K, 5000 K, and 6000 K in FIG. 57), and select the correction matrix coefficients corresponding to the color temperature indicated by the point closest to the ratio of the integrated values input to the selection means 221b.

Embodiment C3

Figure 58:
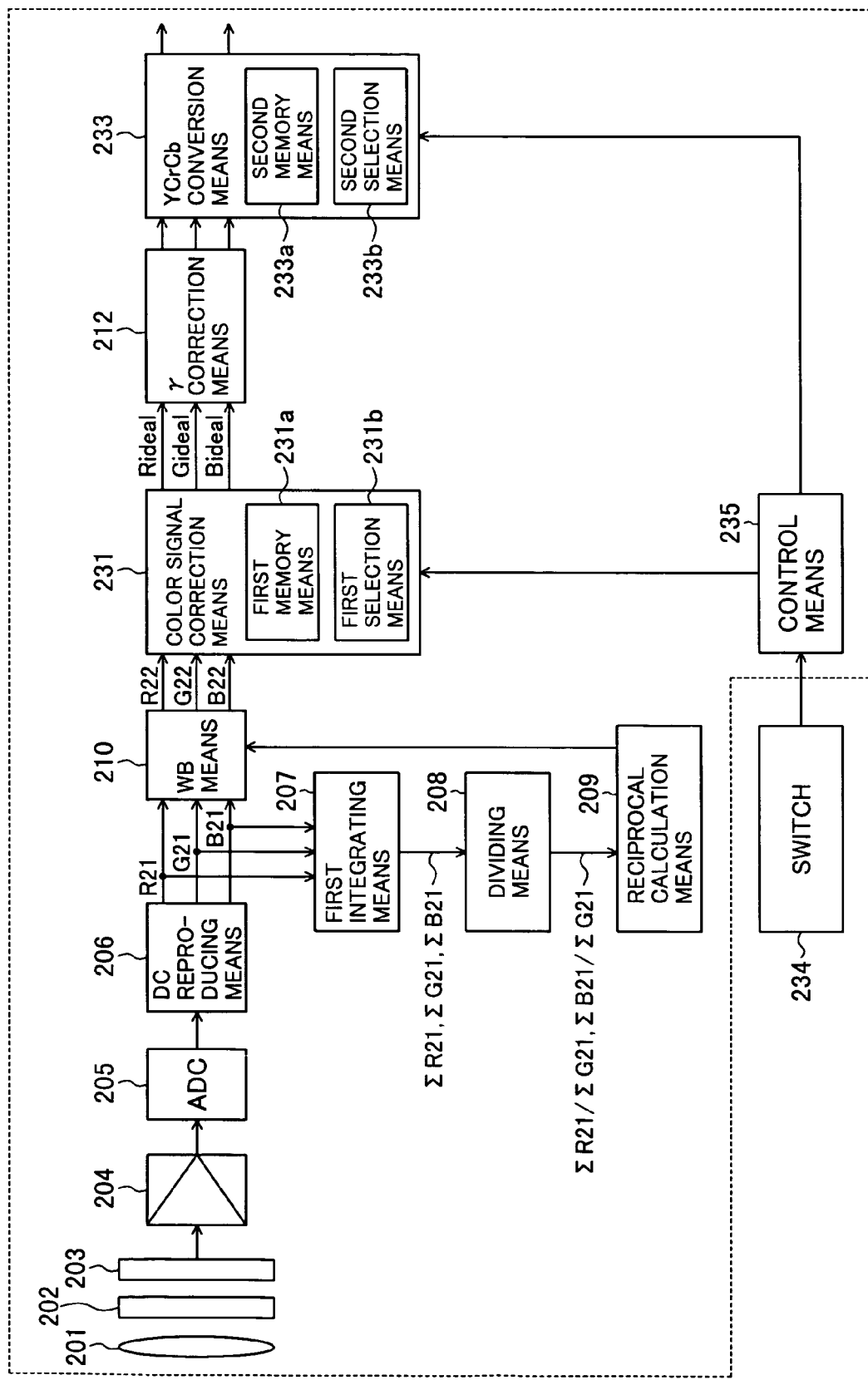
FIG. 58 is a block diagram showing the structure of the imaging device in embodiment C3 of the invention.

FIG. 58 is a block diagram showing the structure of the imaging device in embodiment C3 of the invention. The means shown within the dashed lines in FIG. 58 constitute the imaging device. In FIG. 58, the structures explained in embodiments C1 and C2 are represented by similar reference characters, and descriptions are omitted.

The switch 234 is operated by the user to select color imaging (also referred to below as the first imaging mode) or high-sensitivity imaging (also referred to below as the second imaging mode). The control means 235 outputs a signal (also referred to below as a selection signal) corresponding to the imaging mode indicated by the switch 234 to the color signal correction means 231 and the YCrCb conversion means 233.

The color signal correction means 231 has a first memory means 231a and a selection means 231b. The first memory means 231a stores the correction matrix coefficients described in embodiment C1 and matrix coefficients (referred to below as non-correction matrix coefficients) which are set so that the red, green, and blue values are output from the color signal correction means 231 without being corrected. Specifically, the non-correction matrix coefficients are set as follows: r21=1, r22=0, r23=0, g21=0, g22=1, g23=0, b21=0, b22=0, b23=1. In other words, the non-correction matrix coefficients are the coefficients of the identity matrix.

The selection means 231b selects either the correction matrix coefficients or the non-correction matrix coefficients stored in the first memory means 231a according to the selection signal output from the control means 235. Specifically, when the control means 235 sends a selection signal indicating that the first imaging mode is chosen, the selection means 231b selects the correction matrix coefficients; when the second control means 235 sends a selection signal indicating that the second imaging mode is chosen, the selection means 231b selects the non-correction matrix coefficients. The color signal correction means 231 corrects the color signals using the correction matrix coefficients or the non-correction matrix coefficients as selected by the selection means 231b, and outputs the corrected color signals (Rideal, Gideal, and Bideal) to the γ correction means 212.

The YCrCb conversion means 233 has a second memory means 233a and a selection means 233b. The second memory means 233a prestores the conversion matrix coefficients described in embodiment C1. The second memory means 233a also prestores matrix coefficients (also referred to below as Y conversion matrix coefficients) which are set so that only the Y signal is generated and the color difference signals are zero. The Y conversion matrix coefficients are specifically set as follows: y1=1, y2=1, y3=1, cr1=0, cr2=0, cr3=0, cb1=0, cb2=0, cb3=0. When conversion of the color signals is carried out using the Y conversion matrix coefficients, the image (picture) corresponding to the signals output from the imaging means becomes a monochrome image.

The selection means 233b selects either the conversion matrix coefficients or the Y conversion matrix coefficients stored in the second memory means 233a according to the selection signal output from the control means 235. Specifically, when the control means 235 sends a selection signal indicating that the first imaging mode is chosen, the selection means 233b selects the conversion matrix coefficients, and when the control means 235 sends a selection signal indicating that the second imaging mode is chosen, the selection means 233b selects the Y conversion matrix coefficients. The YCrCb conversion means 233 generates and outputs a brightness signal or brightness and color difference signals using the Y conversion matrix coefficients or the conversion matrix coefficients selected by the selection means 233b.

As described above, in the imaging device in embodiment C3, when the second imaging mode is selected, the color signal correction means 231 selects the non-correction matrix coefficients. The signal levels of the R2, G2, and B2 signals are therefore not attenuated, differing from the case in which the correction matrix coefficients are used. The YCrCb conversion means 233 selects the Y conversion matrix coefficients, and so the unattenuated signals R2, G2, and B2 are simply added together. The color signal correction means 231 and the YCrCb conversion means 233 thus correct and select the color signals in accordance with the selected imaging mode.

Accordingly, the imaging device in embodiment C3 can capture subject images with greater consistency, even when the red, green, or blue signal has a small signal level. It is thus possible to perform higher-sensitivity imaging.

Experiments and simulations carried out by the inventor have demonstrated that if calculations are carried out with the uncorrected coefficient matrix and the Y conversion coefficient matrix, then when the 3000-K illumination source shown in FIG. 12 is used, for example, the sensitivity of the imaging device is more than 1.8 times higher than that of a conventional device.

Since the imaging device in embodiment C3 has means for selecting the matrix coefficients, it does not require means for moving an optical filter, and it is thus possible to maintain a simple structure while switchably performing color imaging with good reproducibility and monochrome imaging with high sensitivity.

Figure 59:
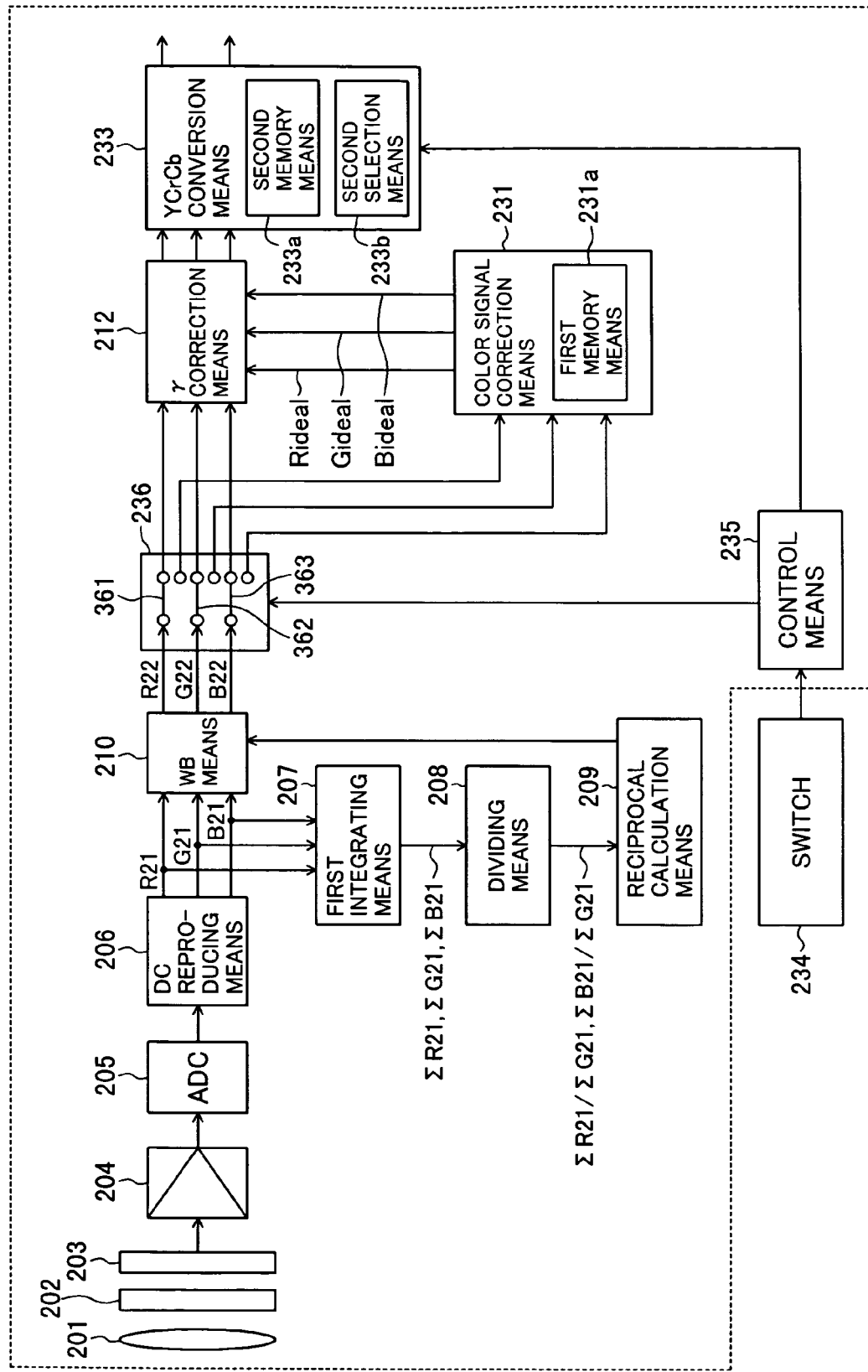
FIG. 59 is a block diagram showing a second example of the structure of the imaging device in embodiment C3 of the invention.

Although the color signal correction means 231 embodiment C3 has been described as having a first memory means 231a and selection means 231b, it is also possible for the imaging device to be structured as shown in FIG. 59, for example.

Specifically, a switching means 236 that receives a control signal from the control means 235 may be inserted following the white balancing means 210. When the switching means 236 receives a control signal corresponding to color imaging, it feeds signals R22, G22, and B22 to the color signal correction means 231 using a first switch 361, a second switch 362, and a third switch 363.

When the switching means 236 receives a control signal corresponding to high-sensitivity imaging, it uses the first switch 361, the second switch 362, and the third switch 363 to feed signals R22, G22, and B22 to the γ correction means 212. When the imaging device is structured as shown in FIG. 59, only be the correction matrix coefficients need be stored in the first memory means 231a.

Figure 60:
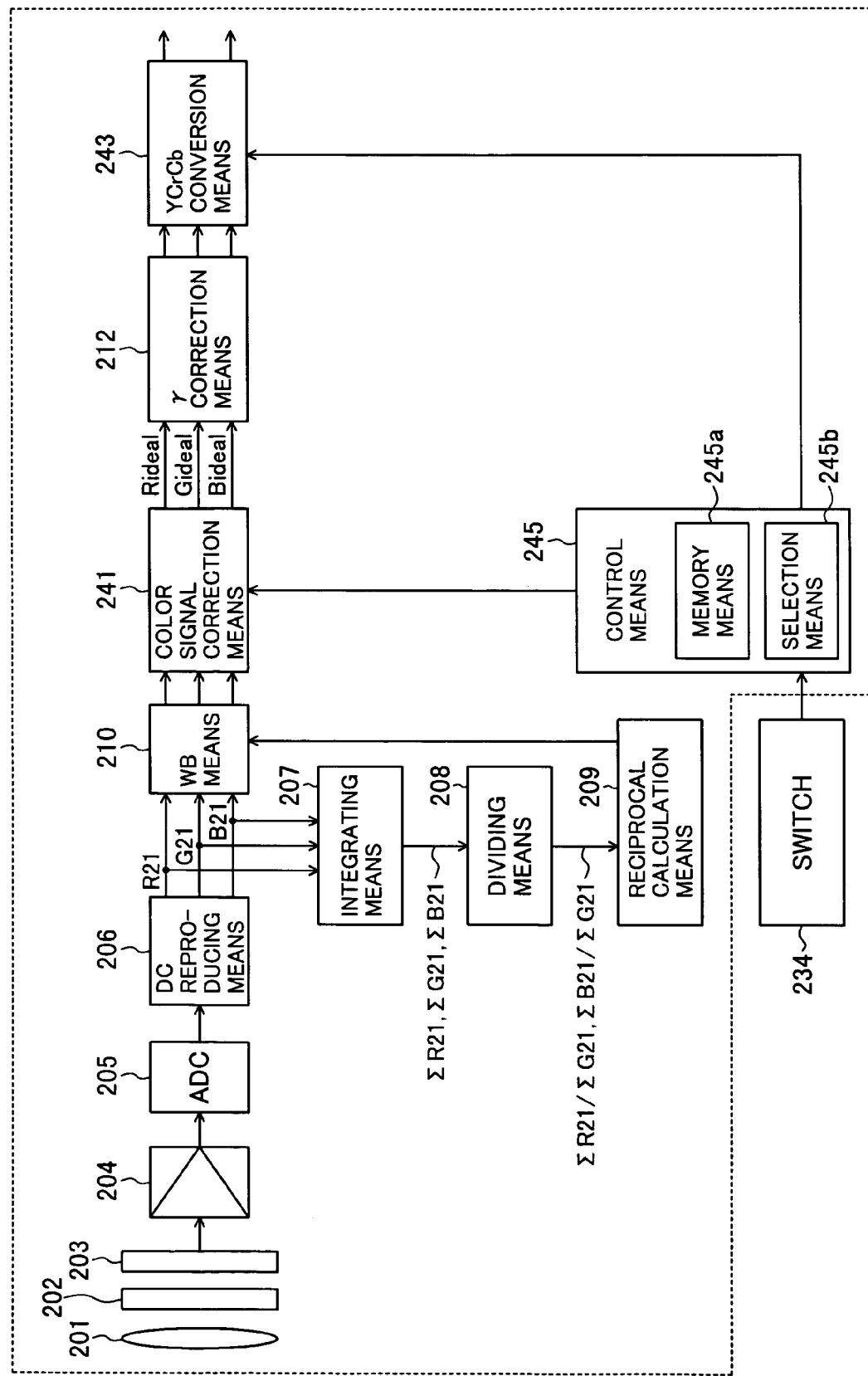
FIG. 60 is a block diagram showing a third example of the structure of the imaging device in embodiment C3 of the invention.

In embodiment C3, the color signal correction means 231 was described as having a first memory means 231a and selection means 231b, and the YCrCb conversion means 233 as having a second memory means 233a and selection means 233b; however, as shown in FIG. 60, for example, it is also possible for the control means 245 to have a memory means 245a and a selection means 245b; the memory means 245a stores the correction matrix coefficients, the non-correction matrix coefficients, the conversion matrix coefficients, and the Y conversion matrix coefficients, and the selection means 245b selects the matrix coefficients according to the imaging mode indicated by the switch.

The imaging mode may be switched by the user using a switch, but it is also possible for the imaging mode to be switched automatically depending on the brightness of the surroundings, by use of photoelectric elements or the like, for example.

In the above descriptions, the switch 234 is not disposed within the imaging device, but it is possible for the switch 234 to be disposed within the imaging device, depending on the design of the imaging device.

It is possible for the imaging device to be constructed by combining the structures described in embodiments C2 and C3. For example, the imaging device described in embodiment C2 may be provided with the means described in embodiment C3 such as the switch 234, control means 235, and means for storing the non-correction matrix coefficients and the Y conversion matrix coefficients, making it capable of switching between color imaging and high-sensitivity imaging, and also of carrying out imaging according to the color temperature of the illumination.

The imaging devices described in embodiments C1, C2, and C3 may be used for imaging either moving or still images; the devices are applicable to video cameras, camcorders, digital still cameras, PC cameras, or digital still camera built into mobile phones or portable computers (e.g., personal digital assistants (PDA)), and to surveillance cameras or cameras on board vehicles, which are used under dark conditions.

What is claimed is:

1. An imaging device comprising:
   color signal generating means for receiving incident light and outputting first red, green, and blue color signals corresponding to the incident light; and
   spectral sensitivity characteristic correction means for performing a matrix calculation, wherein said matrix calculation includes:
   multiplication of each of the first red, green, and blue color signals by corresponding coefficients respectively to obtain a first result;
   multiplication of color signals, obtained by raising the first red, green, and blue color signals to a power with a predetermined first constant as exponent, by corresponding coefficients respectively to obtain a second result;
   multiplication of color signals, obtained by raising the first red, green, and blue color signals to a power with a predetermined second constant, by corresponding coefficients respectively to obtain a third result; and
   adding the first, second, and third results for each of the first red, green, and blue color signals to generate second red, green, and blue color signals; and wherein
   the coefficients are determined so that total characteristics of the color signal generating means and the spectral sensitivity characteristic correction means approximate human chromatic curves or spectral sensitivity curves obtained by a linear transformation thereof, and correct for response characteristics of the color signal generating means in a near infrared region.

2. The imaging device of claim 1, wherein
   the first constant, the second constant, and the coefficients are determined so that the total characteristics of the color signal generating means and the spectral sensitivity characteristic correction means approximate the human chromatic curves or the spectral sensitivity curves obtained by a linear transformation thereof and correct for the response characteristics of the color signal generating means in the near infrared region.

3. The imaging device of claim 2, wherein the first constant is less than unity and the second constant is greater than unity.

4. The imaging device of claim 2, wherein the spectral sensitivity characteristic correction means performs the following calculation $$\begin{pmatrix} R6 \\ G6 \\ B6 \end{pmatrix} = \begin{pmatrix} r1 & r2 & r3 & r4 & r5 & r6 & r7 & r8 & r9 \\ g1 & g2 & g3 & g4 & g5 & g6 & g7 & g8 & g9 \\ b1 & b2 & b3 & b4 & b5 & b6 & b7 & b8 & b9 \end{pmatrix} \begin{pmatrix} R5 \\ G5 \\ B5 \\ R5^i \\ G5^i \\ B5^i \\ R5^j \\ G5^j \\ B5^j \end{pmatrix} \quad (A1)$$

in which
R5, G5, and B5 represent the first red, green, and blue signals,
R6, G6, and B6 represent the second red, green, and blue signals,
$i<1, j>1$, and
r1 to r9, g1 to g9, and b1 to b9 are the coefficients.

5. The imaging device of claim 1, wherein the coefficients are determined by use of differences between the red, green, and blue spectral sensitivity characteristics of the color signal generating means from the visible region to the near infrared region, so that the total characteristics of the color signal generating means and the spectral sensitivity characteristic correction means approximate the human chromatic curves or the spectral sensitivity curves obtained by a linear transformation thereof, and correct for the response characteristics of the color signal generating means in the near infrared region.

6. The imaging device of claim 1, wherein said color signal generating means comprises:
a long-wavelength optical filter for attenuating an infrared region and a long-wavelength part of the visible region in incident light; and
an imaging element having color filters of at least three colors for outputting at least three color signals corresponding to light exiting the long-wavelength optical filter.

7. The imaging device of claim 6, wherein the long-wavelength part of the visible region is a wavelength region from substantially 700 nm to substantially 780 nm.

8. The imaging device of claim 6, wherein the color filters of the at least three colors are color filters of the colors red (R), green (G), and blue (B).

9. The imaging device of claim 6, further comprising:
control means for outputting a control signal corresponding to one of a first imaging mode for color imaging and a second imaging mode for high-sensitivity imaging;
wherein said spectral sensitivity correction means is responsive to the color signals from the color signal generating means, and outputs either first signals corresponding to the first imaging mode or second signals corresponding to the second imaging mode.

10. An imaging method for performing visual sensitivity correction, comprising:
receiving, by a color signal generating means, incident light and outputting first red, green, and blue color signals corresponding to the incident light; and
performing, by a spectral sensitivity characteristic correction means, a matrix calculation, wherein said matrix calculation includes:
multiplication of each of the first red, green, and blue color signals by corresponding coefficients respectively to obtain a first result;
multiplication of color signals, obtained by raising the first red, green, and blue color signals to a power with a predetermined first constant as exponent, by corresponding coefficients respectively to obtain a second result;
multiplication of color signals, obtained by raising the first red, green, and blue color signals to a power with a predetermined second constant, by corresponding coefficients respectively to obtain a third result; and
adding the first, second, and third results for each of the first red, green, and blue color signals to generate second red, green, and blue color signals; and wherein
the coefficients are determined so that total characteristics of the color signal generating means and the spectral sensitivity characteristic correction means approximate human chromatic curves or spectral sensitivity curves obtained by a linear transformation thereof, and correct for response characteristics of the color signal generating means in a near infrared region.

11. The imaging method of claim 10, wherein the first constant, the second constant, and the coefficients are determined so that the total characteristics of the color signal generating means and the spectral sensitivity characteristic correction means approximate the human chromatic curves or the spectral sensitivity curves obtained by a linear transformation thereof and correct for the response characteristics of the color signal generating means in the near infrared region.

12. The imaging method of claim 11, wherein the first constant is less than unity and the second constant is greater than unity.

13. The imaging method of claim 11, further comprising the step of performing the following calculation $$\begin{pmatrix} R6 \\ G6 \\ B6 \end{pmatrix} = \begin{pmatrix} r1 & r2 & r3 & r4 & r5 & r6 & r7 & r8 & r9 \\ g1 & g2 & g3 & g4 & g5 & g6 & g7 & g8 & g9 \\ b1 & b2 & b3 & b4 & b5 & b6 & b7 & b8 & b9 \end{pmatrix} \begin{pmatrix} R5 \\ G5 \\ B5 \\ R5^i \\ G5^i \\ B5^i \\ R5^j \\ G5^j \\ B5^j \end{pmatrix} \quad (A1)$$

in which
R5, G5, and B5 represent the first red, green, and blue signals,
R6, G6, and B6 represent the second red, green, and blue signals,
$i<1, j>1$, and
r1 to r9, g1 to g9, and b1 to b9 are the coefficients.

14. The imaging method of claim 10, wherein the coefficients are determined by use of differences between the red, green, and blue spectral sensitivity characteristics of the color signal generating means from the visible region to the near infrared region, so that the total characteristics of the color signal generating means and the spectral sensitivity characteristic correction means approximate the human chromatic curves or the spectral sensitivity curves obtained by a linear transformation thereof, and correct for the response characteristics of the color signal generating means in the near infrared region.

* * * * *